(12) United States Patent
Tokiwa et al.

(10) Patent No.: US 7,729,218 B2
(45) Date of Patent: Jun. 1, 2010

(54) METHOD AND APPARATUS FOR RECORDING AND REPRODUCING SIGNAL ON AND FROM OPTICAL INFORMATION RECORDING MEDIUM

(75) Inventors: Kazunori Tokiwa, Tokyo-to (JP);
Hideharu Eguchi, Kanagawa-ken (JP);
Toshiyuki Kato, Kanagawa-ken (JP);
Hiroshi Tabata, Ibaraki-ken (JP);
Yasuhiko Teranishi, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 770 days.

(21) Appl. No.: 11/521,328

(22) Filed: Sep. 15, 2006

(65) Prior Publication Data

US 2007/0070846 A1 Mar. 29, 2007

(30) Foreign Application Priority Data

| Sep. 29, 2005 | (JP) | ............................. 2005-284119 |
| Oct. 31, 2005 | (JP) | ............................. 2005-316612 |
| Jan. 10, 2006 | (JP) | ............................. 2006-002747 |
| Jan. 10, 2006 | (JP) | ............................. 2006-002748 |
| Jul. 25, 2006 | (JP) | ............................. 2006-201536 |

(51) Int. Cl.
*G11B 20/10* (2006.01)

(52) U.S. Cl. ................................................. 369/47.53

(58) Field of Classification Search .................. None
See application file for complete search history.

(56) References Cited

U.S. PATENT DOCUMENTS 5,872,763 A * 2/1999 Osakabe .................. 369/47.53

FOREIGN PATENT DOCUMENTS

| JP | 10-064064 | 3/1998 |
| JP | 10-293926 | 11/1998 |
| JP | 2003-045031 | 2/2003 |
| JP | 2003-162821 | 6/2003 |

* cited by examiner

*Primary Examiner*—Joseph H Feild
*Assistant Examiner*—Aneeta Yodichkas
(74) *Attorney, Agent, or Firm*—Louis Woo

(57) ABSTRACT

Test signals are recorded on a prescribed area in an optical disc. The prescribed area is scanned by a laser beam while the power of the laser beam is changed among different DC erasing values. The different DC erasing values are assigned to the recorded test signals, respectively. The recorded test signals are reproduced from the prescribed area to obtain reproduced signals. Parameter values of the respective reproduced signals are detected. The detected parameter values correspond to the different DC erasing values, respectively. Among the detected parameter values, a detected parameter value is decided which matches a target. One corresponding to the decided parameter value is selected from the different DC erasing values. A prescribed coefficient and the selected DC erasing value are multiplied to calculate an optimum level of an erasing power of the laser beam.

18 Claims, 28 Drawing Sheets

| CODE WORD | COEFFICIENT |
|---|---|
| 00h | 1.00 |
| 01h | 1.05 |
| 02h | 1.10 |
| 03h | 1.15 |
| 04h | 1.20 |
| 05h | 1.25 |
| 06h | 1.30 |
| 07h | 1.35 |
| ~ | ~ |

| BYTE POSITION | CONTENTS |
|---|---|
| ~ | ~ |
|  |  |
| N | 06h |
| N+1 | 05h |
| N+2 | 03h |
| N+3 | 02h |
| ~ | ~ |

| CODE WORD | COEFFICIENT |
|---|---|
| 00h | 1.00 |
| 01h | 1.05 |
| 02h | 1.10 |
| 03h | 1.15 |
| 04h | 1.20 |
| 05h | 1.25 |
| 06h | 1.30 |
| 07h | 1.35 |
| ~ | ~ |

| BYTE POSITION | CONTENTS |
|---|---|
| ~ | ~ |
|  |  |
| M | 03h |
| M+1 | 05h |
| M+2 | 06h |
| M+3 | 03h |
| ~ | ~ |

METHOD AND APPARATUS FOR RECORDING AND REPRODUCING SIGNAL ON AND FROM OPTICAL INFORMATION RECORDING MEDIUM

BACKGROUND OF THE INVENTION

1. Field of the Invention

This invention relates to a method and an apparatus for recording and reproducing a signal on and from an optical information recording medium such as an optical disc through the use of a laser beam. This invention particularly relates to a method and an apparatus for performing the trial writing and reading of test signals on and from a rewritable optical information recording medium such as a rewritable optical disc with a plurality of recording layers to decide optimum write-purpose powers of a laser beam applied to the recording medium. Preferably, the recording of user data on the recording medium is performed while the power of the laser beam is controlled at the decided optimum write-purpose levels. In addition, this invention relates to a rewritable optical information recording medium such as a rewritable optical disc with a plurality of recording layers. Furthermore, this invention relates to a computer program for recording and reproducing a signal on and from an optical information recording medium such as an optical disc through the use of a laser beam.

2. Description of the Related Art

There are DVDs (digital versatile discs) of various types such as a DVD-R (DVD-recordable) and a DVD-RW (DVD-rewritable). Some DVDs each have only a single recording layer while other DVDs each have multiple recording layers.

Regarding a typical single-layer DVD, optimum power control (OPC) is implemented as follows. To record a signal on the DVD, a recording laser beam modulated in accordance with the signal is applied to the DVD. The quality of the recorded signal on the DVD depends on the power of the laser beam applied thereto. The recording layer of the DVD has a power calibration area (PCA). Test recording and reproduction (trial write and read) are performed on the DVD before an information signal is recorded thereon. During the first half of the test recording and reproduction, test signals are sequentially recorded on the PCA in the DVD while the power of the laser beam is changed among different values. The test signals are assigned to the different powers of the laser beam, respectively. During the second half of the test recording and reproduction, the recorded test signals are reproduced, and the reproduced test signals are evaluated. An optimum power of the laser beam is decided on the basis of the results of the evaluation of the reproduced test signals. During the recording of an information signal on the DVD which follows the test recording and reproduction, the power of the laser beam is controlled at the decided optimum level.

Japanese patent application publication number 10-293926/1998 discloses a DVD-R which has a land track formed with pre-pits representing on-disc address information called LPP (land pre-pit) address information. Before the recording of information data on the DVD-R, the LPP address information is detected therefrom. During the recording of information data, the currently accessed position on the DVD-R is controlled according to the detected LPP address information.

Similarly, a DVD-RW has land pre-pits representing on-disc address information. It is known that the land pre-pits in the DVD-R or the DVD-RW represent not only the address information but also information about reference recording conditions such as a recommended recording laser power and a recommended recording laser waveform (a recommended recording strategy).

Japanese patent number 3259642 discloses a method and an apparatus for recording and reproducing a signal on and from a rewritable optical disc having a recording layer which can be changed between a crystalline state and an amorphous state depending on the power of a laser beam applied thereto. In Japanese patent 3259642, the power of the laser beam at which the recording layer changes from the crystalline state to the amorphous state to form a pit therein is referred to as the writing power (the recording power). The power of the laser beam at which the recording layer returns from the amorphous state to the crystalline state to erase a pit therefrom is referred to as the erasing power. During the recording of a new signal on the optical disc over an old recorded signal, the power of the laser beam is changed among the writing level, the erasing level, and a bottom level (a bias level). The bottom power is lower than the writing power and the erasing power. For the formation of every pit representing a portion of a newly recorded signal, the power of the laser beam is held at the erasing level for a certain interval to erase an old pit from the recording layer, and is then alternated between the writing level and the bottom level to form a new pit in the recording layer. In this case, the temporary laser power down to the bottom level prevents the unwanted diffusion of heat in the recording layer.

According to the method and the apparatus in Japanese patent 3259642, test signals are sequentially recorded on the optical disc while the writing power of the laser beam is changed among different values and the erasing power and the bottom power thereof remain fixed to certain values. The different values of the writing power are assigned to the recorded test signals, respectively. The recorded test signals are reproduced, and the reproduced test signals are evaluated through the use of characteristic parameters detected therefrom. The writing power value corresponding to optimum one among the detected characteristic parameters is decided to be optimum. One of the erasing power and the bottom power is referred to as the first power, and the other is called the second power. Thereafter, test signals are sequentially recorded on the optical disc while the writing power and the first power of the laser beam remain fixed to the optimum value and a certain value respectively and the second power thereof is changed among different values. The different values of the second power are assigned to the recorded test signals, respectively. The recorded test signals are reproduced, and the reproduced test signals are evaluated through the use of characteristic parameters detected therefrom. The second power value corresponding to optimum one among the detected characteristic parameters is decided to be optimum. Thereafter, test signals are sequentially recorded on the optical disc while the writing power and the second power of the laser beam remain fixed to the optimum values respectively and the first power thereof is changed among different values. The different values of the first power are assigned to the recorded test signals, respectively. The recorded test signals are reproduced, and the reproduced test signals are evaluated through the use of characteristic parameters detected therefrom. The second power value corresponding to optimum one among the detected characteristic parameters is decided to be optimum. As a result, the optimum writing power, the optimum erasing power, and the optimum bottom power of the laser beam are determined. During the recording of a new information signal on the optical disc over an old recorded information signal, the power of the laser beam is changed among the optimum writing level, the optimum erasing level, and the optimum bottom level. The characteristic parameters used for the evaluation of reproduced test signals are the asymmetry values, the modulation factors, the modulation-factor-derivative "γ" values, or the error rates of the reproduced signals.

In general, deciding the optimum recording power (the optimum writing power), the optimum erasing power, and the optimum bias power (the optimum bottom power) of a laser beam for a DVD-RW having multiple recording layers is more difficult than deciding those for a DVD-RW having only a single recording layer.

SUMMARY OF THE INVENTION

It is a first object of this invention to provide an apparatus for recording and reproducing a signal on and from an optical information recording medium with multiple recording layers which can accurately decide the optimum erasing power of a laser beam applied to the recording medium.

It is a second object of this invention to provide a method of recording and reproducing a signal on and from an optical information recording medium with multiple recording layers which can accurately decide the optimum erasing power of a laser beam applied to the recording medium.

It is a third object of this invention to provide an improved optical information recording medium with multiple recording layers.

It is a fourth object of this invention to provide a computer program for recording and reproducing a signal on and from an optical information recording medium with multiple recording layers which can accurately decide the optimum erasing power of a laser beam applied to the recording medium.

A first aspect of this invention provides an apparatus for recording and reproducing a signal on and from a rewritable optical disc by applying a laser beam to the optical disc. The optical disc has a plurality of recording layers including a selected recording layer. The apparatus comprises first means for recording test signals on a prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer; second means for scanning the prescribed area in the selected recording layer by the laser beam while maintaining the power of the laser beam at a DC erasing power and changing the DC erasing power among different values, wherein the different values of the DC erasing power are assigned to the recorded test signals respectively; third means for reproducing the recorded test signals from the prescribed area in the selected recording layer to obtain reproduced signals; fourth means for detecting parameter values of the respective reproduced signals obtained by the third means, the parameter values being at least ones of (1) modulation factors, (2) modulation-factor-slope "γ" values, (3) asymmetry-related "β" values, and (4) asymmetry values, wherein the detected parameter values of the reproduced signals correspond to the different values of the DC erasing power respectively; fifth means for deciding, among the parameter values detected by the fourth means, a detected parameter value matching one of (1) a target value and (2) a target condition; sixth means for selecting, from the different values of the DC erasing power, one corresponding to the parameter value decided by the fifth means; and seventh means for multiplying a prescribed coefficient and the DC erasing power value selected by the sixth means to calculate an optimum level of the erasing power of the laser beam.

A second aspect of this invention provides a method of recording and reproducing a signal on and from a rewritable optical disc by applying a laser beam to the optical disc. The optical disc has a plurality of recording layers including a selected recording layer. The method comprises the steps of recording test signals on a prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer; scanning the prescribed area in the selected recording layer by the laser beam while maintaining the power of the laser beam at a DC erasing power and changing the DC erasing power among different values, wherein the different values of the DC erasing power are assigned to the recorded test signals respectively; reproducing the recorded test signals from the prescribed area in the selected recording layer to obtain reproduced signals; detecting parameter values of the respective reproduced signals, the parameter values being at least ones of (1) modulation factors, (2) modulation-factor-slope "γ" values, (3) asymmetry-related "β" values, and (4) asymmetry values, wherein the detected parameter values of the reproduced signals correspond to the different values of the DC erasing power respectively; deciding, among the detected parameter values, a detected parameter value matching one of (1) a target value and (2) a target condition; selecting, from the different values of the DC erasing power, one corresponding to the decided parameter value; and multiplying a prescribed coefficient and the selected DC erasing power value to calculate an optimum level of the erasing power of the laser beam.

A third aspect of this invention provides a rewritable optical disc comprising a laminate of recording layers as viewed in an axial direction of a laser beam for scanning the optical disc, wherein each of the recording layers comprises a first area assigned to test signals, a second area assigned to recording management information, and a third area assigned to user data, wherein the second area prestores a first signal representative of a recommended recording power of the laser beam, a second signal representative of a ratio between the recommended recording power and a recommended erasing power of the laser beam, and a third signal representative of a recommended bias power of the laser beam, and wherein one of (1) a pre-pit zone and (2) a track groove portion in one of the first, second, and third areas prestores a fourth signal representative of a prescribed coefficient.

A fourth aspect of this invention provides a computer program for recording and reproducing a signal on and from a rewritable optical disc by applying a laser beam to the optical disc. The optical disc has a plurality of recording layers including a selected recording layer. The computer program comprises the steps of recording test signals on a prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer; scanning the prescribed area in the selected recording layer by the laser beam while maintaining the power of the laser beam at a DC erasing power and changing the DC erasing power among different values, wherein the different values of the DC erasing power are assigned to the recorded test signals respectively; reproducing the recorded test signals from the prescribed area in the selected recording layer to obtain reproduced signals; detecting parameter values of the respective reproduced signals, the parameter values being at least ones of (1) modulation factors, (2) modulation-factor-slope "γ" values, (3) asymmetry-related "β" values, and (4) asymmetry values, wherein the detected parameter values of the reproduced signals correspond to the different values of the DC erasing power respectively; deciding, among the detected parameter values, a detected parameter value matching one of (1) a target value and (2) a target condition; selecting, from the different values of the DC erasing power, one corresponding to the decided parameter value; and multiplying a prescribed coefficient and the selected DC erasing power value to calculate an optimum level of the erasing power of the laser beam.

A fifth aspect of this invention provides an apparatus for recording and reproducing a signal on and from a rewritable optical disc by applying a laser beam to the optical disc. The optical disc has a plurality of recording layers including a selected recording layer. The apparatus comprises first means for recording first test signals on a first prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer; second means for scanning the first prescribed area in the selected recording layer by the laser beam while maintaining the power of the laser beam at a DC erasing power and changing the DC erasing power among different values, wherein the different values of the DC erasing power are assigned to the recorded first test signals respectively; third means for reproducing the recorded first test signals from the first prescribed area in the selected recording layer to obtain first reproduced signals; fourth means for detecting first parameter values of the respective first reproduced signals obtained by the third means, the first parameter values being at least ones of (1) modulation factors, (2) modulation-factor-slope "γ" values, (3) asymmetry-related "β" values, and (4) asymmetry values, wherein the detected first parameter values of the first reproduced signals correspond to the different values of the DC erasing power respectively; fifth means for deciding, among the first parameter values detected by the fourth means, a first detected parameter value matching one of (1) a first target value and (2) a first target condition; sixth means for selecting, from the different values of the DC erasing power, one corresponding to the first parameter value decided by the fifth means; seventh means for multiplying a first prescribed coefficient and the DC erasing power value selected by the sixth means to calculate an optimum level of the erasing power of the laser beam; eighth means for recording second test signals on a second prescribed area in the selected recording layer while changing the power of the laser beam among the setting recording power, the setting erasing power, and the setting bias power, and changing the setting recording power among different values and fixing the setting erasing power to the optimum erasing power level calculated by the seventh means, wherein the second prescribed area differs from the first prescribed area and the different values of the setting recording power are assigned to the recorded second test signals respectively; ninth means for reproducing the recorded second test signals from the second prescribed area in the selected recording layer to obtain second reproduced signals; tenth means for detecting second parameter values of the respective second reproduced signals obtained by the ninth means, the second parameter values being at least ones of (1) modulation factors, (2) modulation-factor-slope "γ" values, (3) asymmetry-related "β" values, and (4) asymmetry values, wherein the detected second parameter values of the second reproduced signals correspond to the different values of the setting recording power respectively; eleventh means for deciding, among the second parameter values detected by the tenth means, a second detected parameter value matching one of (1) a second target value and (2) a second target condition; twelfth means for selecting, from the different values of the setting recording power, one corresponding to the second parameter value decided by the eleventh means; and thirteenth means for multiplying a second prescribed coefficient and the recording power value selected by the twelfth means to calculate an optimum level of the recording power of the laser beam.

A sixth aspect of this invention provides an apparatus for recording and reproducing a signal on and from a rewritable optical disc by applying a laser beam to the optical disc. The optical disc has a plurality of recording layers including a selected recording layer. The apparatus comprises first means for recording first test signals on a first prescribed area in the selected recording layer while changing a power of the laser beam among a setting recording power, a setting erasing power, and a setting bias power, and changing the setting recording power among different values and fixing a ratio between the setting recording power and the setting erasing power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer, wherein the different values of the setting recording power are assigned to the recorded first test signals respectively; second means for reproducing the recorded first test signals from the first prescribed area in the selected recording layer to obtain first reproduced signals; third means for detecting first parameter values of the respective first reproduced signals obtained by the second means, the first parameter values being at least ones of (1) modulation factors, (2) modulation-factor-slope "γ" values, (3) asymmetry-related "β" values, and (4) asymmetry values, wherein the detected first parameter values of the first reproduced signals correspond to the different values of the setting recording power respectively; fourth means for deciding, among the first parameter values detected by the third means, a first detected parameter value matching one of (1) a first target value and (2) a first target condition; fifth means for selecting, from the different values of the setting recording power, one corresponding to the first parameter value decided by the fourth means; sixth means for multiplying a first prescribed coefficient and the recording power value selected by the fifth means to calculate an optimum level of the recording power of the laser beam; seventh means for recording second test signals on a second prescribed area in the selected recording layer while changing the power of the laser beam among the setting recording power, the setting erasing power, and the setting bias power, and fixing the setting recording power to the optimum recording power level calculated by the sixth means, wherein the second prescribed area differs from the first prescribed area; eighth means for scanning the second prescribed area in the selected recording layer by the laser beam while maintaining the power of the laser beam at a DC erasing power and changing the DC erasing power among different values, wherein the different values of the DC erasing power are assigned to the recorded second test signals respectively; ninth means for reproducing the recorded second test signals from the second prescribed area in the selected recording layer to obtain second reproduced signals; tenth means for detecting second parameter values of the respective second reproduced signals obtained by the ninth means, the second parameter values being at least ones of (1) modulation factors, (2) modulation-factor-slope "γ" values, (3) asymmetry-related "β" values, and (4) asymmetry values, wherein the detected second parameter values of the second reproduced signals correspond to the different values of the DC erasing power respectively; eleventh means for deciding, among the second parameter values detected by the tenth means, a second detected parameter value matching one of (1) a second target value and (2) a second target condition; twelfth means for selecting, from the different values of the DC erasing power, one corresponding to the second parameter value decided by the eleventh means; and thirteenth means for multiplying a second prescribed coefficient and the DC erasing power value selected by the twelfth means to calculate an optimum level of the erasing power of the laser beam.

A seventh aspect of this invention provides a method of recording and reproducing a signal on and from a rewritable optical disc by applying a laser beam to the optical disc. The optical disc has a plurality of recording layers including a selected recording layer. The method comprises the steps of recording first test signals on a first prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer; scanning the first prescribed area in the selected recording layer by the laser beam while maintaining the power of the laser beam at a DC erasing power and changing the DC erasing power among different values, wherein the different values of the DC erasing power are assigned to the recorded first test signals respectively; reproducing the recorded first test signals from the first prescribed area in the selected recording layer to obtain first reproduced signals; detecting first parameter values of the respective first reproduced signals, the first parameter values being at least ones of (1) modulation factors, (2) modulation-factor-slope "γ" values, (3) asymmetry-related "β" values, and (4) asymmetry values, wherein the detected first parameter values of the first reproduced signals correspond to the different values of the DC erasing power respectively; deciding, among the detected first parameter values, a first detected parameter value matching one of (1) a first target value and (2) a first target condition; selecting, from the different values of the DC erasing power, one corresponding to the decided first parameter value; multiplying a first prescribed coefficient and the selected DC erasing power value to calculate an optimum level of the erasing power of the laser beam; recording second test signals on a second prescribed area in the selected recording layer while changing the power of the laser beam among the setting recording power, the setting erasing power, and the setting bias power, and changing the setting recording power among different values and fixing the setting erasing power to the calculated optimum erasing power level, wherein the second prescribed area differs from the first prescribed area and the different values of the setting recording power are assigned to the recorded second test signals respectively; reproducing the recorded second test signals from the second prescribed area in the selected recording layer to obtain second reproduced signals; detecting second parameter values of the respective second reproduced signals, the second parameter values being at least ones of (1) modulation factors, (2) modulation-factor-slope "γ" values, (3) asymmetry-related "β" values, and (4) asymmetry values, wherein the detected second parameter values of the second reproduced signals correspond to the different values of the setting recording power respectively; deciding, among the detected second parameter values, a second detected parameter value matching one of (1) a second target value and (2) a second target condition; selecting, from the different values of the setting recording power, one corresponding to the decided second parameter value; and multiplying a second prescribed coefficient and the selected recording power value to calculate an optimum level of the recording power of the laser beam.

An eighth aspect of this invention provides a method of recording and reproducing a signal on and from a rewritable optical disc by applying a laser beam to the optical disc. The optical disc has a plurality of recording layers including a selected recording layer. The method comprises the steps of recording first test signals on a first prescribed area in the selected recording layer while changing a power of the laser beam among a setting recording power, a setting erasing power, and a setting bias power, and changing the setting recording power among different values and fixing a ratio between the setting recording power and the setting erasing power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer, wherein the different values of the setting recording power are assigned to the recorded first test signals respectively; reproducing the recorded first test signals from the first prescribed area in the selected recording layer to obtain first reproduced signals; detecting first parameter values of the respective first reproduced signals, the first parameter values being at least ones of (1) modulation factors, (2) modulation-factor-slope "γ" values, (3) asymmetry-related "β" values, and (4) asymmetry values, wherein the detected first parameter values of the first reproduced signals correspond to the different values of the setting recording power respectively; deciding, among the detected first parameter values, a first detected parameter value matching one of (1) a first target value and (2) a first target condition; selecting, from the different values of the setting recording power, one corresponding to the decided first parameter value; multiplying a first prescribed coefficient and the selected recording power value to calculate an optimum level of the recording power of the laser beam; recording second test signals on a second prescribed area in the selected recording layer while changing the power of the laser beam among the setting recording power, the setting erasing power, and the setting bias power, and fixing the setting recording power to the calculated optimum recording power level, wherein the second prescribed area differs from the first prescribed area; scanning the second prescribed area in the selected recording layer by the laser beam while maintaining the power of the laser beam at a DC erasing power and changing the DC erasing power among different values, wherein the different values of the DC erasing power are assigned to the recorded second test signals respectively; reproducing the recorded second test signals from the second prescribed area in the selected recording layer to obtain second reproduced signals; detecting second parameter values of the respective second reproduced signals, the second parameter values being at least ones of (1) modulation factors, (2) modulation-factor-slope "γ" values, (3) asymmetry-related "β" values, and (4) asymmetry values, wherein the detected second parameter values of the second reproduced signals correspond to the different values of the DC erasing power respectively; deciding, among the detected second parameter values, a second detected parameter value matching one of (1) a second target value and (2) a second target condition; selecting, from the different values of the DC erasing power, one corresponding to the decided second parameter value; and multiplying a second prescribed coefficient and the selected DC erasing power value to calculate an optimum level of the erasing power of the laser beam.

A ninth aspect of this invention provides a rewritable optical disc comprising a laminate of recording layers as viewed in an axial direction of a laser beam for scanning the optical disc, wherein each of the recording layers comprises a first area assigned to test signals, a second area assigned to recording management information, and a third area assigned to user data, wherein one of (1) a pre-pit zone and (2) a track groove portion in one of the first, second, and third areas prestores a first signal representative of the first prescribed coefficient and a second signal representative of the second prescribed coefficient.

A tenth aspect of this invention provides a computer program for recording and reproducing a signal on and from a rewritable optical disc by applying a laser beam to the optical disc. The optical disc has a plurality of recording layers including a selected recording layer. The compute program comprises the steps of recording first test signals on a first prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer; scanning the first prescribed area in the selected recording layer by the laser beam while maintaining the power of the laser beam at a DC erasing power and changing the DC erasing power among different values, wherein the different values of the DC erasing power are assigned to the recorded first test signals respectively; reproducing the recorded first test signals from the first prescribed area in the selected recording layer to obtain first reproduced signals; detecting first parameter values of the respective first reproduced signals, the first parameter values being at least ones of (1) modulation factors, (2) modulation-factor-slope "γ" values, (3) asymmetry-related "β" values, and (4) asymmetry values, wherein the detected first parameter values of the first reproduced signals correspond to the different values of the DC erasing power respectively; deciding, among the detected first parameter values, a first detected parameter value matching one of (1) a first target value and (2) a first target condition; selecting, from the different values of the DC erasing power, one corresponding to the decided first parameter value; multiplying a first prescribed coefficient and the selected DC erasing power value to calculate an optimum level of the erasing power of the laser beam; recording second test signals on a second prescribed area in the selected recording layer while changing the power of the laser beam among the setting recording power, the setting erasing power, and the setting bias power, and changing the setting recording power among different values and fixing the setting erasing power to the calculated optimum erasing power level, wherein the second prescribed area differs from the first prescribed area and the different values of the setting recording power are assigned to the recorded second test signals respectively; reproducing the recorded second test signals from the second prescribed area in the selected recording layer to obtain second reproduced signals; detecting second parameter values of the respective second reproduced signals, the second parameter values being at least ones of (1) modulation factors, (2) modulation-factor-slope "γ" values, (3) asymmetry-related "β" values, and (4) asymmetry values, wherein the detected second parameter values of the second reproduced signals correspond to the different values of the setting recording power respectively; deciding, among the detected second parameter values, a second detected parameter value matching one of (1) a second target value and (2) a second target condition; selecting, from the different values of the setting recording power, one corresponding to the decided second parameter value; and multiplying a second prescribed coefficient and the selected recording power value to calculate an optimum level of the recording power of the laser beam.

An eleventh aspect of this invention provides a computer program for recording and reproducing a signal on and from a rewritable optical disc by applying a laser beam to the optical disc. The optical disc has a plurality of recording layers including a selected recording layer. The computer program comprises the steps of recording first test signals on a first prescribed area in the selected recording layer while changing a power of the laser beam among a setting recording power, a setting erasing power, and a setting bias power, and changing the setting recording power among different values and fixing a ratio between the setting recording power and the setting erasing power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer, wherein the different values of the setting recording power are assigned to the recorded first test signals respectively; reproducing the recorded first test signals from the first prescribed area in the selected recording layer to obtain first reproduced signals; detecting first parameter values of the respective first reproduced signals, the first parameter values being at least ones of (1) modulation factors, (2) modulation-factor-slope "γ" values, (3) asymmetry-related "β" values, and (4) asymmetry values, wherein the detected first parameter values of the first reproduced signals correspond to the different values of the setting recording power respectively; deciding, among the detected first parameter values, a first detected parameter value matching one of (1) a first target value and (2) a first target condition; selecting, from the different values of the setting recording power, one corresponding to the decided first parameter value; multiplying a first prescribed coefficient and the selected recording power value to calculate an optimum level of the recording power of the laser beam; recording second test signals on a second prescribed area in the selected recording layer while changing the power of the laser beam among the setting recording power, the setting erasing power, and the setting bias power, and fixing the setting recording power to the calculated optimum recording power level, wherein the second prescribed area differs from the first prescribed area; scanning the second prescribed area in the selected recording layer by the laser beam while maintaining the power of the laser beam at a DC erasing power and changing the DC erasing power among different values, wherein the different values of the DC erasing power are assigned to the recorded second test signals respectively; reproducing the recorded second test signals from the second prescribed area in the selected recording layer to obtain second reproduced signals; detecting second parameter values of the respective second reproduced signals, the second parameter values being at least ones of (1) modulation factors, (2) modulation-factor-slope "γ" values, (3) asymmetry-related "β" values, and (4) asymmetry values, wherein the detected second parameter values of the second reproduced signals correspond to the different values of the DC erasing power respectively; deciding, among the detected second parameter values, a second detected parameter value matching one of (1) a second target value and (2) a second target condition; selecting, from the different values of the DC erasing power, one corresponding to the decided second parameter value; and multiplying a second prescribed coefficient and the selected DC erasing power value to calculate an optimum level of the erasing power of the laser beam.

DETAILED DESCRIPTION OF THE INVENTION

Prior-art optical discs and prior-art apparatuses will be explained below for a better understanding of this invention.

Figure 1:
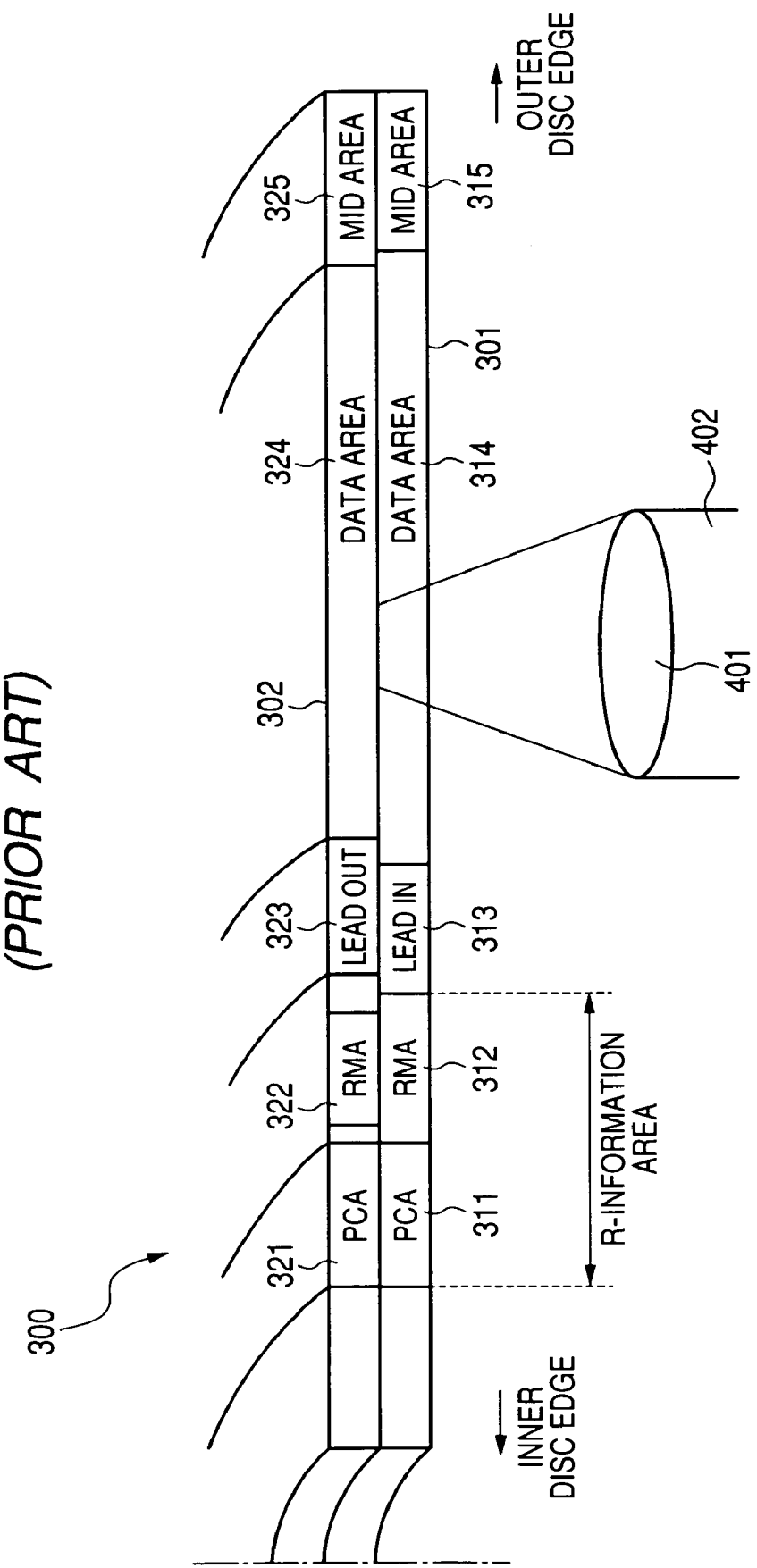
FIG. 1 is a sectional diagram of a prior-art DVD-R or DVD-RW.

FIG. 1 shows a first prior-art DVD-R or DVD-RW 300. The prior-art disc 300 is of a two-layer single-sided type. The prior-art disc 300 has a laminated structure including a first recording layer 301 and a second recording layer 302 which are successively arranged in an axial direction of a laser beam 402 (or an axial direction of the disc 300). The first recording layer 301 is closer to an optical pickup (a recording and reproducing head) of a prior-art optical-disc drive apparatus than the second recording layer 302 is. An objective lens 401 in the optical pickup focuses the laser beam 402 onto either the first recording layer 301 or the second recording layer 302. The laser beam 402 reaches the second recording layer 302 after passing through the first recording layer 301.

The first recording layer 301 is divided into a power calibration area (PCA) 311, a recording management area (RMA) 312, a lead-in area 313, a data area 314, and a middle area 315 which are successively arranged in that order as viewed along a radial direction from the inner disc edge toward the outer disc edge. The PCA 311 and the RMA 312 constitute an R-information area. The second recording layer 302 is divided into a PCA 321, an RMA 322, a lead-out area 323, a data area 324, and a middle area 325 which are successively arranged in that order as viewed along a radial direction from the inner disc edge toward the outer disc edge. The PCA 321 and the RMA 322 constitute an R-information area.

A first prior-art drive apparatus for the disc 300 implements optimum power control (OPC) through the use of the PCAs 311 and 321. Before recording user data on the data area 314 in the first recording layer 301, the first prior-art drive apparatus implements OPC through the use of the PCA 311 in the first recording layer 301 to decide optimum power conditions of the laser beam 402 for the data recording on the data area 314. Before recording user data on the data area 324 in the second recording layer 302, the first prior-art drive apparatus implements OPC through the use of the PCA 321 in the second recording layer 302 to decide optimum power conditions of the laser beam 402 for the data recording on the data area 324. The first prior-art drive apparatus loads the RMAs 312 and 322 with recording management information (recording management data) which includes information for managing changes in the recording states of the lead-in area 313, the data areas 314 and 324, and the lead-out area 323, and information for managing OPC-related information.

A portion of the lead-in area 313 has a control data zone formed with land pre-pits representing entire disc information about the structure and size of the disc 300 and also reference recording conditions such as a recommended recording laser power, a recommended recording laser waveform, and a ratio between the recommended recording laser power and a recommended erasing laser power.

A second prior-art drive apparatus for a second prior-art rewritable optical disc (a second prior-art DVD-RW) is disclosed in Japanese patent number 3259642. During the recording of an information signal on the disc, the second prior-art drive apparatus changes the power of a laser beam applied to the disc among a writing level (a recording level) Pw, an erasing level Pe, and a bias level (a bottom level) Pb in accordance with a waveform shown in FIG. 2. A recorded mark (pit) is formed in the disc in accordance with the alternation of the laser beam power between the writing level Pw and the bias level Pb shown in FIG. 2. The second prior-art drive apparatus decides optimum values of the writing power Pw, the erasing power Pe, and the bias power Pb in the previously-mentioned way.

Regarding a prior-art DVD-RW having two recording layers, experiments were performed by the inventors of this invention to detect the relation among the number of times of signal recording (signal rewriting) on a first recording layer of the disc, the quality of every RF signal reproduced from the first recording layer of the disc, and the power conditions of a laser beam applied to the disc to record an original signal corresponding to the reproduced RF signal. The first recording layer means one recording layer which is closer to an optical pickup than the other recording layer is. During the experiments, the jitter of every reproduced RF signal was measured. The reproduced-signal jitter is defined as follows. A phase-locked loop (PLL) circuit generates a clock signal from every reproduced RF signal. A waveform shaping circuit converts every reproduced RF signal into a two-value signal. Time differences between rising edges in the clock signal and those in the two-value signal, and time differences between falling edges in the clock signal and those in the two-value signal are integrated and averaged to obtain a mean time difference. The mean time difference is divided by the period of the clock signal. The result of the division is multiplied by 100. The result of the multiplication is labeled as the jitter (%) of the reproduced RF signal. As the jitter of the reproduced RF signal decreases, the quality thereof is higher.

A sample signal was recorded on the first recording layer of a prior-art DVD-RW having two recording layers, and the recorded signal was reproduced therefrom. The jitter of the first reproduced signal was measured. Thereafter, the sample signal was repetitively recorded (rewritten) on and reproduced from the first recording layer of the prior-art DVD-RW. In this case, every signal recording was on an overwrite basis. The jitter of each of the second and later reproduced signals was measured. The repetitive recording of the sample signal was in same recording conditions.

Figure 3:
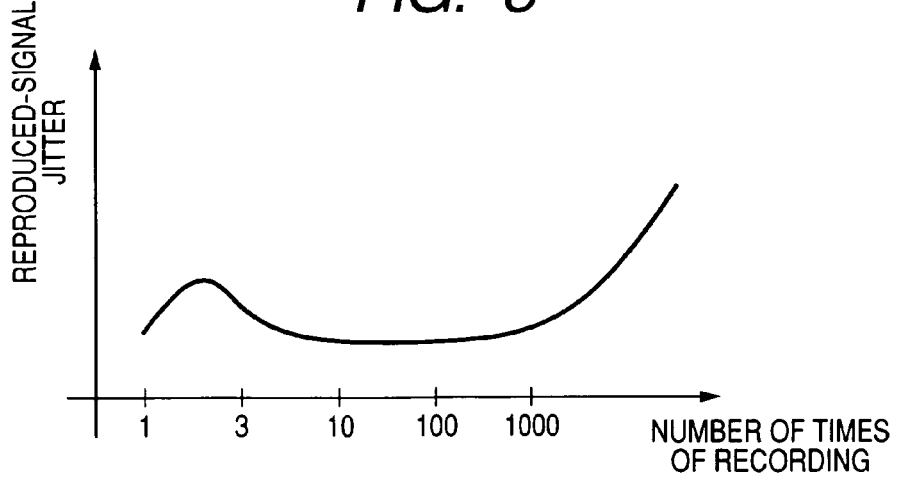
FIG. 3 is a diagram showing a relation between a reproduced-signal jitter and the number of times of signal recording (signal rewriting) on a prior-art DVD-RW.

FIG. 3 shows the obtained relation between the reproduced-signal jitter and the number of times of signal recording (signal rewriting) on the prior-art DVD-RW. As shown in FIG. 3, the jitter of a reproduced signal originating from the second recorded signal was relatively bad. On the other hand, the jitter of a reproduced signal originating from each of the 10th to 1000th recorded signals was relatively good.

A sample signal was recorded on the first recording layer of a prior-art DVD-RW having two recording layers, and the recorded signal was reproduced therefrom. The jitter of the first reproduced signal was measured. Thereafter, the sample signal was recorded (rewritten) on the first recording layer of the prior-art DVD-RW in an overwrite fashion, and the recorded signal was reproduced therefrom. The jitter of the second reproduced signal was measured. Subsequently, the sample signal was repetitively recorded (rewritten) on and reproduced from the first recording layer of the prior-art DVD-RW. In this case, every signal recording was on an overwrite basis. The jitter of the eleventh reproduced signal was measured. The sequence of the above steps was reiterated while the prior-art DVD-RW was repetitively changed from one to another and the recording power Pw of a laser beam was sequentially changed among different values. On the other hand, the erasing power Pe of the laser beam was held constant.

Figure 4:
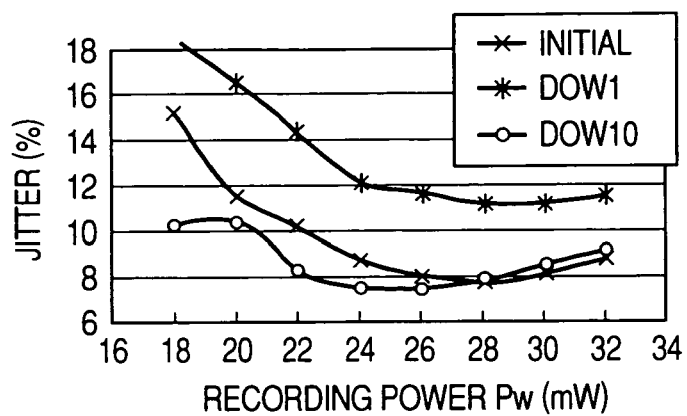
FIG. 4 is a diagram showing a relation among a reproduced-signal jitter, the number of times of signal recording on a prior-art DVD-RW, and a recording power Pw of a laser beam.

FIG. 4 shows the obtained relation among the reproduced-signal jitter, the number of times of signal recording (signal rewriting) on the prior-art DVD-RW, and the recording power Pw of the laser beam. In FIG. 4, the marks INITIAL denote the relation between the jitter of the first reproduced signal and the recording power Pw of the laser beam used to record the sample signal corresponding to the first reproduced signal. The marks DOW1 denote the relation between the jitter of the second reproduced signal and the recording power Pw of the laser beam used to record the sample signal corresponding to the second reproduced signal. The marks DOW10 denotes the relation between the jitter of the eleventh reproduced signal and the recording power Pw of the laser beam used to record the sample signal corresponding to the eleventh reproduced signal. As shown in FIG. 4, the reproduced-signal jitter was sensitive to the recording power Pw of the laser beam. FIG. 4 indicates that an allowable range of the recording power Pw is relatively wide.

A sample signal was recorded on the first recording layer of a prior-art DVD-RW having two recording layers, and the recorded signal was reproduced therefrom. The jitter of the first reproduced signal was measured. Thereafter, the sample signal was recorded (rewritten) on the first recording layer of the prior-art DVD-RW in an overwrite fashion, and the recorded signal was reproduced therefrom. The jitter of the second reproduced signal was measured. Subsequently, the sample signal was repetitively recorded (rewritten) on and reproduced from the first recording layer of the prior-art DVD-RW. In this case, every signal recording was on an overwrite basis. The jitter of the eleventh reproduced signal was measured. The sequence of the above steps was reiterated while the prior-art DVD-RW was repetitively changed from one to another and the erasing power Pe of a laser beam was sequentially changed among different values. On the other hand, the recording power Pw of the laser beam was held constant.

Figure 5:
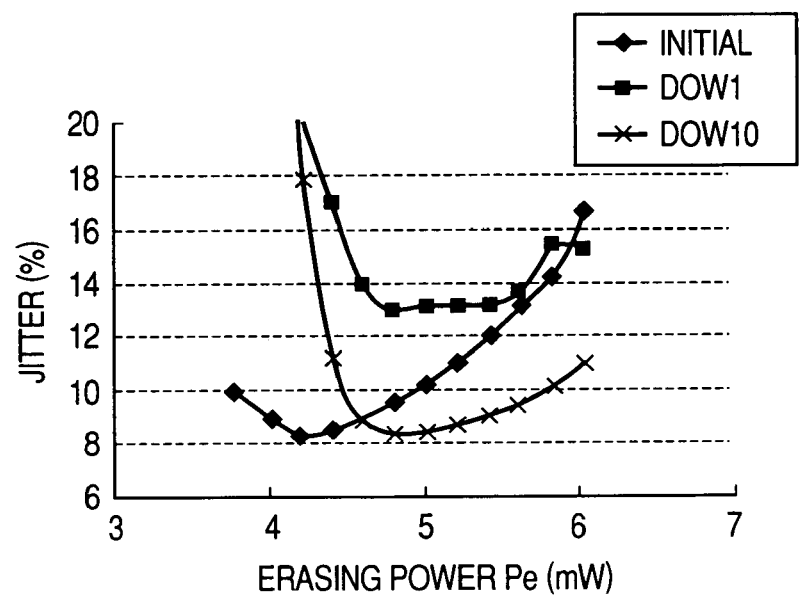
FIG. 5 is a diagram showing a relation among a reproduced-signal jitter, the number of times of signal recording on a prior-art DVD-RW, and an erasing power Pe of a laser beam.

FIG. 5 shows the obtained relation among the reproduced-signal jitter, the number of times of signal recording (signal rewriting) on the prior-art DVD-RW, and the erasing power Pe of the laser beam. In FIG. 5, the marks INITIAL denote the relation between the jitter of the first reproduced signal and the erasing power Pe of the laser beam used regarding the recording of the sample signal corresponding to the first reproduced signal. The marks DOW1 denote the relation between the jitter of the second reproduced signal and the erasing power Pe of the laser beam used regarding the recording of the sample signal corresponding to the second reproduced signal. The marks DOW10 denote the relation between the jitter of the eleventh reproduced signal and the erasing power Pe of the laser beam used regarding the recording of the sample signal corresponding to the eleventh reproduced signal. As shown in FIG. 5, the reproduced-signal jitter was sensitive to the erasing power Pe of the laser beam. There were considerable differences among optimum values of the erasing power Pe of the laser beam at which the jitters of the first, second, and eleventh reproduced signals were minimized respectively.

It is understood from FIG. 4 that an allowable range of the recording power Pw of the laser beam which causes an acceptable reproduced-signal jitter is relatively wide. It is understood from FIG. 5 that the optimum value of the erasing power Pe of the laser beam depends on the number of times of signal recording, and an allowable range of the erasing power Pe of the laser beam which causes an acceptable reproduced-signal jitter is relatively narrow. Specifically, regarding the eleventh reproduced signal, an allowable range of the recording power Pw of the laser beam which causes a reproduced-signal jitter of 9% or less is about ±2.2 mW. On the other hand, regarding the eleventh reproduced signal, an allowable range of the erasing power Pe of the laser beam which causes a reproduced-signal jitter of 9% or less is about ±0.4 mW.

Accordingly, the reproduced-signal jitter is greatly influenced by the erasing power Pe of the laser beam.

Samples of first, second, third, and fourth DVD-RWs were prepared. The first DVD-RW was of the type having only a single recording layer. The second, third, and fourth DVD-RWs were of the type having two recording layers, and were produced by different makers respectively. A sample signal was recorded on the first DVD-RW, and the recorded signal was reproduced therefrom. The jitter of the reproduced signal was measured. The sequence of the above steps was reiterated while the first DVD-RW was repetitively changed from one sample to another sample and the ratio "ε" of the erasing power Pe of a laser beam to the recording power Pw thereof was sequentially changed among different values. The recording power Pw of the laser beam was held constant. A sample signal was recorded on the first recording layer of the second DVD-RW, and the recorded signal was reproduced therefrom. The jitter of the reproduced signal was measured. The sequence of the above steps was reiterated while the second DVD-RW was repetitively changed from one sample to another sample and the ratio "ε" of the erasing power Pe of a laser beam to the recording power Pw thereof was sequentially changed among different values. The recording power Pw of the laser beam was held constant. The above experimental procedure was performed for each of the third and fourth DVD-RWs.

Figure 6:
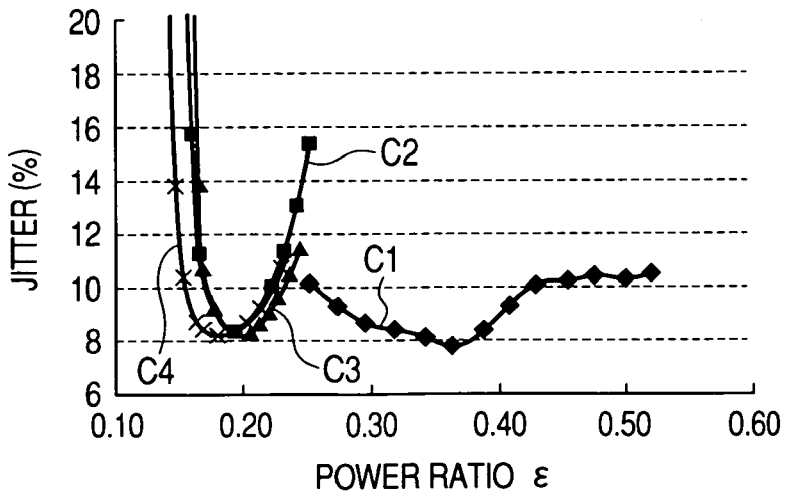
FIG. 6 is a diagram showing a relation between a reproduced-signal jitter and a ratio "ε" of an erasing power Pe of a laser beam to a recording power Pw thereof for each of prior-art DVD-RWs.

FIG. 6 shows the obtained relation between the reproduced-signal jitter and the ratio "ε" of the erasing power Pe of the laser beam to the recording power Pw thereof for each of the first, second, third, and fourth prior-art DVD-RWs. In FIG. 6, the curves C1, C2, C3, and C4 denotes the relations for the first, second, third, and fourth DVD-RWs respectively. It is understood from FIG. 6 that regarding each of the second, third, and fourth prior-art DVD-RWs each having two recording layers, an allowable range of the laser power ratio "ε" which causes an acceptable reproduced-signal jitter is considerably narrow (the curves C2, C3, and C4). There are small differences among the allowable ranges of the laser power ratio "ε" regarding the second, third, and fourth DVD-RWs.

First Embodiment

Figure 7:
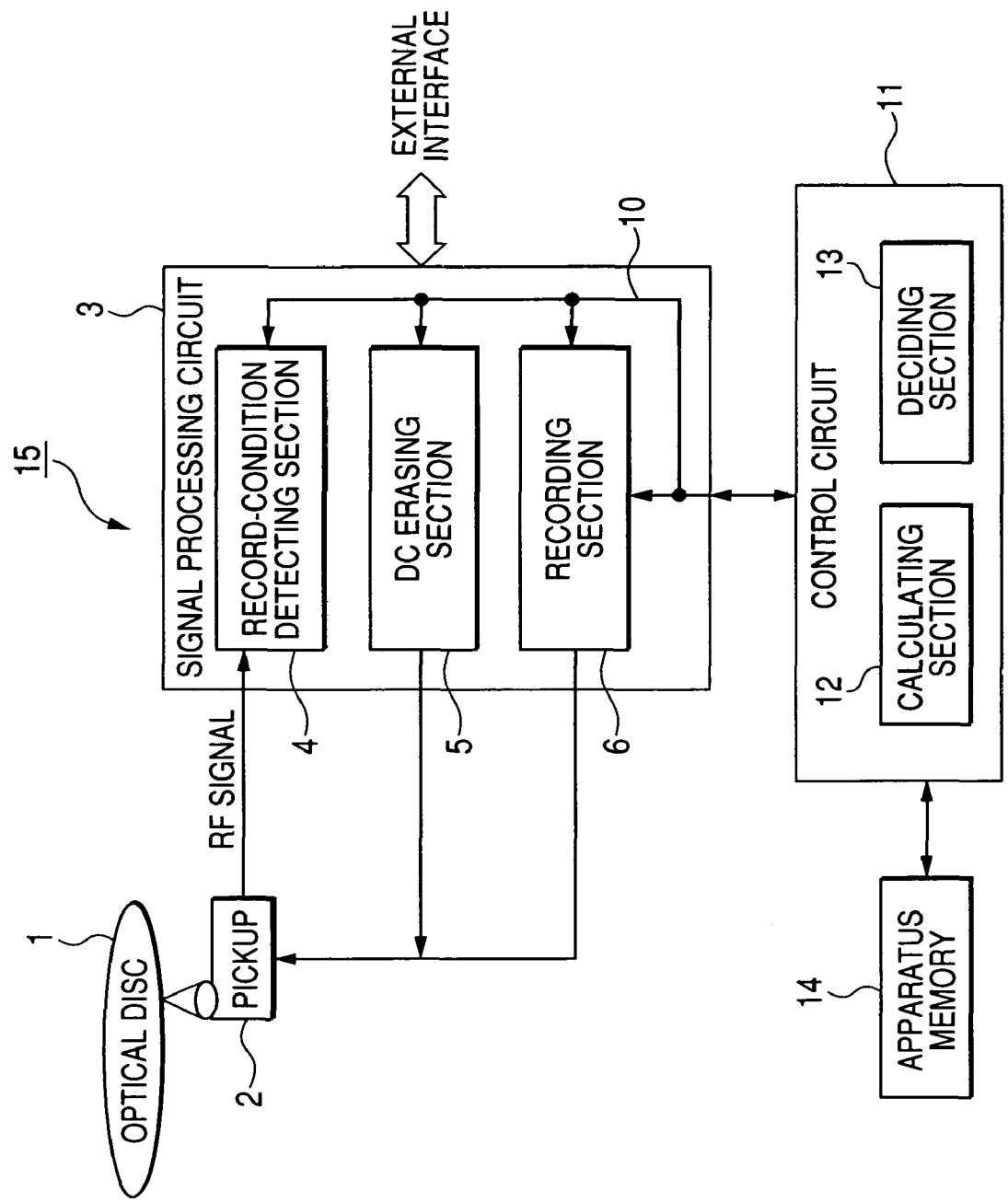
FIG. 7 is a block diagram of an optical-disc drive apparatus according to a first embodiment of this invention.

FIG. 7 shows an optical-disc drive apparatus 15, that is, an apparatus 15 for recording and reproducing a signal on and from an optical disc 1, in a first embodiment of this invention. The optical-disc drive apparatus 15 is designed to perform a novel OPC (optimum power control) procedure and the recording and reproduction of data on and from the optical disc 1. The optical-disc drive apparatus 15 may further perform a general OPC procedure identical or similar to prior-art one.

The optical disc 1 is of a rewritable type. The optical disc 1 has a laminate of recording layers as viewed in an axial direction of the disc, that is, an axial direction of a laser beam scanning the disc. Preferably, the optical disc 1 is of a two-layer single-sided type identical or similar to that in FIG. 1. The optical disc 1 is, for example, a DVD-RW. It should be noted that the optical disc 1 may have only a single recording layer.

The optical-disc drive apparatus 15 includes an optical pickup 2 for applying a forward laser beam to the optical disc 1 and receiving a return laser beam therefrom. The optical pickup 2 modulates the forward laser beam in accordance with a signal (data or information) to be recorded, and applies the modulated laser beam to the optical disc 1 to form recorded marks thereon which represent the signal to be recorded. In this way, the signal is recorded on the optical disc 1. The optical pickup 2 receives a return laser beam from the optical disc 1. The return laser beam contains a signal (data or information) recorded on the optical disc 1. The optical pickup 2 converts the received laser beam into a reproduced RF signal inclusive of the signal recorded on the optical disc 1.

The optical pickup 2 feeds the reproduced RF signal to a signal processing circuit 3. The signal processing circuit 3 subjects the reproduced RF signal to demodulation so that original data recorded on the optical disc 1 will be recovered from the reproduced RF signal. The recovered data is sent from the signal processing circuit 3 to a system control apparatus (not shown) via an external interface. The system control apparatus is, for example, a personal computer or a DVD recorder.

The signal processing circuit 3 includes a record-condition detecting section 4, a DC erasing section 5, and a recording section 6 which are connected to the optical pickup 2.

The demodulation by the signal processing circuit 3 reproduces reference information about the optical disc 1 from the reproduced RF signal. The reproduced reference information represents the structure of the optical disc 1, a recommended recording power of a laser beam, a recommended recording strategy, a ratio "ε" between the recommended recording power of the laser beam and a recommended erasing power thereof, a recommended bias power of the laser beam, and a prescribed coefficient S. The recommended bias power may be included in the recommended recording strategy. The signal processing circuit 3 sends the reproduced reference information to a control circuit 11 via an internal bus 10. The control circuit 11 stores the reproduced reference information in an apparatus memory 14.

It should be noted that reference information about the recommended recording power of a laser beam, the recommended recording strategy, the ratio "ε" between the recommended recording power of the laser beam and the recommended erasing power thereof, the recommended bias power of the laser beam, and the prescribed coefficient S may be originally stored in the apparatus memory 14.

The apparatus memory 14 further stores at least one of signals representing prescribed values being a target modulation factor "m", a target "γ" value, a target asymmetry-related "β" value, and a target asymmetry value "av" forming target conditions.

The control circuit 11 includes a calculating section 12 and a deciding section 13.

During a data recording mode of operation of the optical-disc drive apparatus 15, the control circuit 11 sends recording information to the recording section 6 via the internal bus 10. The recording information represents a designated write address on the optical disc 1, optimum write-purpose powers of a laser beam (an optimum recording power, an optimum erasing power, and an optimum bias power of the laser beam), and a desired recording strategy. The recording section 6 controls the optical pickup 1 in response to the recording information to write data on a portion of the optical disc 1 which corresponds to the designated write address.

During the general and novel OPC procedures, the recording section 6 and the optical pickup 2 operate to repetitively record a test signal on the optical disc 1 under the control by the control circuit 11. A first example of the test signal is a mixture or an arrangement of short mark signals and long mark signals of recording waveform patterns. Preferably, the short mark signals and the long mark signals are 8/16-modulation-result signals. In this case, the short mark signals have a time length of 3T to 7T, and the long mark signals have a time length of 8T to 14T, where T denotes the period of a channel clock signal. A second example of the test signal is a signal of a random pattern in a recording waveform pattern.

Figure 2:
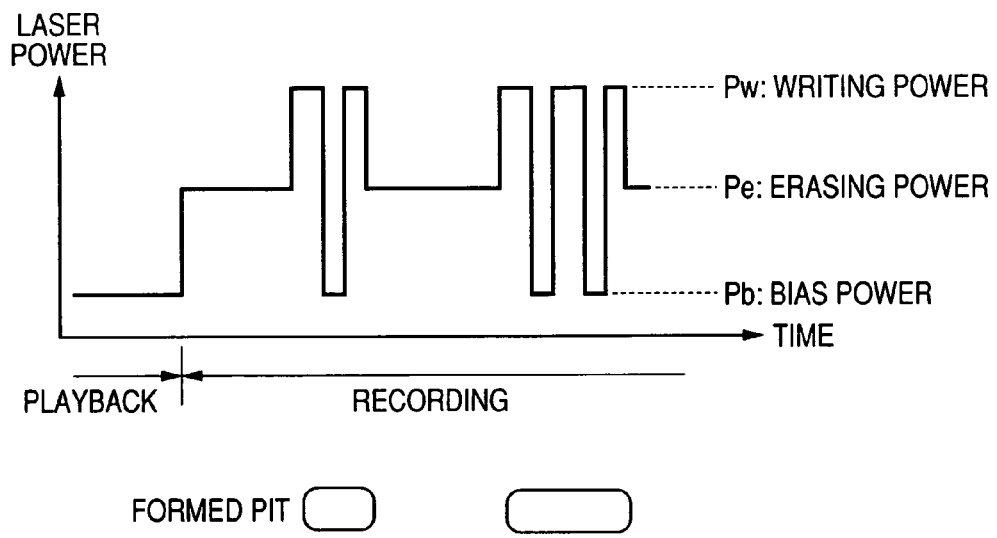
FIG. 2 is a time-domain diagram showing a prior-art waveform of the power of a laser beam applied to an optical disc, and recorded marks (pits) formed in the optical disc.

During the recording of a signal on the optical disc 1, the laser beam applied to the optical disc 1 from the optical pickup 2 takes a writing waveform similar to that in FIG. 2 to repetitively form a recorded mark on the optical disc 1. The writing waveform is defined by a recording power Pw, an erasing power Pe, a bias power Pb, and a recording strategy. The recording power Pw causes an optical-disc portion illuminated with the laser beam to transition from a crystalline state to an amorphous state. The erasing power Pe causes an optical-disc portion illuminated with the laser beam to transition from the amorphous state to the crystalline state. The bias power Pb prevents unwanted diffusion of heat in an optical-disc portion illuminated with the laser beam.

The recording section 6 includes an ALPC (automatic laser power control) circuit for precisely controlling the power of the forward laser beam at one of setting write-purpose powers, that is, setting recording, erasing, and bias powers.

The general OPC procedure is as follows. Under the control by the control circuit 11, the recording section 6 and the optical pickup 2 operate to implement the first half of the general OPC procedure. During the first half of the general OPC procedure, test signals are sequentially recorded on a prescribed or designated block in an OPC area (a PCA) of the optical disc 1 through the use of a forward laser beam of a writing waveform similar to that in FIG. 2 while one of the write-purpose powers of the laser beam is changed among different values on a stepwise basis. The test signals are assigned to the different power values, respectively. During the second half of the general OPC procedure, the recorded test signals are reproduced, and the reproduced test signals are evaluated. An optimum value of one of the write-purpose powers of the laser beam is decided on the basis of the results of the evaluation of the reproduced test signals. During the recording of an information signal on the optical disc 1 which follows the general OPC procedure, one of the write-purpose powers of the laser beam is controlled at the decided optimum value.

The novel OPC procedure is designed to decide an optimum erasing power and an optimum recording power of the laser beam in the way as follows. First, under the control by the control circuit 11, the recording section 6 and the optical pickup 2 cooperate to sequentially record test signals on a designated block in the PCA (the OPC area) of the optical disc 1 while using initial write-purpose powers (initial recording, erasing, and bias powers) of the laser beam and an initial recording strategy in constant recording conditions. The control circuit 11 transfers reference information about a recommended recording power Pind, a recommended recording strategy, a ratio "ε" between the recommended recording power Pind and a recommended erasing power, and a recommended bias power from the apparatus memory 14 to the recording section 6. Alternatively, the optical-disc drive apparatus 15 may read out the reference information from the optical disc 1 before feeding the read-out reference information to the recording section 6. The recording section 6 uses the recommended recording power Pind as the initial recording power of the laser beam. The recording section 6 uses the recommended bias power as the initial bias power of the laser beam. The recommended bias power is equal to, for example, 0.7 mW or less. The recording section 6 uses the recommended recording strategy as the initial recording strategy. The recording section 6 calculates the recommended erasing power ε·Pind from the ratio "ε" and the recommended recording power Pind. The recording section 6 uses the recommended erasing power ε·Pind as the initial erasing power of the laser beam.

Figure 8:
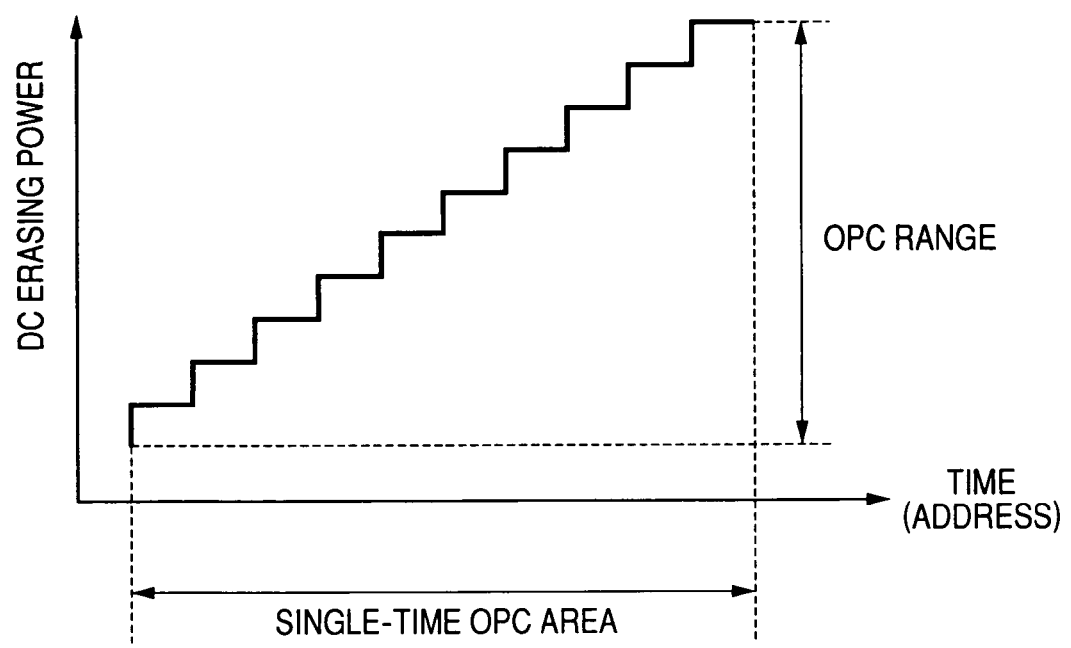
FIG. 8 is a diagram of a pattern in which a DC erasing power of a laser beam is changed among different values.

Thereafter, under the control by the control circuit 11, the DC erasing section 5 and the optical pickup 2 enable the designated block (the test-signal recorded block) in the OPC area of the optical disc 1 to be scanned by the forward laser beam having a DC erasing power which changes among different values in an OPC range on a stepwise basis as shown in FIG. 8. The different values of the DC erasing power are assigned to the recorded test signals, respectively. The control circuit 11 transfers reference information about the recommended recording power Pind, the ratio "ε" between the recommended recording power Pind and the recommended erasing power, and a prescribed coefficient S from the apparatus memory 14 to the DC erasing section 5. Alternatively, the optical-disc drive apparatus 15 may read out the reference information from the optical disc 1 before feeding the read-out reference information to the DC erasing section 5. The DC erasing section 5 calculates a reference DC erasing power value ε·Pind/S from the recommended recording power Pind, the ratio "ε", and the prescribed coefficient S. The OPC range in which the DC erasing power of the laser beam changes is substantially centered at the reference DC erasing power value. The ratio "ε", the recommended recording power Pind, and the prescribed coefficient S represented by the reference information in the apparatus memory 14 are set in harmony with the type of the optical disc 1 and the optical-disc drive apparatus 15. These values "ε", Pind, and S may be updated by a learning function of the optical-disc drive apparatus 15 or the renewal of a control program. In this case, the DC erasing section 5 utilizes the reference information transferred from the apparatus memory 14 with a higher priority.

Subsequently, the optical pickup 2 reproduces the recorded test signals from the optical disc 1 while being controlled by the control circuit 11. The reproduced test signals correspond to the different values of the DC erasing power of the laser beam, respectively. The optical pickup 2 feeds the reproduced test signals to the record-condition detecting section 4 as reproduced RF signals. The reproduced RF signals correspond to the different values of the DC erasing power of the laser beam, respectively. Under the control by the control circuit 11, the record-condition detecting section 4 measures the signal-quality-indicating parameter value of each of the reproduced RF signals. Specifically, the record-condition detecting section 4 measures the modulation factor "m", the "γ" value, the asymmetry-related "β" value, or the asymmetry value "av" of each of the reproduced RF signals. The "γ" value is a derivative of the modulation-factor characteristic. The results of the measurement indicate the record conditions of the test signals, respectively. The measurement results (the measured modulation factors "m", the measured "γ" values, the measured asymmetry-related "β" values, or the measured asymmetry values "av") correspond to the different values of the DC erasing power of the laser beam, respectively. The record-condition detecting section 4 sends the measurement results (the measured values) to the control circuit 11 via the internal bus 10. The deciding section 13 reads out the signal of the target value (the target modulation factor "m", the target "γ" value, the target asymmetry-related "β" value, or the target asymmetry value "av") from the apparatus memory 14. The deciding section 13 compares the measured values with the target value to find one among the measured values which is equal or closest to the target value, that is, which matches the target value. In the case of the measured "γ" values, the deciding section 13 may compare the measured values with each other to find the smallest one or the valley-corresponding one thereamong. In this case, the deciding section 13 finds one among the measured values which matches a target condition. Then, the deciding section 13 finds one among the different values of the DC erasing power of the laser beam which corresponds to the measured value equal or closest to the target value, or which corresponds to the smallest measured value or the valley-corresponding measured value. The deciding section 13 labels the found DC erasing power value as a reference erasing power value. The deciding section 13 notifies the reference erasing power value to the calculating section 12. The calculating section 12 reads out the reference information of the prescribed coefficient S from the apparatus memory 14. The calculating section 12 multiplies the reference erasing power value by the prescribed coefficient S to obtain the optimum value of the erasing power Pe of the laser beam. In this way, the optimum erasing power of the laser beam for the optical disc 1 is decided by the novel OPC procedure. Thereafter, the optimum value of the recording power Pw of the laser beam is calculated from the optimum erasing power value and the ratio "ε". Thus, the optimum recording power of the laser beam for the optical disc 1 is decided by the novel OPC procedure.

Figure 9:
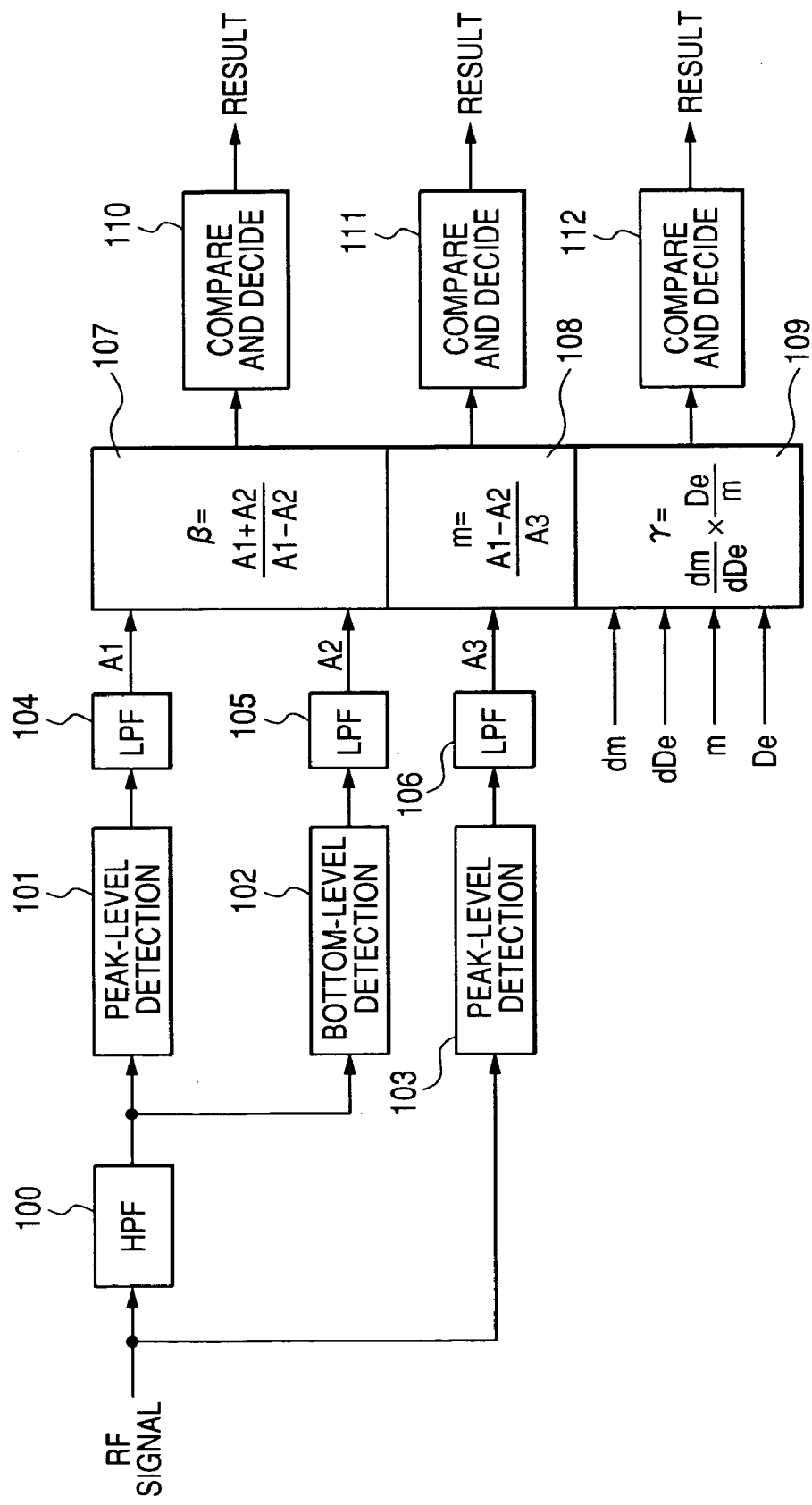
FIG. 9 is a block diagram of portions of a record-condition detecting section and a control circuit in FIG. 7.

FIG. 9 shows portions of the record-condition detecting section 4 and the control circuit 11. The reproduced RF signals which correspond to the different values of the DC erasing power of the laser beam respectively are sequentially fed to a high pass filter 100 and a peak-level detection circuit 103. Each of the reproduced RF signals passes through the high pass filter 100 before reaching a peak-level detection circuit 101 and a bottom-level detection circuit 102. The peak-level detection circuit 101 detects positive-side amplitude peak levels of each reproduced RF signal. A low pass filter 104 following the peak-level detection circuit 101 averages the detected peak levels into a signal value A1. The low pass filter 104 compensates for a drooping characteristic of the peak-level detection circuit 101. The bottom-level detection circuit 102 detects negative-side amplitude bottom levels of each reproduced RF signal. A low pass filter 105 following the bottom-level detection circuit 102 averages the detected bottom levels into a signal value A2. The low pass filter 105 compensates for a drooping characteristic of the bottom-level detection circuit 102. For each of the reproduced RF signals, a calculator 107 following the low pass filters 104 and 105 computes the asymmetry-related "β" value from the signal values A1 and A2 according to an equation as follows:

$$\beta=(A1+A2)/(A1-A2) \qquad (1)$$

The computed asymmetry-related "β" values for the respective reproduced RF signals are labeled as the measured asymmetry-related "β" values therefor. A comparing and deciding circuit 110 following the calculator 107 compares the measured asymmetry-related "β" values with the target asymmetry-related "β" value to find one among the measured asymmetry-related "β" values which is equal or closest to the target asymmetry-related "β" value, that is, which matches the target asymmetry-related "β" value. Then, the comparing and deciding circuit 110 outputs the result of the comparison. The comparing and deciding circuit 110 is provided in the deciding section 13.

Figure 10:
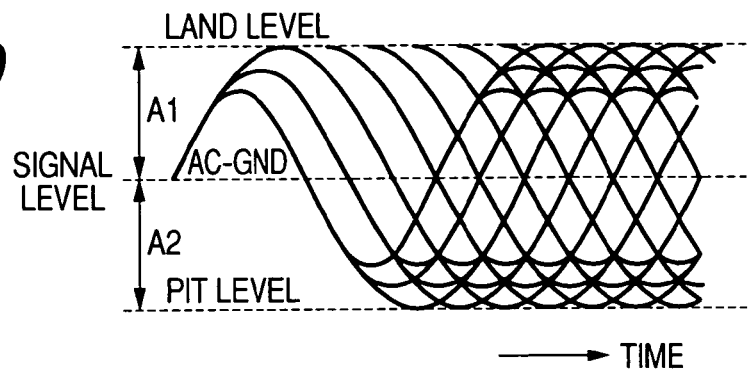
FIG. 10 is a time-domain diagram showing an example of the waveform of a reproduced RF signal.

FIG. 10 shows an example of the waveform of a reproduced RF signal. As shown in FIG. 10, the signal value A1 denotes a mean positive-side amplitude peak level while the signal value A2 denotes a mean negative-side amplitude bottom level.

Regarding a typical DVD-RW having two recording layers, experiments were performed to detect the relation among the number of times of signal recording (signal rewriting) on a first recording layer of the DVD-RW, the quality of every RF signal reproduced from the first recording layer of the DVD-RW, and the power conditions of a laser beam applied to the DVD-RW to record an original signal corresponding to the reproduced RF signal. The first recording layer means one recording layer which is closer to an optical pickup than the other recording layer is. During the experiments, the asymmetry-related "β" value of every reproduced RF signal was measured.

Test signals were sequentially recorded on the first recording layer of a DVD-RW while the recording power Pw of the laser beam was changed among different values, and the recorded signals were reproduced therefrom to generate reproduced signals. The ratio "ε" between the recording power Pw of the laser beam and the erasing power Pe thereof was held constant. The asymmetry-related "β" values of the reproduced signals were measured. The sequence of the above steps was reiterated.

Figure 11:
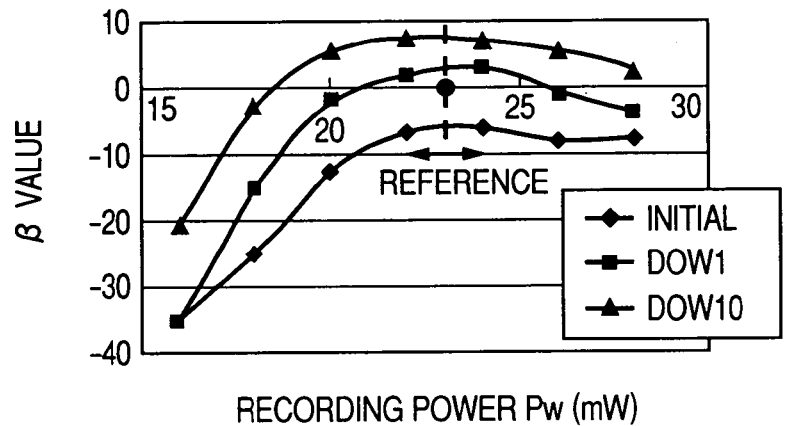
FIG. 11 is a diagram showing a relation among a measured asymmetry-related "β" value, the number of times of signal recording (signal rewriting) on a DVD-RW, and a recording power Pw of a laser beam.

FIG. 11 shows the obtained relation among the measured asymmetry-related "β" value, the number of times of signal recording (signal rewriting) on the DVD-RW, and the recording power Pw of the laser beam. In FIG. 11, the marks INITIAL denote the relation between the measured asymmetry-related "β" value and the recording power Pw of the laser beam used to record the test signals corresponding to the first reproduced signals. The marks DOW1 denote the relation between the measured asymmetry-related "β" value and the recording power Pw of the laser beam used to record the test signals corresponding to the second reproduced signals. The marks DOW10 denote the relation between the measured asymmetry-related "β" value and the recording power Pw of the laser beam used to record the test signals corresponding to the eleventh reproduced signals. As shown in FIG. 11, the measured asymmetry-related "β" values corresponding to the different number of times of signal recording on the DVD-RW peaked substantially at the same recording power Pw of the laser beam. Therefore, the measured asymmetry-related "β" values are effective for the OPC procedure. The recording power at which the measured asymmetry-related "β" values peak can be used as an optimum one or a reference for an optimum one.

Test signals were sequentially recorded on the first recording layer of a DVD-RW while the erasing power Pe of the laser beam was changed among different values, and the recorded signals were reproduced therefrom to generate reproduced signals. The recording power Pw of the laser beam was held constant. The asymmetry-related "β" values of the reproduced signals were measured. The sequence of the above steps was reiterated.

Figure 12:
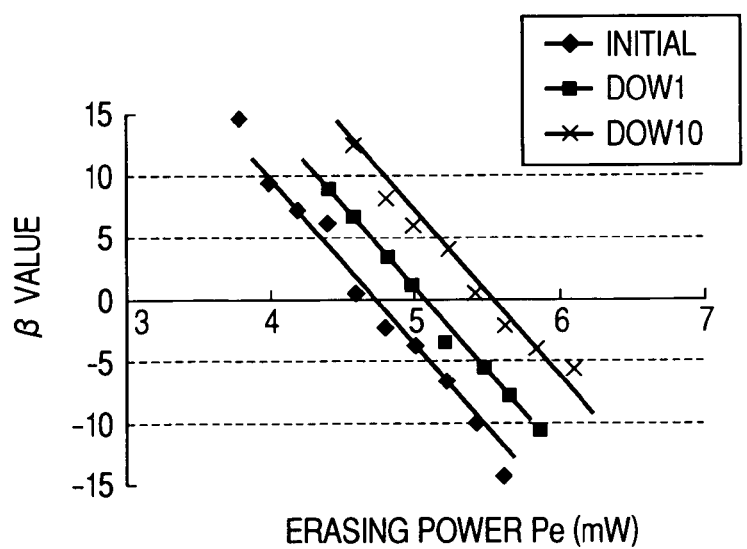
FIG. 12 is a diagram showing a relation among a measured asymmetry-related "β" value, the number of times of signal recording on a DVD-RW, and an erasing power Pe of a laser beam.

FIG. 12 shows the obtained relation among the measured asymmetry-related "β" value, the number of times of signal recording (signal rewriting) on the DVD-RW, and the erasing power Pe of the laser beam. In FIG. 12, the marks INITIAL denote the relation between the measured asymmetry-related "β" value and the erasing power Pe of the laser beam used regarding the recording of the test signals corresponding to the first reproduced signals. The marks DOW1 denote the relation between the measured asymmetry-related "β" value and the erasing power Pe of the laser beam used regarding the recording of the test signals corresponding to the second reproduced signals. The marks DOW10 denote the relation between the measured asymmetry-related "β" value and the erasing power Pe of the laser beam used regarding the recording of the test signals corresponding to the eleventh reproduced signals. As shown in FIG. 12, the measured asymmetry-related "β" value was sensitive to the number of times of signal recording on the DVD-RW. The erasing power Pe had an error of about 0.8 mW for an asymmetry-related "β" value of 0.

Test signals were sequentially recorded on the first recording layer of a DVD-RW. The test-signal recorded area in the DVD-RW was scanned by the forward laser beam having a DC erasing power which changed among different values on a stepwise basis. The different values of the DC erasing power were assigned to the recorded test signals, respectively. Thereafter, the recorded signals were reproduced from the DVD-RW to generate reproduced signals. The asymmetry-related "β" values of the reproduced signals were measured. Test signals were sequentially recorded on the first recording layer of a DVD-RW twice in an overwrite fashion. The test-signal recorded area in the DVD-RW was scanned by the forward laser beam having a DC erasing power which changed among different values on a stepwise basis. The different values of the DC erasing power were assigned to the second recorded test signals, respectively. Thereafter, the second recorded signals were reproduced from the DVD-RW to generate reproduced signals. The asymmetry-related "β" values of the reproduced signals were measured. Test signals were sequentially recorded on the first recording layer of a DVD-RW eleven times in an overwrite fashion. The test-signal recorded area in the DVD-RW was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the DVD-RW to generate reproduced signals. The asymmetry-related "β" values of the reproduced signals were measured.

Figure 13:
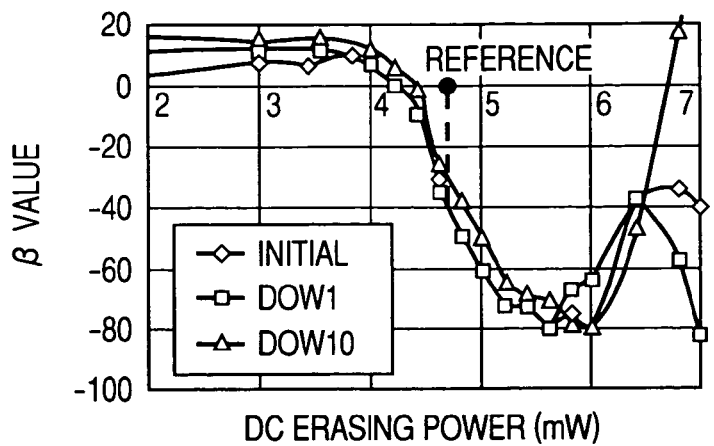
FIG. 13 is a diagram showing a relation among a measured asymmetry-related "β" value, the number of times of signal recording on a DVD-RW, and a DC erasing power of a laser beam.

FIG. 13 shows the obtained relation among the measured asymmetry-related "β" value, the number of times of signal recording (signal rewriting) on the DVD-RW, and the DC erasing power of the laser beam. In FIG. 13, the marks INITIAL denote the relation between the measured asymmetry-related "β" value and the DC erasing power of the laser beam applied onto the first recorded test signals. The marks DOW1 denote the relation between the measured asymmetry-related "β" value and the DC erasing power of the laser beam applied onto the second recorded test signals. The marks DOW10 denote the relation between the measured asymmetry-related "β" value and the DC erasing power of the laser beam applied onto the eleventh recorded test signals. As shown in FIG. 13, the relation between the measured asymmetry-related "β" value and the DC erasing power of the laser beam was substantially independent of the number of times of signal recording (signal rewriting) on the DVD-RW. The measured asymmetry-related "β" value greatly varied as the DC erasing power of the laser beam changed between 4 mW and 5.5 mW.

As previously mentioned, the comparing and deciding circuit 110 compares the measured asymmetry-related "β" values obtained by the calculator 107 with the target asymmetry-related "β" value. The target asymmetry-related "β" value is equal to, for example, −40 in view of the relation in FIG. 13. The deciding section 13 finds one among the measured asymmetry-related "β" values which is equal or closest to the target asymmetry-related "β" value, that is, which matches the target asymmetry-related "β" value. Then, the deciding section 13 finds one among the different values of the DC erasing power of the laser beam which corresponds to the measured asymmetry-related "β" value equal or closest to the target asymmetry-related "β" value. The deciding section 13 labels the found DC erasing power value as a reference erasing power value. The calculating section 12 multiplies the reference erasing power value by a prescribed coefficient Sb (the prescribed coefficient S) to obtain the optimum value of the erasing power Pe of the laser beam. The obtained optimum value of the erasing power Pe had an error of 4% or less with respect to an experimentally detected optimum value.

With reference back to FIG. 9, the peak-level detection circuit 103 detects amplitude peak levels of each reproduced RF signal which are measured from a reference DC level. A low pass filter 106 following the peak-level detection circuit 103 averages the detected peak levels into a signal value A3. The low pass filter 106 compensates for a drooping characteristic of the peak-level detection circuit 103.

For each of the reproduced RF signals, a calculator 108 following the low pass filters 104, 105, and 106 computes the modulation factor "m" from the signal values A1, A2, and A3 according to an equation as follows:

$$m=(A1-A2)/A3 \quad (2)$$

where "A1−A2" ($=I_{14}$) denotes the amplitude value of each reproduced RF signal (specifically, the 14T signal in the 8/16 modulation system), and A3 ($=I_{14H}$) denotes the amplitude value between the reference DC level and the upper-side envelope of each reproduced RF signal. The computed modulation factors "m" of the respective reproduced RF signals are labeled as the measured modulation factors "m" thereof. A comparing and deciding circuit 111 following the calculator 108 compares the measured modulation factors "m" with the target modulation factor "m" to find one among the measured modulation factors "m" which is equal or closest to the target modulation factor "m", that is, which matches the target modulation factor "m". Then, the comparing and deciding circuit 111 outputs the result of the comparison. The comparing and deciding circuit 111 is provided in the deciding section 13.

Figure 14:
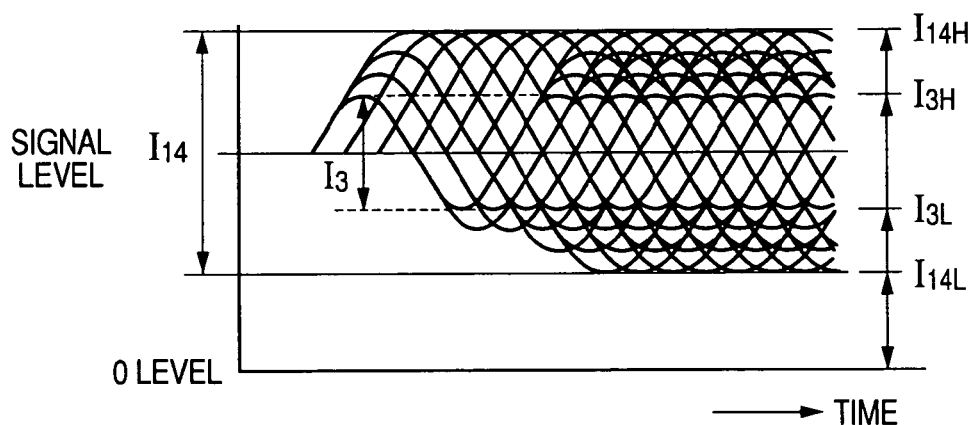
FIG. 14 is a time-domain diagram showing an example of the waveform of a reproduced RF signal.

FIG. 14 shows an example of the waveform of a reproduced RF signal. As shown in FIG. 14, the amplitude value $I_{14}$ of the reproduced RF signal is defined as the level difference between the upper-side envelope and the lower-side envelope thereof. The amplitude value $I_{14H}$ is defined as the level difference between the reference DC level and the upper-side envelope of the reproduced RF signal. The modulation factor "m" of the reproduced RF signal is expressed as $m=I_{14}/I_{14H}$.

Test signals were sequentially recorded on the first recording layer of a DVD-RW while the recording power Pw of the laser beam was changed among different values, and the recorded signals were reproduced therefrom to generate reproduced signals. The ratio "ε" between the recording power Pw of the laser beam and the erasing power thereof was held constant. The modulation factors "m" of the reproduced signals were measured. The sequence of the above steps was reiterated.

Figure 15:
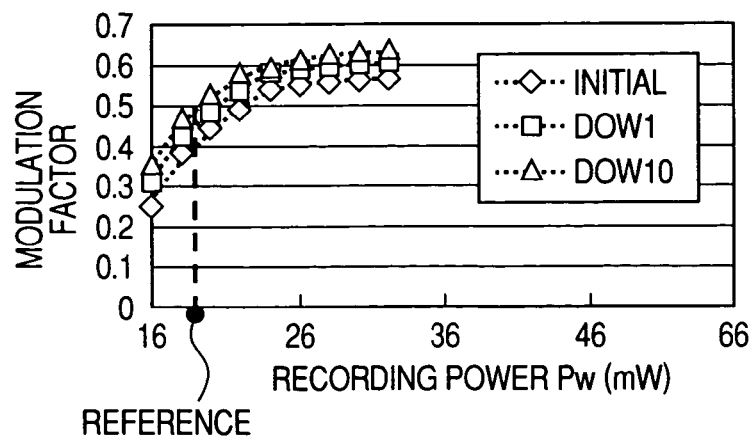
FIG. 15 is a diagram showing a relation among a measured modulation factor "m", the number of times of signal recording on a DVD-RW, and a recording power Pw of a laser beam.

FIG. 15 shows the obtained relation among the measured modulation factor "m", the number of times of signal recording (signal rewriting) on the DVD-RW, and the recording power Pw of the laser beam. In FIG. 15, the marks "◊" (the marks INITIAL) denote the relation between the measured modulation factor "m" and the recording power Pw of the laser beam used to record the test signals corresponding to the first reproduced signals. The marks "□" (the marks DOW1) denote the relation between the measured modulation factor "m" and the recording power Pw of the laser beam used to record the test signals corresponding to the second reproduced signals. The marks "Δ" (the marks DOW10) denote the relation between the measured modulation factor "m" and the recording power Pw of the laser beam used to record the test signals corresponding to the eleventh reproduced signals. As shown in FIG. 15, the measured modulation factor "m"

greatly varied as the recording power Pw of the laser beam changed between 16 mW and 26 mW. The relation between the measured modulation factor "m" and the recording power Pw of the laser beam was substantially independent of the number of times of signal recording on the DVD-RW. In more detail, the relation between the measured modulation factor "m" and the recording power Pw of the laser beam varied in a power range of only about 0.2 mW as the number of times of signal recording on the DVD-RW changed. In cases where an allowable error of the optimum erasing power of the laser beam is about ±0.4 mW, the measured modulation factors "m" are effective for the OPC procedure.

Test signals were sequentially recorded on the first recording layer of a DVD-RW while the erasing power Pe of the laser beam was changed among different values, and the recorded signals were reproduced therefrom to generate reproduced signals. The recording power Pw of the laser beam was held constant. The modulation factors "m" of the reproduced signals were measured. The sequence of the above steps was reiterated.

Figure 16:
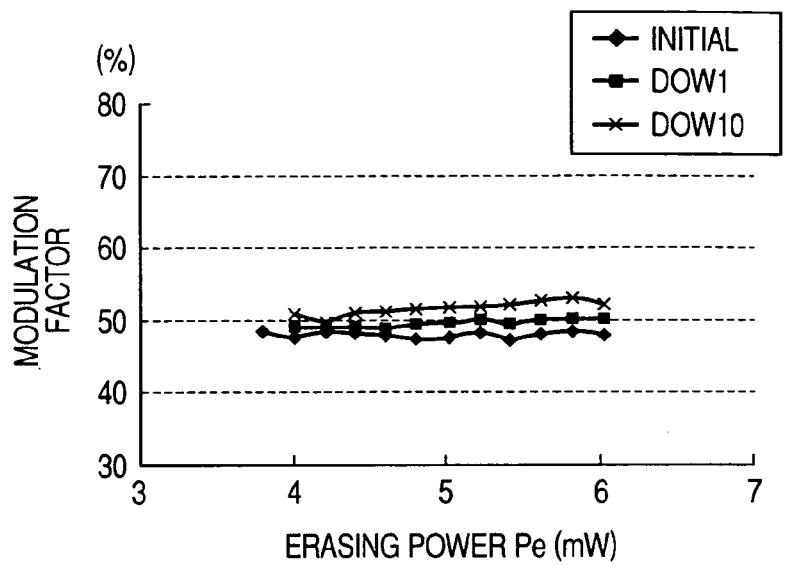
FIG. 16 is a diagram showing a relation among a measured modulation factor "m", the number of times of signal recording on a DVD-RW, and an erasing power Pe of a laser beam.

FIG. 16 shows the obtained relation among the measured modulation factor "m", the number of times of signal recording (signal rewriting) on the DVD-RW, and the erasing power Pe of the laser beam. In FIG. 16, the marks INITIAL denote the relation between the measured modulation factor "m" and the erasing power Pe of the laser beam used regarding the recording of the test signals corresponding to the first reproduced signals. The marks DOW1 denote the relation between the measured modulation factor "m" and the erasing power Pe of the laser beam used regarding the recording of the test signals corresponding to the second reproduced signals. The marks DOW10 denote the relation between the measured modulation factor "m" and the erasing power Pe of the laser beam used regarding the recording of the test signals corresponding to the eleventh reproduced signals. As shown in FIG. 16, the measured modulation factor "m" was substantially independent of the erasing power Pe of the laser beam and the number of times of signal recording on the DVD-RW.

Test signals were sequentially recorded on the first recording layer of a DVD-RW. The test-signal recorded area in the DVD-RW was scanned by the forward laser beam having a DC erasing power which changed among different values on a stepwise basis. The different values of the DC erasing power were assigned to the recorded test signals, respectively. Thereafter, the recorded signals were reproduced from the DVD-RW to generate reproduced signals. The modulation factors "m" of the reproduced signals were measured. Test signals were sequentially recorded on the first recording layer of a DVD-RW twice in an overwrite fashion. The test-signal recorded area in the DVD-RW was scanned by the forward laser beam having a DC erasing power which changed among different values on a stepwise basis. The different values of the DC erasing power were assigned to the second recorded test signals, respectively. Thereafter, the second recorded signals were reproduced from the DVD-RW to generate reproduced signals. The modulation factors "m" of the reproduced signals were measured. Test signals were sequentially recorded on the first recording layer of a DVD-RW eleven times in an overwrite fashion. The test-signal recorded area in the DVD-RW was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the DVD-RW to generate reproduced signals. The modulation factors "m" of the reproduced signals were measured.

Figure 17:
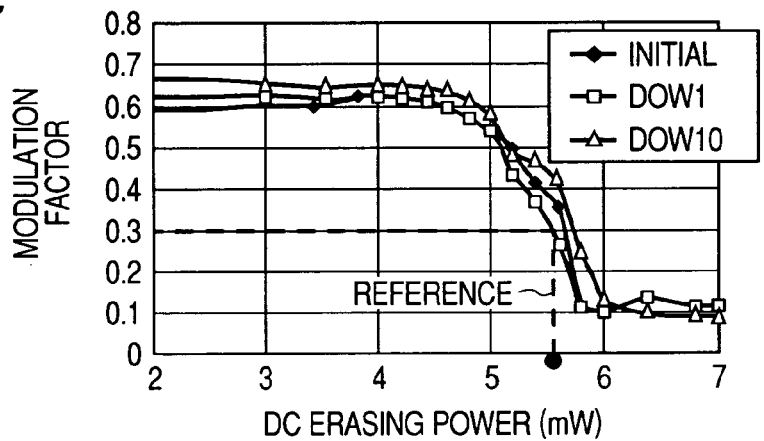
FIG. 17 is a diagram showing a relation among a measured modulation factor "m", the number of times of signal recording on a DVD-RW, and a DC erasing power of a laser beam.

FIG. 17 shows the obtained relation among the measured modulation factor "m", the number of times of signal recording (signal rewriting) on a DVD-RW, and the DC erasing power of the laser beam. In FIG. 17, the marks INITIAL denote the relation between the measured modulation factor "m" and the DC erasing power of the laser beam applied onto the first recorded test signals. The marks DOW1 denote the relation between the measured modulation factor "m" and the DC erasing power of the laser beam applied onto the second recorded test signals. The marks DOW10 denote the relation between the measured modulation factor "m" and the DC erasing power of the laser beam applied onto the eleventh recorded test signals. As shown in FIG. 17, the relation between the measured modulation factor "m" and the DC erasing power of the laser beam was substantially independent of the number of times of signal recording on the DVD-RW. The measured modulation factor "m" greatly varied as the DC erasing power of the laser beam changed between 5 mW and 6 mW.

As previously mentioned, the comparing and deciding circuit 111 compares the measured modulation factors "m" obtained by the calculator 108 with the target modulation factor "m". The target modulation factor "m" is equal to, for example, 0.3 in view of the relation in FIG. 17. The deciding section 13 finds one among the measured modulation factors "m" which is equal or closest to the target modulation factor "m", that is, which matches the target modulation factor "m". Then, the deciding section 13 finds one among the different values of the DC erasing power of the laser beam which corresponds to the measured modulation factor "m" equal or closest to the target modulation factor "m". The deciding section 13 labels the found DC erasing power value as a reference erasing power value. The calculating section 12 multiplies the reference erasing power value by a prescribed coefficient Smod (the prescribed coefficient S) to obtain the optimum value of the erasing power Pe of the laser beam. The obtained optimum value of the erasing power Pe had an error of 5% or less with respect to an experimentally detected optimum value.

The asymmetry value of each of the reproduced RF signals may be used for the novel OPC procedure. The record-condition detecting section 4 computes the asymmetry value "av" from the signal values A1, A2, and A3 according to equations as follows:

$$av=[(I_{14H}+I_{14L})-(I_{3H}+I_{3L})]/2(I_{14H}-I_{14L}) \quad (3)$$

$$I_{14H}=A3 \quad (4)$$

$$I_{14L}=A3-(A1-A2) \quad (5)$$

$$I_{13H}=A3 \quad (6)$$

$$I_{13L}=A3-(A1-A2) \quad (7)$$

where $I_{14H}$, $I_{14L}$, $I_{13H}$, and $I_{3L}$ denote the amplitude values of each RF reproduced signal which are defined as shown in FIG. 14. Test signals result from 8/16 modulation. Specifically, 3T signals and 14T signals in the 8/16 modulation system alternate and form a sequence of signal sets each corresponding to one test signal. In the equations (3)-(7), $I_{14H}$ and $I_{14L}$ denote the amplitude values of each reproduced 14T signal, and $I_{3H}$ and $I_{3L}$ denote the amplitude values of each reproduced 3T signal. The test signals are sequentially recorded on a designated block in the PCA of the first recording layer in the optical disc 1 while the write-purpose powers of the laser beam are changed among different sets of values on a stepwise basis. The test signals are assigned to the different sets of power values, respectively. The recorded test signals are exposed to the forward laser beam having a DC erasing power which changes among different values on a stepwise basis (see FIG. 8). The different values of the DC erasing power are assigned to the recorded test signals, respectively. Thereafter, the recorded test signals are reproduced from the optical disc 1 so that reproduced RF signals originating from the recorded test signals are generated. The signal values A1, A2, and A3 of each of the reproduced RF signals are detected. Then, the asymmetry value "av" of each reproduced RF signal is computed from the detected signal values A1, A2, and A3. As a result, the measured asymmetry values "av" of the reproduced RF signals are obtained. The deciding section 13 compares the measured asymmetry values "av" with a target asymmetry value "av" to find one among the measured asymmetry values "av" which is equal or closest to the target asymmetry value "av", that is, which matches the target asymmetry value "av". Then, the deciding section 13 finds one among the different values of the DC erasing power of the laser beam which corresponds to the measured asymmetry value "av" equal or closest to the target asymmetry value "av". The deciding section 13 labels the found DC erasing power value as a reference erasing power value. The calculating section 12 multiplies the reference erasing power value by a prescribed coefficient Sa (the prescribed coefficient S) to obtain the optimum value of the erasing power Pe of the laser beam. In this way, the optimum erasing power of the laser beam for the optical disc 1 is decided by the novel OPC procedure.

The novel OPC procedure using a "γ" value is as follows. Test signals are sequentially recorded on a designated block in the PCA of the first recording layer in the optical disc 1 while the write-purpose powers of the laser beam remain fixed. The recorded test signals are exposed to the forward laser beam having a DC erasing power which changes among different values on a stepwise basis (see FIG. 8). The different values of the DC erasing power are assigned to the recorded test signals, respectively. Thereafter, the recorded test signals are reproduced from the optical disc 1 so that reproduced RF signals originating from the recorded test signals are generated. The record-condition detecting section 4 detects the modulation factors "m" of the reproduced RF signals respectively. The recording-condition detecting section 4 notifies the control circuit 11 of the detected modulation factors "m" of the reproduced RF signals and the correspondence between the detected modulation factors "m" and the different values of the DC erasing power. The control circuit 11 stores signals representing the detected modulation factors "m" and the correspondence between the detected modulation factors "m" and the different values of the DC erasing power into the apparatus memory 14.

The control circuit 11 computes the difference (the variation quantity) "m" between the modulation factor "m" of each of the reproduced RF signals and the modulation factor "m" of the next reproduced RF signal by referring to the signals in the apparatus memory 14. The control circuit 11 computes the difference (the variation quantity) "dDe" between the DC erasing power value corresponding to each of the reproduced RF signals and the DC erasing power value corresponding to the next reproduced RF signal by referring to the signals in the apparatus memory 14. The control circuit 11 derives the modulation factors "m" of the reproduced RF signals from the signals in the apparatus memory 14. The control circuit 11 derives the DC erasing power values corresponding to the RF reproduced signals.

For each of the reproduced RF signals, a calculator 109 in FIG. 9 computes the "γ" value according to an equation as follows:

$$\gamma=(dm/dDe)/(m/De) \qquad (8)$$

where "dm" denotes the difference (the variation quantity) in modulation factor between the present reproduced RF signal and the next reproduced RF signal; dDe denotes the difference (the variation quantity) between the DC erasing power value corresponding to the present reproduced RF signal and that corresponding to the next reproduced RF signal; "m" denotes the modulation factor of either the present reproduced RF signal or the next reproduced RF signal; and "De" denotes the DC erasing power value corresponding to either the present reproduced RF signal or the next reproduced RF signal. The computed "γ" values are labeled as the measured "γ" values. A comparing and deciding circuit 112 following the calculator 109 compares the measured "γ" values to find the smallest one thereamong or to find a point at which the measured "γ" value is minimized as the DC erasing power value changes. Then, the comparing and deciding circuit 112 outputs the result of the comparison. The comparing and deciding circuit 112 is provided in the deciding section 13.

During the recording of the test signals on the designated block in the PCA of the first recording layer in the optical disc 1, the recording power Pw of the laser beam may be changed among different values on a stepwise basis. In this case, the test signals are assigned to the different values of the recording power Pw respectively, and the exposure of the recorded test signals to a forward laser beam having a varying DC erasing power is omitted. A measured "γ" value based on the recording power Pw is obtained for each of reproduced RF signals. Specifically, for each of the reproduced RF signals, the record-condition detecting section 4 computes the "γ" value according to an equation as follows:

$$\gamma=(dm/dPw)/(m/Pw) \qquad (9)$$

where "dm" denotes the difference (the variation quantity) in modulation factor between the present reproduced RF signal and the next reproduced RF signal; dPw denotes the difference (the variation quantity) between the recording power corresponding to the present reproduced RF signal and that corresponding to the next reproduced RF signal; "m" denotes the modulation factor of either the present reproduced RF signal or the next reproduced RF signal; and "Pw" denotes the recording power corresponding to either the present reproduced RF signal or the next reproduced RF signal. The computed "γ" values are labeled as the measured "γ" values. The deciding circuit 13 compares the measured "γ" values obtained by the record-condition detecting section 4 with the target "γ" value to find one among the measured "γ" values which is equal or closest to the target "γ" value, that is, which matches the target "γ" value. Then, the deciding circuit 13 finds one among the different values of the recording power Pw which corresponds to the measured "γ" value equal or closest to the target "γ" value. The deciding section 13 labels the found recording power value as a reference recording power value. The deciding section 13 notifies the reference recording power value to the calculating section 12. The calculating section 12 reads out reference information of a prescribed coefficient "ρ" from the apparatus memory 14. The calculating section 12 multiplies the reference recording power value by the prescribed coefficient "ρ" to obtain the optimum value of the recording power Pw of the laser beam. Preferably, the prescribed coefficient "ρ" is tuned to the recording power Pw of the laser beam used to record the test signals corresponding to the second reproduced signals which usually have the worst jitters (see FIG. 3). In this case, a reproduced RF signal originating from a signal recorded under the worst conditions has only a small or negligible jitter.

Figure 18:
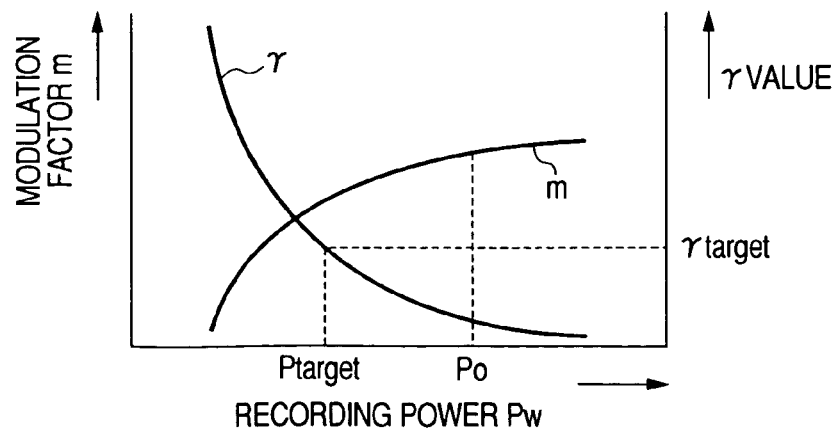
FIG. 18 is a diagram showing a typical relation between a measured modulation factor "m" and a recording power Pw of a laser beam, and a typical relation between a measured "γ" value and a recording power Pw of a laser beam.

FIG. 18 shows a typical relation between the measured modulation factor "m" and the recording power Pw, and a typical relation between the measured "γ" value (obtained by referring to the equation (9)) and the recording power Pw. First, the target "γ" value γtarget is decided. Second, the measured "γ" value corresponding to the target "γ" value γtarget is detected. The recording power value corresponding to the detected "γ" value is labeled as the reference recording power value Ptarget. Third, the reference recording power value Ptarget is multiplied by the prescribed coefficient "ρ" to obtain the optimum value Po of the recording power of the laser beam.

Test signals were sequentially recorded on the first recording layer of a DVD-RW while the recording power Pw of the laser beam was changed among different values and the ratio "ε" between the recording power Pw and the erasing power Pe was held constant. The different values of the recording power Pw were assigned to the recorded test signals, respectively. The recorded test signals were reproduced therefrom to generate reproduced signals. The "γ" values of the reproduced signals were measured through the use of the equation (9). The sequence of the above steps was reiterated.

Figure 19:
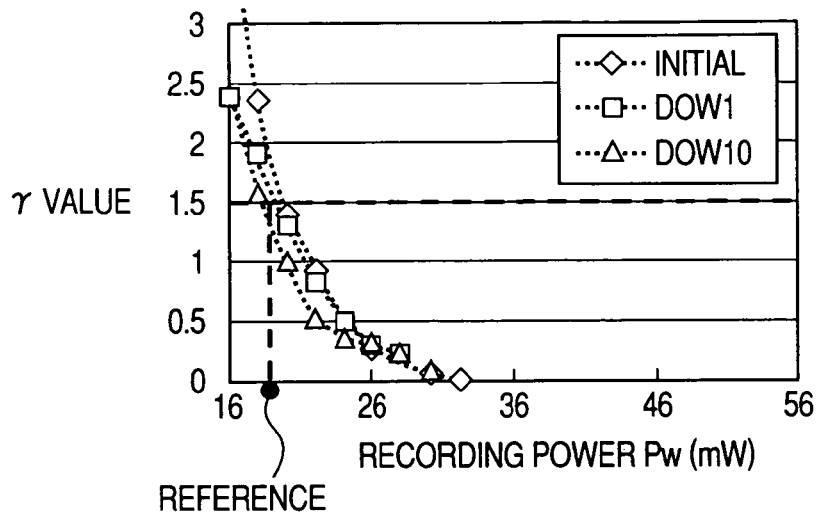
FIG. 19 is a diagram showing a relation among a measured "γ" value, the number of times of signal recording on a DVD-RW, and a recording power Pw of a laser beam.

FIG. 19 shows the obtained relation among the measured "γ" value, the number of times of signal recording (signal rewriting) on the DVD-RW, and the recording power Pw of the laser beam. In FIG. 19, the marks "◇" (the marks INITIAL) denote the relation between the measured "γ" value and the recording power Pw of the laser beam used to record the test signals corresponding to the first reproduced signals. The marks "□" (the marks DOW1) denote the relation between the measured "γ" value and the recording power Pw of the laser beam used to record the test signals corresponding to the second reproduced signals. The marks "▲" (the marks DOW10) denote the relation between the measured "γ" value and the recording power Pw of the laser beam used to record the test signals corresponding to the eleventh reproduced signals. As shown in FIG. 19, the measured "γ" value greatly varied as the recording power Pw of the laser beam changed between 16 mW and 26 mW. The relation between the measured "γ" value and the recording power Pw of the laser beam was substantially independent of the number of times of signal recording on the DVD-RW. Accordingly, the measured "γ" values are effective for the OPC procedure.

Test signals were sequentially recorded on the first recording layer of a DVD-RW while the erasing power Pe of the laser beam was changed among different values and the recording power Pw thereof was held constant. The different values of the easing power Pe were assigned to the recorded test signals, respectively. The recorded test signals were reproduced therefrom to generate reproduced signals. The modulation "γ" values of the reproduced signals were measured through the use of an equation as γ=(dm/dPe)/(m/Pe). The sequence of the above steps was reiterated.

Figure 20:
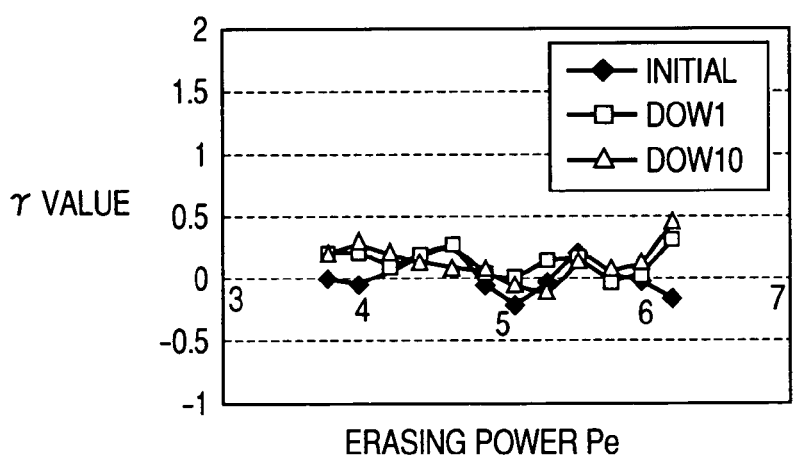
FIG. 20 is a diagram showing a relation among a measured "γ" value, the number of times of signal recording on a DVD-RW, and an erasing power Pe of a laser beam.

FIG. 20 shows the obtained relation among the measured "γ" value, the number of times of signal recording (signal rewriting) on the DVD-RW, and the erasing power Pe of the laser beam. In FIG. 20, the marks INITIAL denote the relation between the measured "γ" value and the erasing power Pe of the laser beam used regarding the recording of the test signals corresponding to the first reproduced signals. The marks DOW1 denote the relation between the measured "γ" value and the erasing power Pe of the laser beam used regarding the recording of the test signals corresponding to the second reproduced signals. The marks DOW10 denote the relation between the measured "γ" value and the erasing power Pe of the laser beam used regarding the recording of the test signals corresponding to the eleventh reproduced signals. As shown in FIG. 20, the measured "γ" value was substantially independent of the erasing power Pe of the laser beam and the number of times of signal recording on the DVD-RW.

Test signals were sequentially recorded on the first recording layer of a DVD-RW. The test-signal recorded area in the DVD-RW was scanned by the forward laser beam having a DC erasing power which changed among different values on a stepwise basis. The different values of the DC erasing power were assigned to the recorded test signals, respectively. Thereafter, the recorded signals were reproduced from the DVD-RW to generate reproduced signals. The modulation factors "m" of the reproduced signals were measured. Then, the "γ" values of the reproduced signals were measured through the use of the equation (8). Test signals were sequentially recorded on the first recording layer of a DVD-RW twice in an overwrite fashion. The test-signal recorded area in the DVD-RW was scanned by the forward laser beam having a DC erasing power which changed among different values on a stepwise basis. The different values of the DC erasing power were assigned to the second recorded test signals, respectively. Thereafter, the second recorded signals were reproduced from the DVD-RW to generate reproduced signals. The modulation factors "m" of the reproduced signals were measured. Then, the "γ" values of the reproduced signals were measured through the use of the equation (8). Test signals were sequentially recorded on the first recording layer of a DVD-RW eleven times in an overwrite fashion. The test-signal recorded area in the DVD-RW was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the DVD-RW to generate reproduced signals. The modulation factors "m" of the reproduced signals were measured. Then, the "γ" values of the reproduced signals were measured through the use of the equation (8).

Figure 21:
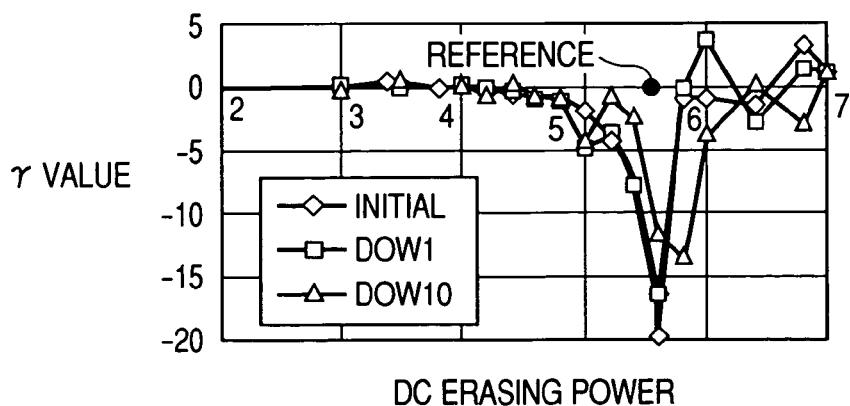
FIG. 21 is a diagram showing a relation among a measured "γ" value, the number of times of signal recording on a DVD-RW, and a DC erasing power of a laser beam.

FIG. 21 shows the obtained relation among the measured "γ" value, the number of times of signal recording (signal rewriting) on a DVD-RW, and the DC erasing power of the laser beam. In FIG. 21, the marks INITIAL denote the relation between the measured "γ" value and the DC erasing power of the laser beam applied onto the first recorded test signals. The marks DOW1 denote the relation between the measured "γ" value and the DC erasing power of the laser beam applied onto the second recorded test signals. The marks DOW10 denote the relation between the measured "γ" value and the DC erasing power of the laser beam applied onto the eleventh recorded test signals. As shown in FIG. 21, the measured "γ" value greatly dipped at a specific value of the DC erasing power of the laser beam. The specific DC erasing power value was substantially independent of the number of times of signal recording on the DVD-RW.

As previously mentioned, the comparing and deciding circuit 112 compares the measured "γ" values obtained by the calculator 109 to find the smallest one thereamong or to find a point at which the measured "γ" value is dipped (minimized) as the DC erasing power value changes. The deciding section 13 detects the DC erasing power value corresponding to the smallest measured "γ" value or the DC erasing power value corresponding to the measured "γ" value at the dipped point. The deciding section 13 labels the detected DC erasing power value as a reference erasing power value. The calculating section 12 multiplies the reference erasing power value by a prescribed coefficient Sg (the prescribed coefficient S) to obtain the optimum value of the erasing power Pe of the laser beam. The obtained optimum value of the erasing power Pe had an error of 3% or less with respect to an experimentally detected optimum value.

Preferably, the prescribed coefficients Sb, Smod, Sg, and Sa are designed for an optimum value of the erasing power Pe of the laser beam used regarding the recording of the test signals corresponding to the second reproduced signals which usually have the worst jitters (see FIG. 3). In this case, a reliable optimum value of the erasing power Pe can be decided in a short time. Preferably, the prescribed coefficients Sb, Smod, Sg, and Sa are chosen depending on the characteristics of the first recording layer in the optical disc 1.

Sample discs A, B, and C of three types, and optical-disc drive apparatuses A, B, C, D were prepared. Each of the sample discs A, B, and C has two recording layers. The optical-disc drive apparatus A repetitively recorded test signals on a sample disc A eleven times. Thereafter, the optical-disc drive apparatus A exposed the recorded test signals to DC erasure using a DC erasing power of the laser beam which varied among different values on a stepwise basis. Subsequently, the optical-disc drive apparatus A reproduced the test signals from the sample disc A, and measured the "γ" values of the reproduced signals which corresponded to the different DC erasing power values respectively. The relation between the measured "γ" value and the DC erasing power value was analyzed to find a point at which the measured "γ" value was dipped (minimized) as the DC erasing power value changed. The DC erasing power value corresponding to the measured "γ" value at the dipped point was labeled as a reference value. A coefficient Sg was calculated according to an equation as Sg=Peopt/Ref where Peout denotes an erasing power in optimum recording conditions and Ref denotes the reference value. In this way, the optical-disc drive apparatus A calculated the coefficient Sg for the sample disc A. The optical-disc drive apparatus A performed the above operation steps for sample discs B and C, and thereby calculated coefficients Sg for the sample discs B and C respectively. Similarly, each of the optical-disc drive apparatuses B, C, and D calculated coefficients Sg for sample discs A, B, and C respectively.

Figure 22:
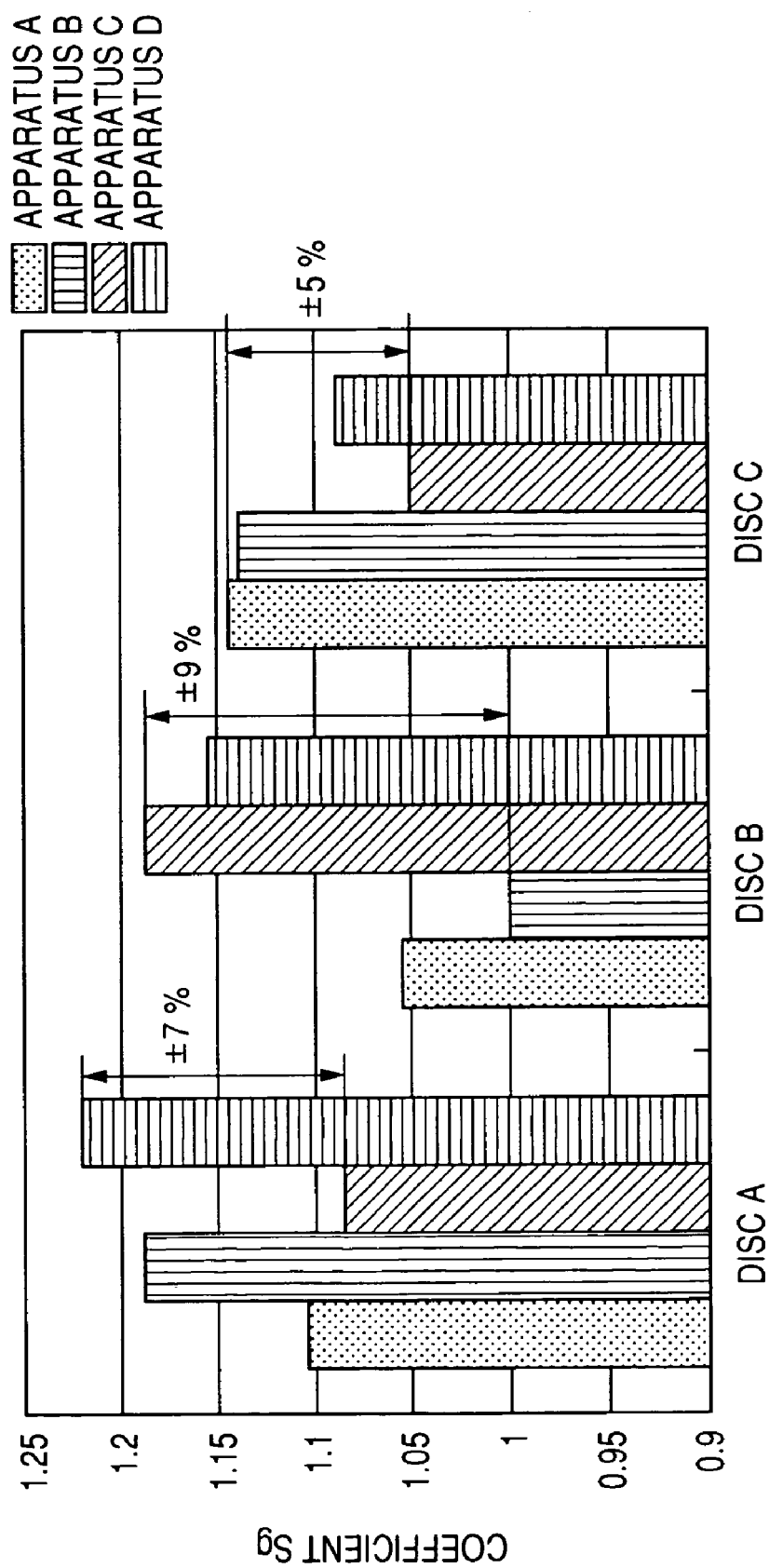
FIG. 22 is a diagram of coefficients Sg calculated by different apparatuses for different sample discs.

FIG. 22 shows the calculated coefficients Sg which vary from sample disc to sample disc, and from apparatus to apparatus. The calculated coefficients Sg in FIG. 22 are between 1.0 and 1.22. Preferably, the prescribed coefficient Sg is in the range of 1.0 to about 1.7. Most preferably, the prescribed coefficient Sg is in the range of 1.0 to about 1.6. A variation in the calculated coefficients Sg obtained by the different apparatuses for each of the sample discs is within ±10%. In the case where variations in characteristics of optical discs are considered and a margin of 20% to 30% is taken with respect to the maximum calculated coefficient Sg (1.22), a preferable upper limit of the prescribed coefficient Sg is in the range of about 1.5 to about 1.6. In the case where a margin of 40% is taken, a preferable upper limit of the prescribed coefficient Sg is equal to about 1.7. When the prescribed coefficient Sg is smaller than 1.0, the erasing power in the optimum recording conditions is lower than the reference value so that a recorded signal tends to be insufficiently erased. Accordingly, a preferable lower limit of the prescribed coefficient Sg is equal to 1.0.

The signal processing circuit 3 and the control circuit 11 may include a computer having a combination of an input/output port, a CPU, a ROM, and a RAM. In this case, the signal processing circuit 3 and the control circuit 11 operate in accordance with a control program (a computer program) stored in the ROM, the RAM, or the apparatus memory 14.

Figure 23:
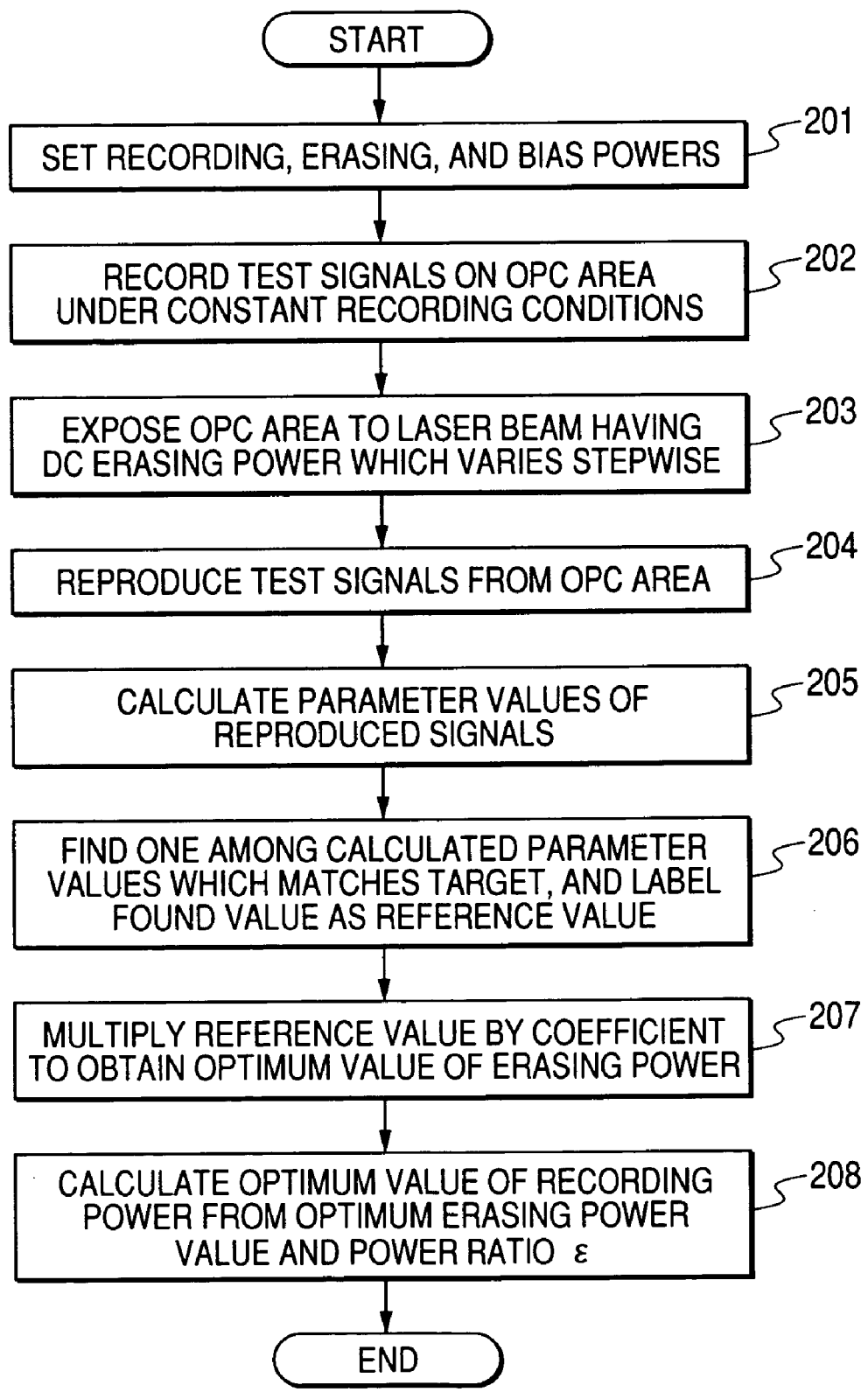
FIG. 23 is a flowchart of a segment of a control program for a signal processing circuit and a control circuit in FIG. 7 which relates to a novel OPC procedure.

FIG. 23 is a flowchart of a segment of the control program for the signal processing circuit 3 and the control circuit 11 which relates to the novel OPC procedure. The program segment in FIG. 23 is started when the optical-disc drive apparatus 15 is requested to perform the novel OPC procedure. Before the start of the program segment in FIG. 23, a subroutine of the control program may be executed to initialize the PCA in the first recording layer of the optical disc 1 with a high laser power.

With reference to FIG. 23, a first step 201 of the program segment reads out, from the apparatus memory 14, reference information about a recommended recording power Pind, a recommended recording strategy, a ratio "ε" between the recommended recording power Pind and a recommended erasing power, and a recommended bias power. Alternatively, the step 201 may control the optical pickup 2 to read out the reference information from the optical disc 1. The step 201 labels the recommended recording power as a setting recording power. The step 201 computes a recommended erasing power from the recommended recording power and the ratio "ε". The step 201 labels the computed erasing power as a setting erasing power. The step 201 labels the recommended bias power as a setting bias power.

A step 202 following the step 201 sets the waveform pattern of a test signal to that of a random pattern signal (an EFM signal). The step 202 controls the optical pickup 2 to sequentially record test signals on a designated block in the PCA (the OPC area) of the first recording layer of the optical disc 1 while fixing write-purpose powers (recording, erasing, and bias powers) of the laser beam and a recording strategy in constant recording conditions. The fixed write-purpose powers are equal to the setting recording, erasing, and bias powers obtained by the step 201.

A step 203 subsequent to the step 202 controls the optical pickup 2 to expose the designated block (the test-signal recorded block) in the PCA of the optical disc 1 to the forward laser beam having a DC erasing power which changes among different values in an OPC range on a stepwise basis as shown in FIG. 8. The different values of the DC erasing power are assigned to the recorded test signals, respectively. The step 203 loads the apparatus memory 14 with signals representing the different values of the DC erasing power.

A step 204 following the step 203 controls the optical pickup 2 to reproduce the recorded test signals from the optical disc 1. The step 204 receives the reproduced test signals as reproduced RF signals. The reproduced RF signals correspond to the different values of the DC erasing power of the laser beam, respectively.

A step 205 subsequent to the step 204 measures the signal-quality-indicating parameter values of the respective reproduced RF signals. Specifically, the step 205 measures the modulation factors "m", the "γ" values, the asymmetry-related "β" values, or the asymmetry values "av" of the respective reproduced RF signals. The measurement results (the measured values, that is, the measured modulation factors "m", the measured "γ" values, the measured asymmetry-related "β" values, or the measured asymmetry values "av") correspond to the different values of the DC erasing power of the laser beam, respectively. The step 205 loads the apparatus memory 14 with signals representing the measurement results.

A step 206 following the step 205 reads out the signal of the target value (the target modulation factor "m", the target "γ" value, the target asymmetry-related "β" value, or the target asymmetry value "av") from the apparatus memory 14. The step 206 compares the measured values with the target value to find one among the measured values which is equal or closest to the target value, that is, which matches the target value. In the case of the measured "γ" values, the step 206 may compare the measured values with each other to find the smallest one or the valley-corresponding one thereamong. In this case, step 206 finds one among the measured values which matches the target condition.

A step 207 subsequent to the step 206 finds one among the different values of the DC erasing power of the laser beam which corresponds to the measured value equal or closest to the target value, or which corresponds to the smallest measured value or the valley-corresponding measured value. The step 207 labels the found DC erasing power value as a reference erasing power value. The step 207 reads out the reference information of the prescribed coefficient S (the prescribed coefficient Sb, Smod, Sg, or Sa) from the apparatus memory 14. The step 207 multiplies the reference erasing power value by the prescribed coefficient S to obtain the optimum value of the erasing power Pe of the laser beam.

A step 208 following the step 207 calculates the optimum value of the recording power Pw of the laser beam from the optimum erasing power value and the ratio "ε". The step 208 labels the recommended bias power as the optimum value of the bias power Pb of the laser beam. As a result, the optimum write-purpose powers (the optimum recording, erasing, and bias powers Pw, Pe, and Pb) of the laser beam are decided. After the step 209, the current execution cycle of the program segment ends.

An allowable setting range of the recording power Pw of the laser beam is relatively wide as shown in FIG. 4. Regarding an optical disc having two recording layers, an allowable setting range of the erasing power Pe of the laser beam focused onto the first recording layer is considerably narrow as shown in FIG. 5. During the novel OPC procedure, the optimum value of the erasing power Pe of the laser beam is decided first. Then, the optimum value of the recording power Pw of the laser beam is decided by using the optimum erasing power value and the ratio "ε". Thus, it is possible to reduce the number of times a set of test signals is recorded on an optical disc to perform an OPC procedure. Therefore, the starting time of the optical-disc drive apparatus 15 is relatively short.

Second Embodiment

A second embodiment of this invention is similar to the first embodiment thereof except for design changes mentioned hereafter.

As the test-signal recorded portion of the optical disc 1 is exposed to DC erasure using the forward laser beam having a DC erasing power which increases stepwise, short recorded marks are erased first and long recorded marks are erased second and the reproduced RF signal amplitude decreases. Thus, the long recorded marks are higher than the short ones in remaining degree. The detection of peak levels and bottom levels of a reproduced RF signal causes the detection of the amplitude of corresponding recorded marks. Therefore, the detected amplitude of the recorded marks mainly reflects the remaining degree concerning long recorded marks.

To attain a high detection accuracy, the second embodiment of this invention uses a test signal formed by only a longest mark signal (a 14T signal in the case of an 8/16-modulation-result signal).

Test signals being 14T signals were sequentially recorded on the first recording layer of a DVD-RW. The test-signal recorded area in the DVD-RW was scanned by the forward laser beam having a DC erasing power which changed among different values on a stepwise basis. The different values of the DC erasing power were assigned to the recorded test signals, respectively. Thereafter, the recorded signals were reproduced from the DVD-RW to generate reproduced signals. The modulation factors "m" of the reproduced signals were measured. Then, the "γ" values of the reproduced signals were measured through the use of the equation (8). Test signals being 14T signals were sequentially recorded on the first recording layer of a DVD-RW twice in an overwrite fashion. The test-signal recorded area in the DVD-RW was scanned by the forward laser beam having a DC erasing power which changed among different values on a stepwise basis. The different values of the DC erasing power were assigned to the second recorded test signals, respectively. Thereafter, the second recorded signals were reproduced from the DVD-RW to generate reproduced signals. The modulation factors "m" of the reproduced signals were measured. Then, the "γ" values of the reproduced signals were measured through the use of the equation (8). Test signals being 14T signals were sequentially recorded on the first recording layer of a DVD-RW eleven times in an overwrite fashion. The test-signal recorded area in the DVD-RW was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the DVD-RW to generate reproduced signals. The modulation factors "m" of the reproduced signals were measured. Then, the "γ" values of the reproduced signals were measured through the use of the equation (8).

Figures 24, 25:
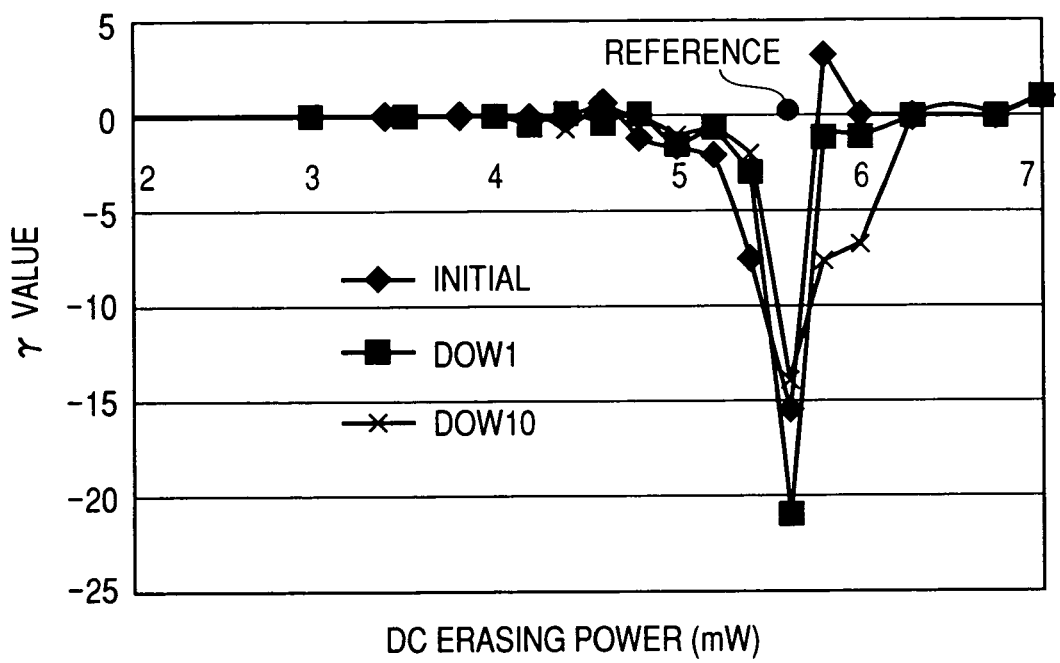
FIG. 24 is a diagram showing a relation among a measured "γ" value, the number of times of signal recording on a DVD-RW, and a DC erasing power of a laser beam.
FIG. 25 is a diagram showing a table indicating the assignment of code words to different values of a coefficient S (Sb, Smod, Sg, or Sa).

FIG. 24 shows the obtained relation among the measured "γ" value, the number of times of signal recording (signal rewriting) on a DVD-RW, and the DC erasing power of the laser beam. In FIG. 24, the marks INITIAL denote the relation between the measured "γ" value and the DC erasing power of the laser beam applied onto the first recorded test signals. The marks DOW1 denote the relation between the measured "γ" value and the DC erasing power of the laser beam applied onto the second recorded test signals. The marks DOW10 denote the relation between the measured "γ" value and the DC erasing power of the laser beam applied onto the eleventh recorded test signals. As shown in FIG. 24, the measured "γ" value greatly dipped at a specific value of the DC erasing power of the laser beam. The specific DC erasing power value was substantially independent of the number of times of signal recording on the DVD-RW.

The specific DC erasing power value was labeled as a reference erasing power value. The reference erasing power value was multiplied by a prescribed coefficient Sg (a prescribed coefficient S) to obtain the optimum value of the erasing power Pe of the laser beam. The obtained optimum value of the erasing power Pe had an error of 2% or less with respect to an experimentally detected optimum value.

As previously mentioned, the test signal is formed by only the longest mark signal (the 14T signal in the case of an 8/16-modulation system). Alternatively, the test signal may be formed by long mark signals including the longest mark signal. The long mark signals are selected from an 8T signal to a 14T signal in the case of an 8/16-modulation system. The test signal may be formed by a long mark signal selected from an 8T signal to a 14T signal in the case of an 8/16-modulation system. The novel OPC procedure using the test signal formed by the long mark signal or signals can accurately decide the optimum values of the erasing and recording powers Pe and Pw of the laser beam.

Third Embodiment

A third embodiment of this invention is similar to the first or second embodiment thereof except for design changes mentioned hereafter.

According to a third embodiment of this invention, reference information or signals representing prescribed coefficients Sb, Smod, Sg, and Sa are recorded on an optical disc 1 in advance as a portion of land pre-pit (LPP) information or track groove information.

Specifically, during the manufacture of the optical disc 1, coded signals representing the prescribed coefficients Sb, Smod, Sg, and Sa are recorded in an inerasable fashion on land pre-pits in a prescribed address or a prescribed-address portion of a control data zone in the optical disc 1. The land pre-pits storing the coded signals are located in a PCA, an RMA, or another area of the optical disc 1.

FIG. 25 shows a table indicating the assignment of code words to different values of a coefficient S (Sb, Smod, Sg, or Sa). Preferably, data representing the table in FIG. 25 is stored in the apparatus memory 14 as a part of the control program. A coded signal is read out from an optical disc 1. A code word is derived from the read-out coded signal. The table in FIG. 25 is searched for a value of the coefficient S to which the derived code word is assigned. In this way, the value of the coefficient S is decided or recovered.

Figures 26, 27:
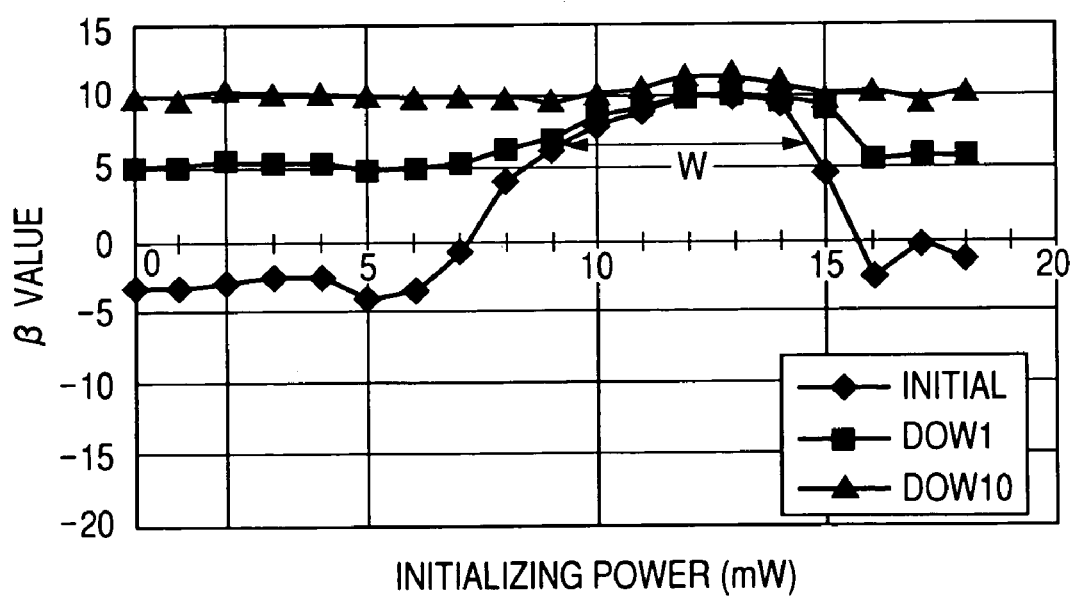
FIG. 26 is a diagram showing a table indicating on-disc addresses in which coded signals representing prescribed coefficients Sb, Smod, Sg, and Sa are recorded.
FIG. 27 is a diagram showing a relation among a measured asymmetry-related "β" value, the number of times of signal recording on an optical disc, and an initializing power of a laser beam.

FIG. 26 shows a table indicating on-disc addresses in which the coded signals representing the prescribed coefficients Sb, Smod, Sg, and Sa are recorded. In FIG. 26, an address byte position N on an optical disc 1 stores the coded signal representing the prescribed coefficient Smod, and an address byte position N+1 stores the coded signal representing the prescribed coefficient Sb. Furthermore, an address byte position N+2 stores the coded signal representing the prescribed coefficient Sg, and an address byte position N+3 stores the coded signal representing the prescribed coefficient Sa. For example, a code word "06h" stored in the address byte position N indicates that the prescribed coefficient Smod is equal to 1.3 (see FIG. 25).

The value of the coefficient Sg may be calculated without referring to the table in FIG. 25. In this case, a coded signal is read out from the address byte position N+2 in an optical disc 1. A code word is derived from the read-out coded signal. The value of the coefficient Sg is computed according to a predetermined equation as follows:

$$Sg = 0.99 + 0.01 CV$$

where CV denotes the value of the derived code word. Preferably, code words for the coefficient Sg are "01h" to "3Fh" in hexadecimal notation. In this case, the computed coefficient Sg is in the range of 1.0 to 1.62.

As previously mentioned, signals representing prescribed coefficients Sb, Smod, Sg, and Sa are recorded on an optical disc 1 in advance. Therefore, the novel OPC procedure can be completed by referring to only information and signals read out from the optical disc 1. Accordingly, even in the case where the optical disc 1 is of a new type, the optimum write-purpose powers of the laser beam can be decided through the novel OPC procedure.

Fourth Embodiment

A fourth embodiment of this invention is similar to one of the first to third embodiments thereof except for design changes mentioned hereafter.

The fourth embodiment of this invention initializes the PCA in the first recording layer of an optical disc 1 with a high laser power before performing the novel OPC procedure. The initialization is implemented by controlling the optical pickup 2 to illuminate the PCA with a forward laser beam having a prescribed high DC erasing power. As a result of the initialization, the modulation factors "m", the asymmetry-related "β" values, the "γ" values, and the asymmetry values "av" of reproduced RF signals can be more accurately measured.

The PCA in the first recording layer of an optical disc (a DVD-RW) was initialized by the exposure to a forward laser beam having a high DC erasing power (an initializing power). Test signals were sequentially recorded on the PCA in the optical disc, and the recorded signals were reproduced therefrom to generate reproduced signals. The asymmetry-related "β" values of the reproduced signals were measured. The recording and reproduction of the test signals, and the measurement of the asymmetry-related "β" values were repeated eleven times. The sequence of the above steps was reiterated while the initializing power of the laser beam was changed among different values.

FIG. 27 shows the obtained relation among the measured asymmetry-related "β" value, the number of times of signal recording (signal rewriting) on the optical disc, and the initializing power of the laser beam. In FIG. 27, the marks INITIAL denote the relation between the initializing power of the laser beam and the measured asymmetry-related "β" value regarding the first reproduced signals. The marks DOW1 denote the relation between the initializing power of the laser beam and the measured asymmetry-related "β" value regarding the second reproduced signals. The marks DOW10 denote the relation between the initializing power of the laser beam and the measured asymmetry-related "β" value regarding the eleventh reproduced signals. In FIG. 27, an initializing power of 0 mW means the absence of the initialization of the PCA of the optical disc. As shown in FIG. 27, in the case where the initializing power of the laser beam was equal to or less than 8 mW, the relation between the measured asymmetry-related "β" value and the initializing power greatly varied as the number of times of signal recording on the optical disc changed. On the other hand, in the case where the initializing power of the laser beam was in the range of 8 mW to 14.5 mW, the relation between the measured asymmetry-related "β" value and the initializing power was substantially independent of the number of times of signal recording on the optical disc. Preferably, the initializing power of the laser beam is appreciably higher than the optimum erasing power Pe thereof which is equal to 5.85 mW. Accordingly, a preferable range of the initializing power extends between 9 mW and 14.5 mW. Desirably, the initializing power of the laser beam is equal to the optimum erasing power Pe multiplied by a value of 1.5 to 2.5.

Test signals were sequentially recorded on the PCA in the first recording layer of an optical disc (a DVD-RW) without pre-initialization of the PCA. The test-signal recorded area in the optical disc was scanned by the forward laser beam having a DC erasing power which changed among different values on a stepwise basis. The different values of the DC erasing power were assigned to the recorded test signals, respectively. Thereafter, the recorded signals were reproduced from the optical disc to generate reproduced signals. The asymmetry-related "β" values of the reproduced signals were measured. Test signals were sequentially recorded on the PCA in the first recording layer of an optical disc twice in an overwrite fashion without pre-initialization of the PCA. The test-signal recorded area in the optical disc was scanned by the forward laser beam having a DC erasing power which changed among different values on a stepwise basis. The different values of the DC erasing power were assigned to the second recorded test signals, respectively. Thereafter, the second recorded signals were reproduced from the optical disc to generate reproduced signals. The asymmetry-related "β" values of the reproduced signals were measured. Test signals were sequentially recorded on the PCA in the first recording layer of an optical disc eleven times in an overwrite fashion without pre-initialization of the PCA. The test-signal recorded area in the optical disc was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the optical disc to generate reproduced signals. The asymmetry-related "β" values of the reproduced signals were measured.

Figure 28:
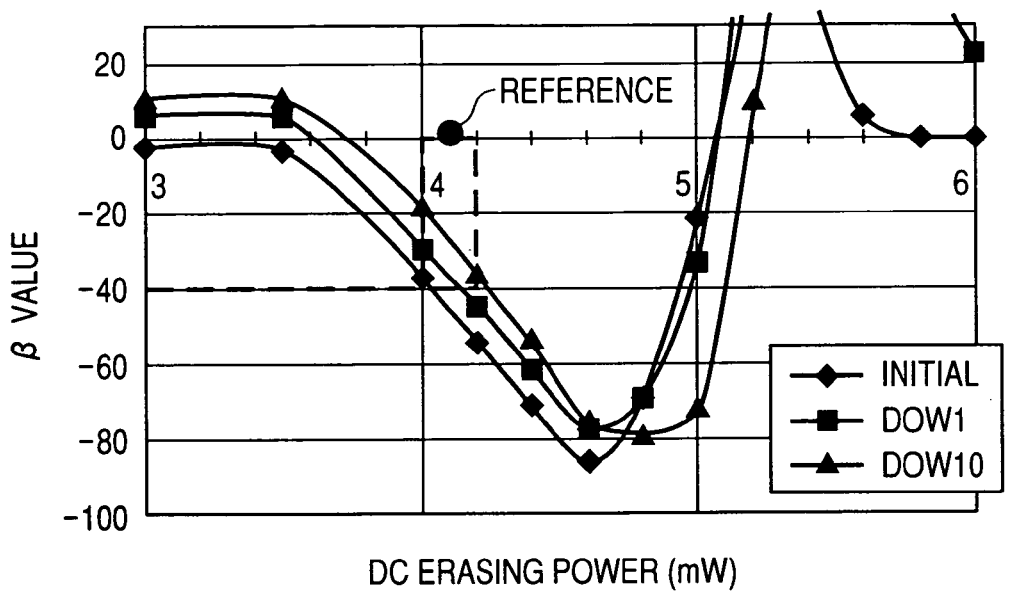
FIG. 28 is a diagram showing a relation among a measured asymmetry-related "β" value, the number of times of signal recording on an optical disc, and a DC erasing power of a laser beam in the absence of initialization with a high laser power.

FIG. 28 shows the obtained relation among the measured asymmetry-related "β" value, the number of times of signal recording (signal rewriting) on an optical disc, and the DC erasing power of the laser beam. In FIG. 28, the marks INITIAL denote the relation between the measured asymmetry-related "β" value and the DC erasing power of the laser beam applied onto the first recorded test signals. The marks DOW1 denote the relation between the measured asymmetry-related "β" value and the DC erasing power of the laser beam applied onto the second recorded test signals. The marks DOW10 denote the relation between the measured asymmetry-related "β" value and the DC erasing power of the laser beam applied onto the eleventh recorded test signals.

The PCA in the first recording layer of an optical disc (a DVD-RW) was initialized by applying thereto a forward laser beam having a power of 13 mW. Then, test signals were sequentially recorded on the PCA in the optical disc. The test-signal recorded area in the optical disc was scanned by the forward laser beam having a DC erasing power which changed among different values on a stepwise basis. The different values of the DC erasing power were assigned to the recorded test signals, respectively. Thereafter, the recorded signals were reproduced from the optical disc to generate reproduced signals. The asymmetry-related "β" values of the reproduced signals were measured. The PCA in the first recording layer of an optical disc was initialized by applying thereto a forward laser beam having a power of 13 mW. Then, test signals were sequentially recorded on the PCA in the optical disc twice in an overwrite fashion. The test-signal recorded area in the optical disc was scanned by the forward laser beam having a DC erasing power which changed among different values on a stepwise basis. The different values of the DC erasing power were assigned to the second recorded test signals, respectively. Thereafter, the second recorded signals were reproduced from the optical disc to generate reproduced signals. The asymmetry-related "β" values of the reproduced signals were measured. The PCA in the first recording layer of an optical disc was initialized by applying thereto a forward laser beam having a power of 13 mW. Then, test signals were sequentially recorded on the PCA in the optical disc eleven times in an overwrite fashion. The test-signal recorded area in the optical disc was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the optical disc to generate reproduced signals. The asymmetry-related "β" values of the reproduced signals were measured.

Figure 29:
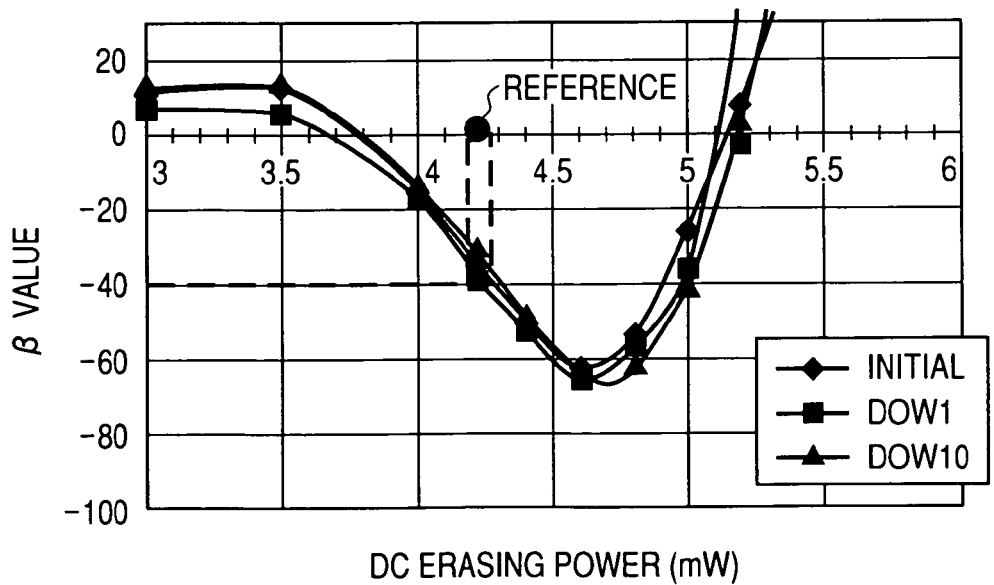
FIG. 29 is a diagram showing a relation among a measured asymmetry-related "β" value, the number of times of signal recording on an optical disc, and a DC erasing power of a laser beam in the presence of initialization with a high laser power.

FIG. 29 shows the obtained relation among the measured asymmetry-related "β" value, the number of times of signal recording (signal rewriting) on an optical disc, and the DC erasing power of the laser beam. In FIG. 29, the marks INITIAL denote the relation between the measured asymmetry-related "β" value and the DC erasing power of the laser beam applied onto the first recorded test signals. The marks DOW1 denote the relation between the measured asymmetry-related "β" value and the DC erasing power of the laser beam applied onto the second recorded test signals. The marks DOW10 denote the relation between the measured asymmetry-related "β" value and the DC erasing power of the laser beam applied onto the eleventh recorded test signals.

It is understood from FIGS. 28 and 29 that the initialization of the PCA in an optical disc with a high laser power can enhance the reliability and accuracy of the measured asymmetry-related "β" values.

Test signals were sequentially recorded on the PCA in the first recording layer of an optical disc (a DVD-RW) without pre-initialization of the PCA. The test-signal recorded area in the optical disc was scanned by the forward laser beam having a DC erasing power which changed among different values on a stepwise basis. The different values of the DC erasing power were assigned to the recorded test signals, respectively. Thereafter, the recorded signals were reproduced from the optical disc to generate reproduced signals. The modulation factors "m" of the reproduced signals were measured. Test signals were sequentially recorded on the PCA in the first recording layer of an optical disc twice in an overwrite fashion without pre-initialization of the PCA. The test-signal recorded area in the optical disc was scanned by the forward laser beam having a DC erasing power which changed among different values on a stepwise basis. The different values of the DC erasing power were assigned to the second recorded test signals, respectively. Thereafter, the second recorded signals were reproduced from the optical disc to generate reproduced signals. The modulation factors "m" of the reproduced signals were measured. Test signals were sequentially recorded on the PCA in the first recording layer of an optical disc eleven times in an overwrite fashion without pre-initialization of the PCA. The test-signal recorded area in the optical disc was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the optical disc to generate reproduced signals. The modulation factors "m" of the reproduced signals were measured.

Figure 30:
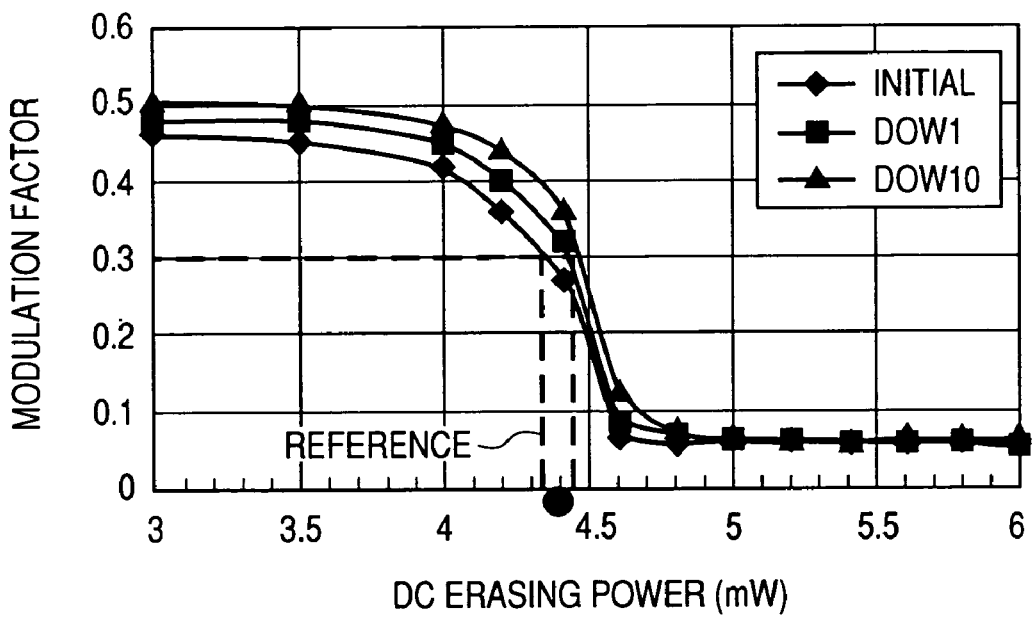
FIG. 30 is a diagram showing a relation among a measured modulation factor "m", the number of times of signal recording on an optical disc, and a DC erasing power of a laser beam in the absence of initialization with a high laser power.

FIG. 30 shows the obtained relation among the measured modulation factor "m", the number of times of signal recording (signal rewriting) on an optical disc, and the DC erasing power of the laser beam. In FIG. 30, the marks INITIAL denote the relation between the measured modulation factor "m" and the DC erasing power of the laser beam applied onto the first recorded test signals. The marks DOW1 denote the relation between the measured modulation factor "m" and the DC erasing power of the laser beam applied onto the second recorded test signals. The marks DOW10 denote the relation between the measured modulation factor "m" and the DC erasing power of the laser beam applied onto the eleventh recorded test signals.

The PCA in the first recording layer of an optical disc (a DVD-RW) was initialized by applying thereto a forward laser beam having a power of 13 mW. Then, test signals were sequentially recorded on the PCA in the optical disc. The test-signal recorded area in the optical disc was scanned by the forward laser beam having a DC erasing power which changed among different values on a stepwise basis. The different values of the DC erasing power were assigned to the recorded test signals, respectively. Thereafter, the recorded signals were reproduced from the optical disc to generate reproduced signals. The modulation factors "m" of the reproduced signals were measured. The PCA in the first recording layer of an optical disc was initialized by applying thereto a forward laser beam having a power of 13 mW. Then, test signals were sequentially recorded on the PCA in the optical disc twice in an overwrite fashion. The test-signal recorded area in the optical disc was scanned by the forward laser beam having a DC erasing power which changed among different values on a stepwise basis. The different values of the DC erasing power were assigned to the second recorded test signals, respectively. Thereafter, the second recorded signals were reproduced from the optical disc to generate reproduced signals. The modulation factors "m" of the reproduced signals were measured. The PCA in the first recording layer of an optical disc was initialized by applying thereto a forward laser beam having a power of 13 mW. Then, test signals were sequentially recorded on the PCA in the optical disc eleven times in an overwrite fashion. The test-signal recorded area in the optical disc was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the optical disc to generate reproduced signals. The modulation factors "m" of the reproduced signals were measured.

Figure 31:
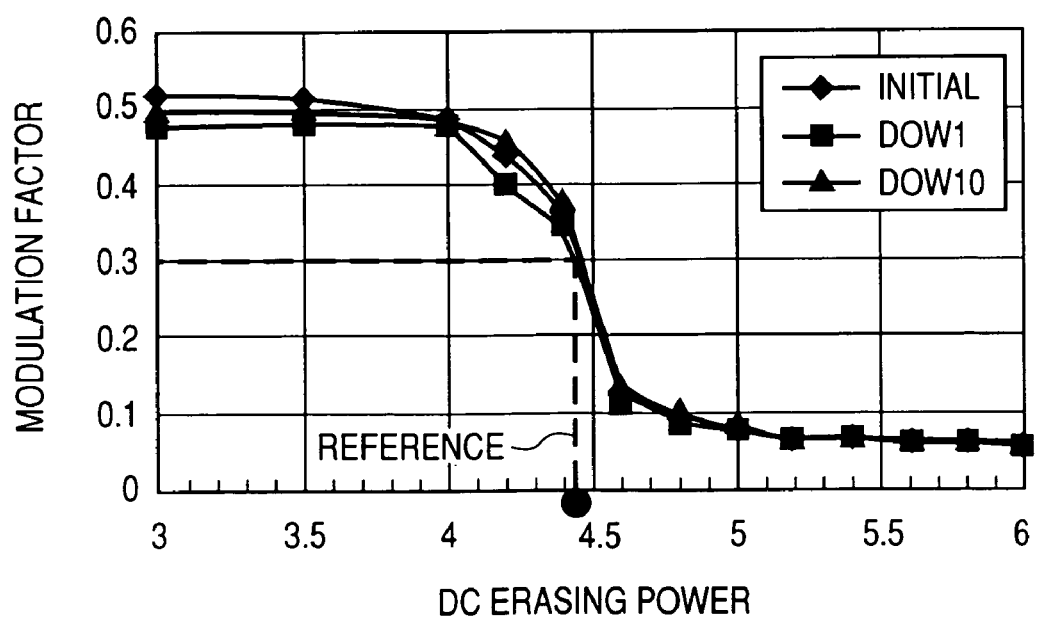
FIG. 31 is a diagram showing a relation among a measured modulation factor "m", the number of times of signal recording on an optical disc, and a DC erasing power of a laser beam in the presence of initialization with a high laser power.

FIG. 31 shows the obtained relation among the measured modulation factor "m", the number of times of signal recording (signal rewriting) on an optical disc, and the DC erasing power of the laser beam. In FIG. 31, the marks INITIAL denote the relation between the measured modulation factor "m" and the DC erasing power of the laser beam applied onto the first recorded test signals. The marks DOW1 denote the relation between the measured modulation factor "m" and the DC erasing power of the laser beam applied onto the second recorded test signals. The marks DOW10 denote the relation between the measured modulation factor "m" and the DC erasing power of the laser beam applied onto the eleventh recorded test signals.

It is understood from FIGS. 30 and 31 that the initialization of the PCA in an optical disc with a high laser power can enhance the reliability and accuracy of the measured modulation factors "m".

Test signals were sequentially recorded on the PCA in the first recording layer of an optical disc (a DVD-RW) without pre-initialization of the PCA. The test-signal recorded area in the optical disc was scanned by the forward laser beam having a DC erasing power which changed among different values on a stepwise basis. The different values of the DC erasing power were assigned to the recorded test signals, respectively. Thereafter, the recorded signals were reproduced from the optical disc to generate reproduced signals. The modulation factors "m" of the reproduced signals were measured. Then, the "γ" values of the reproduced signals were measured through the use of the equation (8). Test signals were sequentially recorded on the PCA in the first recording layer of an optical disc twice in an overwrite fashion without pre-initialization of the PCA. The test-signal recorded area in the optical disc was scanned by the forward laser beam having a DC erasing power which changed among different values on a stepwise basis. The different values of the DC erasing power were assigned to the second recorded test signals, respectively. Thereafter, the second recorded signals were reproduced from the optical disc to generate reproduced signals. The modulation factors "m" of the reproduced signals were measured. Then, the "γ" values of the reproduced signals were measured through the use of the equation (8). Test signals were sequentially recorded on the PCA in the first recording layer of an optical disc eleven times in an overwrite fashion without pre-initialization of the PCA. The test-signal recorded area in the optical disc was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the DVD-RW to generate reproduced signals. The modulation factors "m" of the reproduced signals were measured. Then, the "γ" values of the reproduced signals were measured through the use of the equation (8).

Figure 32:
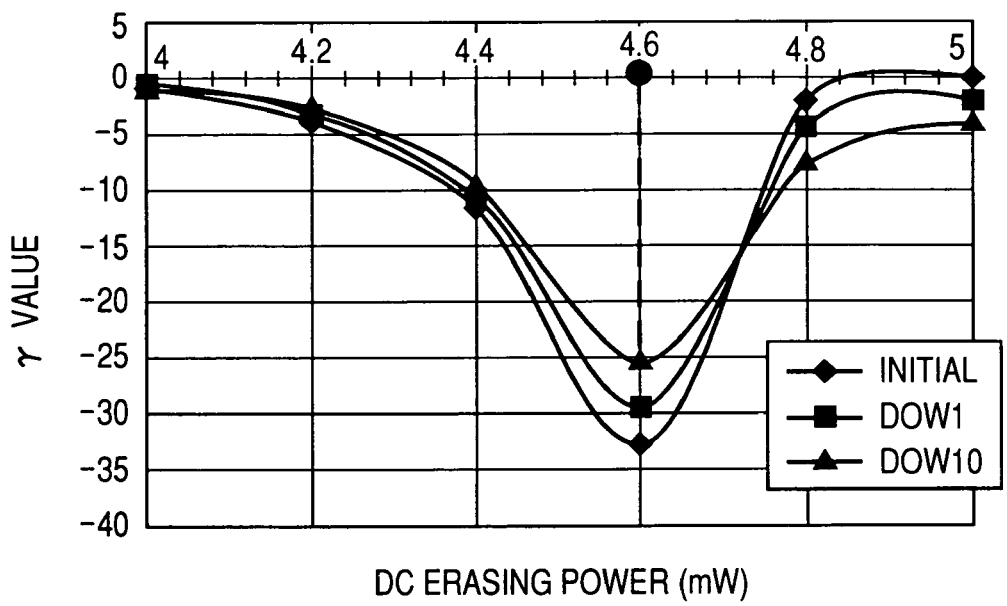
FIG. 32 is a diagram showing a relation among a measured "γ" value, the number of times of signal recording on an optical disc, and a DC erasing power of a laser beam in the absence of initialization with a high laser power.

FIG. 32 shows the obtained relation among the measured "γ" value, the number of times of signal recording (signal rewriting) on an optical disc, and the DC erasing power of the laser beam. In FIG. 32, the marks INITIAL denote the relation between the measured "γ" value and the DC erasing power of the laser beam applied onto the first recorded test signals. The marks DOW1 denote the relation between the measured "γ" value and the DC erasing power of the laser beam applied onto the second recorded test signals. The marks DOW10 denote the relation between the measured "γ" value and the DC erasing power of the laser beam applied onto the eleventh recorded test signals.

The PCA in the first recording layer of an optical disc (a DVD-RW) was initialized by applying thereto a forward laser beam having a power of 13 mW. Then, test signals were sequentially recorded on the PCA in the optical disc. The test-signal recorded area in the optical disc was scanned by the forward laser beam having a DC erasing power which changed among different values on a stepwise basis. The different values of the DC erasing power were assigned to the recorded test signals, respectively. Thereafter, the recorded signals were reproduced from the optical disc to generate reproduced signals. The modulation factors "m" of the reproduced signals were measured. Then, the "γ" values of the reproduced signals were measured through the use of the equation (8). The PCA in the first recording layer of an optical disc was initialized by applying thereto a forward laser beam having a power of 13 mW. Then, test signals were sequentially recorded on the PCA in the optical disc twice in an overwrite fashion. The test-signal recorded area in the optical disc was scanned by the forward laser beam having a DC erasing power which changed among different values on a stepwise basis. The different values of the DC erasing power were assigned to the second recorded test signals, respectively. Thereafter, the second recorded signals were reproduced from the optical disc to generate reproduced signals. The modulation factors "m" of the reproduced signals were measured. Then, the "γ" values of the reproduced signals were measured through the use of the equation (8). The PCA in the first recording layer of an optical disc was initialized by applying thereto a forward laser beam having a power of 13 mW. Then, test signals were sequentially recorded on the PCA in the optical disc eleven times in an overwrite fashion. The test-signal recorded area in the optical disc was scanned by the forward laser beam having a DC erasing power which changed among different values on a stepwise basis. The different values of the DC erasing power were assigned to the eleventh recorded test signals, respectively. Thereafter, the eleventh recorded signals were reproduced from the DVD- RW to generate reproduced signals. The modulation factors "m" of the reproduced signals were measured. Then, the "γ" values of the reproduced signals were measured through the use of the equation (8).

Figure 33:
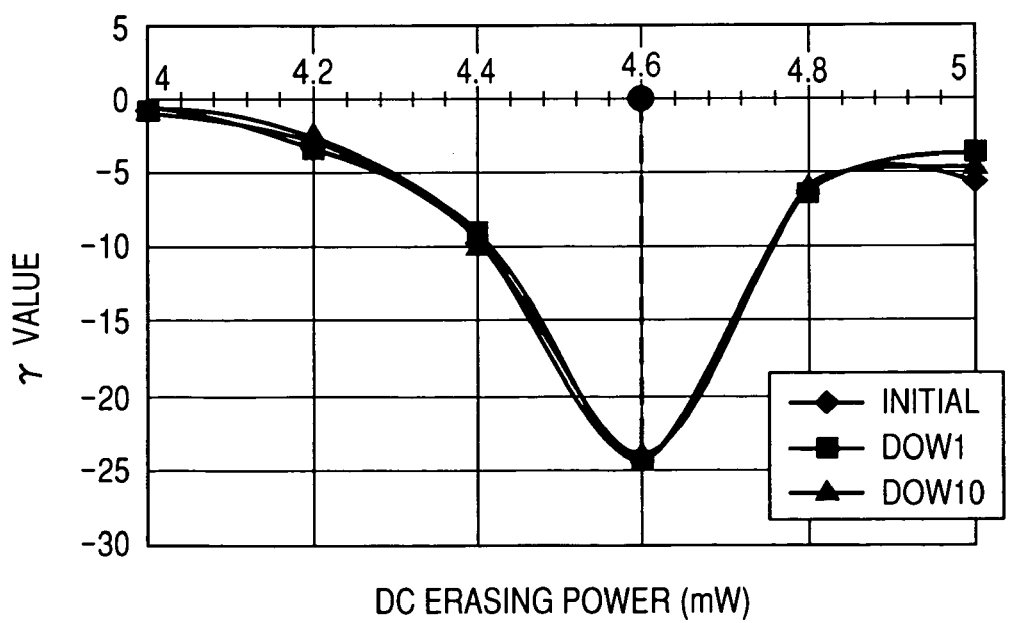
FIG. 33 is a diagram showing a relation among a measured "γ" value, the number of times of signal recording on an optical disc, and a DC erasing power of a laser beam in the presence of initialization with a high laser power.

FIG. 33 shows the obtained relation among the measured "γ" value, the number of times of signal recording (signal rewriting) on an optical disc, and the DC erasing power of the laser beam. In FIG. 33, the marks INITIAL denote the relation between the measured "γ" value and the DC erasing power of the laser beam applied onto the first recorded test signals. The marks DOW1 denote the relation between the measured "γ" value and the DC erasing power of the laser beam applied onto the second recorded test signals. The marks DOW10 denote the relation between the measured "γ" value and the DC erasing power of the laser beam applied onto the eleventh recorded test signals.

It is understood from FIGS. 32 and 33 that the initialization of the PCA in an optical disc with a high laser power can enhance the reliability and accuracy of the measured "γ" values.

Regarding the characteristics shown in FIGS. 29, 31, and 33, the initialization of the PCAs in optical discs was carried out at a laser-beam-related scanning speed equal to twice a normal speed.

Figure 34:
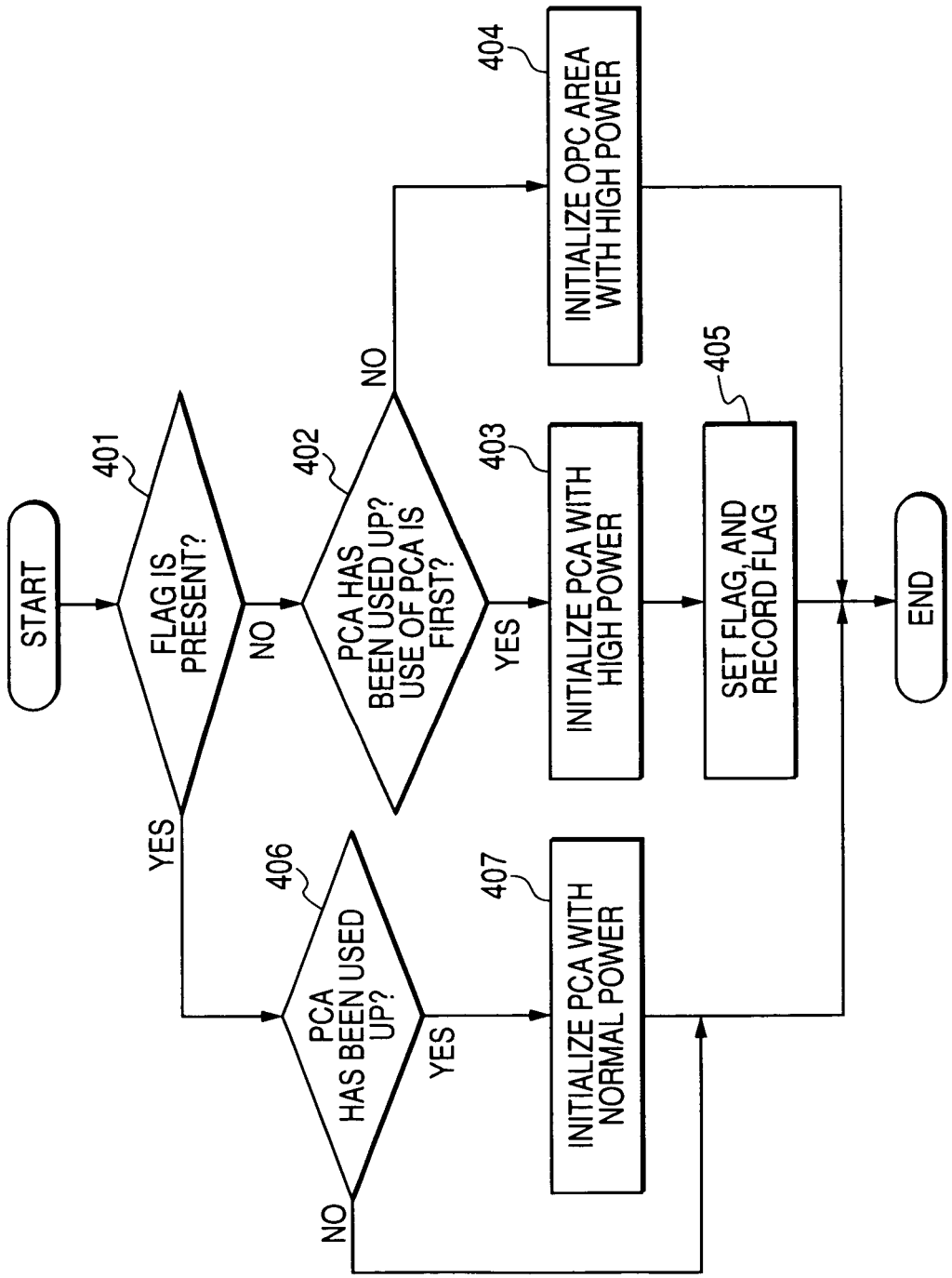
FIG. 34 is a flowchart of a segment (a subroutine) of the control program for the signal processing circuit and the control circuit in FIG. 7 which relates to initialization of a PCA in a first recording layer of an optical disc with a high laser power.

FIG. 34 is a flowchart of a segment (a subroutine) of the control program for the signal processing circuit 3 and the control circuit 11 which relates to the initialization of the PCA in the first recording layer of an optical disc 1 with a high laser power. Preferably, the program segment in FIG. 34 is placed before the step 201 in FIG. 23.

With reference to FIG. 34, a first step 401 of the program segment controls the optical pickup 2 to read out an initialization-related flag from the RMA in the first recording layer of the optical disc 1. The step 401 decides whether or not the read-out flag indicates that the PCA in the optical disc 1 has been initialized with a high laser power. When the read-out flag indicates that the PCA in the optical disc 1 has been initialized, the program advances from the step 401 to a step 406. Otherwise, the program advances from the step 401 to a step 402.

The step 406 decides whether or not the PCA in the optical disc 1 has been used up. When the PCA has been used up, the program advances from the step 406 to a step 407. Otherwise, the program exits from the step 406, and then the current execution cycle of the program segment ends.

The step 407 controls the optical pickup 2 to scan the whole of the PCA in the optical disc 1 by a forward laser beam having the recommended erasing power (=ε•Pind) or the optimum DC erasing power. As a result, the PCA is initialized again. After the step 407, the current execution cycle of the program segment ends.

The step 402 decides whether the PCA in the optical disc 1 is usable from its starting part. The step 402 decides whether or not the PCA has been used up. When the PCA is usable from its starting part or when the PCA has been used up, the program advances from the step 402 to a step 403. When the optical disc 1 is not usable from its starting part, or when the PCA has not been used up, the program advances from the step 402 to a step 404.

The step 403 controls the optical pickup 2 to scan the whole of the PCA in the optical disc 1 by a forward laser beam having a high power equal to twice the recommended erasing power (=ε•Pind) or the optimum DC erasing power. As a result, the PCA is initialized by the high laser power.

A step 405 following the step 403 sets the flag to a state indicating that the PCA has been initialized with a high laser power. Then, the step 405 controls the optical pickup 2 to record the flag in the RMA of the optical disc 1. After the step 405, the current execution cycle of the program segment ends.

The step 404 controls the optical pickup 2 to scan an OPC area to be used, which is in the PCA of the optical disc 1, by a forward laser beam having a high power equal to twice the recommended erasing power (=ε•Pind) or the optimum DC erasing power. As a result, the OPC area to be used is initialized by the high laser power. After the step 404, the current execution cycle of the program segment ends.

Fifth Embodiment

A fifth embodiment of this invention is similar to the first embodiment thereof except for design changes mentioned hereafter.

Figure 35:
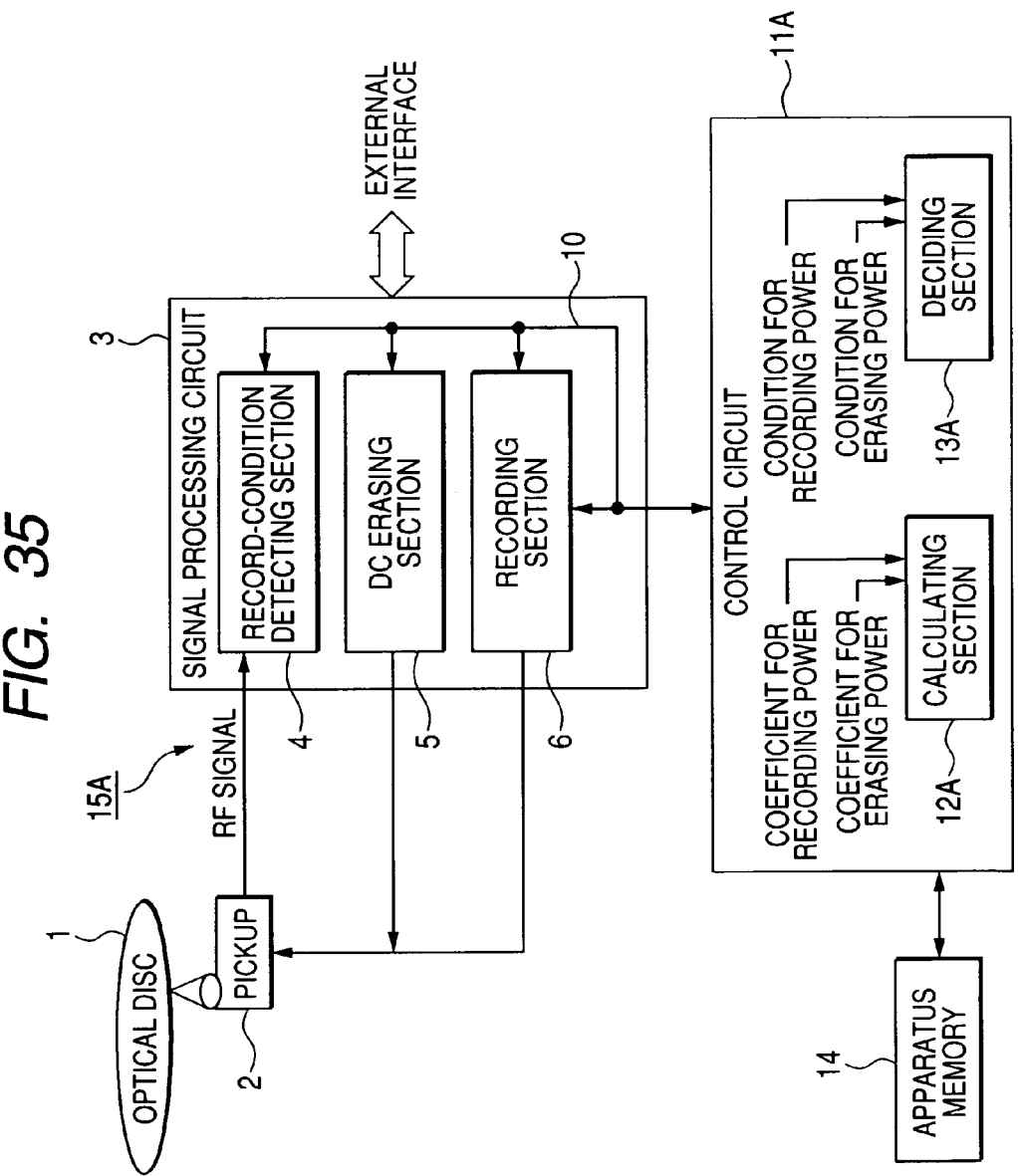
FIG. 35 is a block diagram of an optical-disc drive apparatus according to a fifth embodiment of this invention.

FIG. 35 shows an optical-disc drive apparatus 15A in the fifth embodiment of this invention. The optical-disc drive apparatus 15A is a modification of the optical-disc drive apparatus 15 in FIG. 7. The optical-disc drive apparatus 15A includes a control circuit 11A instead of the control circuit 11 in FIG. 7. The control circuit 11A includes a calculating section 12A and a deciding section 13A replacing the calculating section 12 and the deciding section 13 in FIG. 7.

Preferably, the apparatus memory 14 in the optical-disc drive apparatus 15A stores reference information or signals representing prescribed coefficients Kb, Kmod, Kg, and Ka. The prescribed coefficients Kb, Kmod, Kg, and Ka are designed for deciding an optimum value of the recording power Pw of a forward laser beam through the use of measured asymmetry-related "β" values, measured modulation factors "m", measured "γ" values, and measured asymmetry values "av", respectively.

The optical-disc drive apparatus 15A performs a novel OPC procedure of a 2-step type with respect to an optical disc 1. A first stage of the 2-step OPC procedure decides the optimum value of the erasing power Pe of a laser beam as the novel OPC procedure in the first embodiment of this invention does. A first block in the PCA of the first recording layer in the optical disc 1 is used by the first stage of the 2-step OPC procedure.

A second stage of the 2-step OPC procedure which follows the first stage thereof is as follows. The control circuit 11A labels the optimum erasing power decided by the first stage of the 2-step OPC procedure as a setting erasing power. The control circuit 11A notifies the setting erasing power to the recording section 6. Under the control by the control circuit 11A, the recording section 6 and the optical pickup 2 cooperate to sequentially record test signals on a second block in the PCA of the optical disc 1 through the use of a forward laser beam of a writing waveform similar to that in FIG. 2 while the erasing power Pe of the laser beam is fixed to the setting value and the recording power Pw thereof is changed among different values on a stepwise basis. The test signals are assigned to the different recording power values, respectively. The second block in the PCA is separate from the first block therein. The optical pickup 2 reproduces the recorded test signals while being controlled by the control circuit 11A. The optical pickup 2 feeds the reproduced test signals to the record-condition detecting section 4 as reproduced RF signals. The reproduced RF signals correspond to the different recording power values, respectively. Under the control by the control circuit 11A, the record-condition detecting section 4 measures the modulation factor "m", the "γ" value, the asymmetry-related "β" value, or the asymmetry value "av" of each of the reproduced RF signals. The "γ" value is a derivative of the modulation-factor characteristic. The results of the measurement indicate the record conditions of the test signals, respectively. The measurement results (the measured modulation factors "m", the measured "γ" values, the measured asymmetry-related "β" values, or the measured asymmetry values "av") correspond to the different recording power values, respectively. The record-condition detecting section 4 sends the measurement results (the measured values) to the control circuit 11A via the internal bus 10. The deciding section 13A reads out the signal of the target value (the target modulation factor "m", the target "γ" value, the target asymmetry-related "β" value, or the target asymmetry value "av") from the apparatus memory 14. The deciding section 13A compares the measured values with the target value to find one among the measured values which is equal or closest to the target value. Then, the deciding section 13A finds one among the different recording power values which corresponds to the measured value equal or closest to the target value. The deciding section 13A labels the found recording power value as a reference value. The deciding section 13A notifies the reference value to the calculating section 12A. The calculating section 12A reads out the signal of the prescribed coefficient K (the prescribed coefficient Kb, Kmod, Kg, or Ka) from the apparatus memory 14. The calculating section 12A multiplies the reference value by the prescribed coefficient K to obtain the optimum value of the recording power Pw of the laser beam. In this way, the optimum recording power of the laser beam for the optical disc 1 is decided by the 2-step OPC procedure.

The 2-step OPC procedure was performed on an optical disc having two recording layers. Specifically, test signals were recorded on the optical disc with using an initial ratio "ε" between a setting recording power and a setting erasing power of a laser beam applied to the optical disc. The recorded test signals were exposed to a laser beam having a DC erasing power changing among different values. Then, the recorded test signals were reproduced from the optical disc. The "γ" values of the reproduced signals were measured. The optimum value of the erasing power Pe of the laser beam was decided on the basis of the measured "γ" values. Thereafter, test signals were recorded on the optical disc while the recording power Pw of the laser beam was changed among different values. The recorded test signals were reproduced from the optical disc. The "γ" values of the reproduced signals were measured. The optimum value of the recording power Pw of the laser beam was decided on the basis of the measured "γ" values. Thereafter, a sample signal was recorded on the optical disc through the use of a laser beam having erasing and recording powers equal to the decided optimum values. The recorded sample signal was reproduced from the optical disc. The jitter of the reproduced sample signal was measured. The sequence of the above steps was reiterated while the optical disc was repetitively changed from one to another and the initial power ratio "ε" was sequentially changed among different values.

Figure 36:
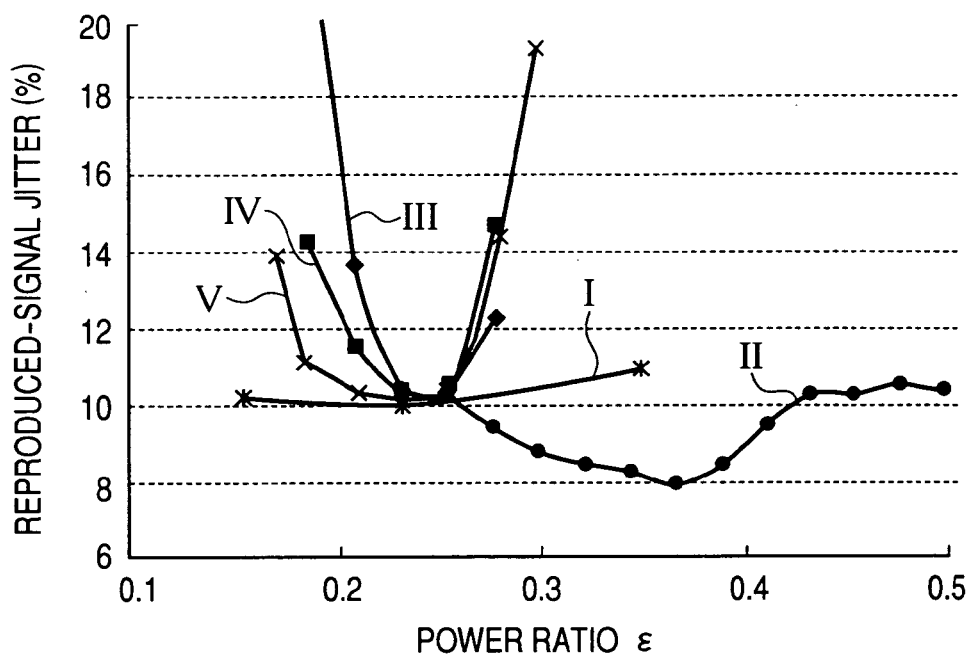
FIG. 36 is a diagram showing a relation between a reproduced-signal jitter and an initial power ratio "ϵ" obtained for each of five different conditions.

The curve I in FIG. 36 denotes the obtained relation between the reproduced-signal jitter and the initial power ratio "ε". The reproduced-signal jitter remained acceptable for a wide range of the initial power ratio "ε".

The prior-art OPC procedure was performed on an optical disc having only a single recording layer. Specifically, test signals were recorded on the optical disc with using an initial ratio "ε" between a setting recording power and a setting erasing power of a laser beam applied to the optical disc and changing the erasing power Pe of the laser beam among different values. The recorded test signals were reproduced from the optical disc. The "γ" values of the reproduced signals were measured. The optimum value of the erasing power Pe of the laser beam was decided on the basis of the measured "γ" values. Thereafter, test signals were recorded on the optical disc while the recording power Pw of the laser beam was changed among different values. The recorded test signals were reproduced from the optical disc. The "γ" values of the reproduced signals were measured. The optimum value of the recording power Pw of the laser beam was decided on the basis of the measured "γ" values. Thereafter, a sample signal was recorded on the optical disc through the use of a laser beam having erasing and recording powers equal to the decided optimum values. The recorded sample signal was reproduced from the optical disc. The jitter of the reproduced sample signal was measured. The sequence of the above steps was reiterated while the optical disc was repetitively changed from one to another and the initial power ratio "ε" was sequentially changed among different values.

The curve II in FIG. 36 denotes the obtained relation between the reproduced-signal jitter and the initial power ratio "ε". The reproduced-signal jitter remained acceptable for a wide range of the initial power ratio "ε".

The prior-art OPC procedure was performed on an optical disc having two recording layers. Specifically, test signals were recorded on the optical disc with using an initial ratio "ε" between a setting recording power and a setting erasing power of a laser beam applied to the optical disc and changing the erasing power Pe of the laser beam among different values. The recorded test signals were reproduced from the optical disc. The "γ" values of the reproduced signals were measured. The optimum value of the erasing power Pe of the laser beam was decided on the basis of the measured "γ" values. Thereafter, test signals were recorded on the optical disc while the recording power Pw of the laser beam was changed among different values. The recorded test signals were reproduced from the optical disc. The "γ" values of the reproduced signals were measured. The optimum value of the recording power Pw of the laser beam was decided on the basis of the measured "γ" values. Thereafter, a sample signal was recorded on the optical disc through the use of a laser beam having erasing and recording powers equal to the decided optimum values. The recorded sample signal was reproduced from the optical disc. The jitter of the reproduced sample signal was measured. The sequence of the above steps was reiterated while the optical disc was repetitively changed from one to another and the initial power ratio "ε" was sequentially changed among different values.

The curve III in FIG. 36 denotes the obtained relation between the reproduced-signal jitter and the initial power ratio "ε". The reproduced-signal jitter remained acceptable for only a narrow range of the initial power ratio "ε".

The prior-art OPC procedure was performed on an optical disc having two recording layers. Specifically, test signals were recorded on the optical disc with using an initial ratio "ε" between a setting recording power and a setting erasing power of a laser beam applied to the optical disc and changing the erasing power Pe of the laser beam among different values. The recorded test signals were reproduced from the optical disc. The asymmetry-related "β" values (or the asymmetry values) of the reproduced signals were measured. The optimum value of the erasing power Pe of the laser beam was decided on the basis of the measured asymmetry-related "β" values. Thereafter, test signals were recorded on the optical disc while the recording power Pw of the laser beam was changed among different values. The recorded test signals were reproduced from the optical disc. The asymmetry-related "β" values (or the asymmetry values) of the reproduced signals were measured. The optimum value of the recording power Pw of the laser beam was decided on the basis of the measured asymmetry-related "β" values. Thereafter, a sample signal was recorded on the optical disc through the use of a laser beam having erasing and recording powers equal to the decided optimum values. The recorded sample signal was reproduced from the optical disc. The jitter of the reproduced sample signal was measured. The sequence of the above steps was reiterated while the optical disc was repetitively changed from one to another and the initial power ratio "ε" was sequentially changed among different values.

The curve IV in FIG. 36 denotes the obtained relation between the reproduced-signal jitter and the initial power ratio "ε". The reproduced-signal jitter remained acceptable for only a narrow range of the initial power ratio "ε".

A 1-step OPC procedure was performed on an optical disc having two recording layers. Specifically, test signals were recorded on the optical disc with using an initial ratio "ε" between a setting recording power and a setting erasing power of a laser beam applied to the optical disc. The recorded test signals were exposed to a laser beam having a DC erasing power changing among different values. Then, the recorded test signals were reproduced from the optical disc. The "γ" values of the reproduced signals were measured. The optimum value of the erasing power Pe of the laser beam was decided on the basis of the measured "γ" values. Then, the optimum value of the recording power Pw of the laser beam was decided by calculation using the power ratio "ε" and the decided optimum erasing power value. Thereafter, a sample signal was recorded on the optical disc through the use of a laser beam having erasing and recording powers equal to the decided optimum values. The recorded sample signal was reproduced from the optical disc. The jitter of the reproduced sample signal was measured. The sequence of the above steps was reiterated while the optical disc was repetitively changed from one to another and the initial power ratio "ε" was sequentially changed among different values.

The curve V in FIG. 36 denotes the obtained relation between the reproduced-signal jitter and the initial power ratio "ε". The reproduced-signal jitter remained acceptable for a wide range of the initial power ratio "ε".

A margin for the initial power ratio "E" which is provided by the 2-step OPC procedure is greater than that provided by the 1-step OPC procedure. A margin for the initial power ratio "ε" which is provided by the 1-step OPC procedure is greater than that provided by the prior-art OPC procedure.

A time taken by the 2-step OPC procedure is longer than that taken by the 1-step OPC procedure. A time taken by the 1-step OPC procedure is longer than that taken by the prior-art OPC procedure.

As shown in FIG. 11, the measured asymmetry-related "β" values corresponding to the different number of times of signal recording on the DVD-RW peaked substantially at the same recording power Pw of the laser beam. The recording power at which the measured asymmetry-related "β" values peak can be used as an optimum one or a reference for an optimum one.

A target asymmetry-related "β" value corresponding to a target condition is predetermined in accordance with the peaks of the measured asymmetry-related "β" values (see FIG. 11). The deciding section 13A compares the measured asymmetry-related "β" values with the target value to find one among the measured asymmetry-related "β" values which is equal or closest to the target value, that is, which matches the target value or the target condition. Then, the deciding section 13A finds one among the different recording power values which corresponds to the measured asymmetry-related "β" value matching the target value or the target condition. The deciding section 13A labels the found recording power value as a reference value. The calculating section 12A multiplies the reference value by a prescribed coefficient Kb (a prescribed coefficient K) to obtain the optimum value of the recording power Pw of the laser beam which provides a minimum reproduced-signal jitter.

Figure 37:
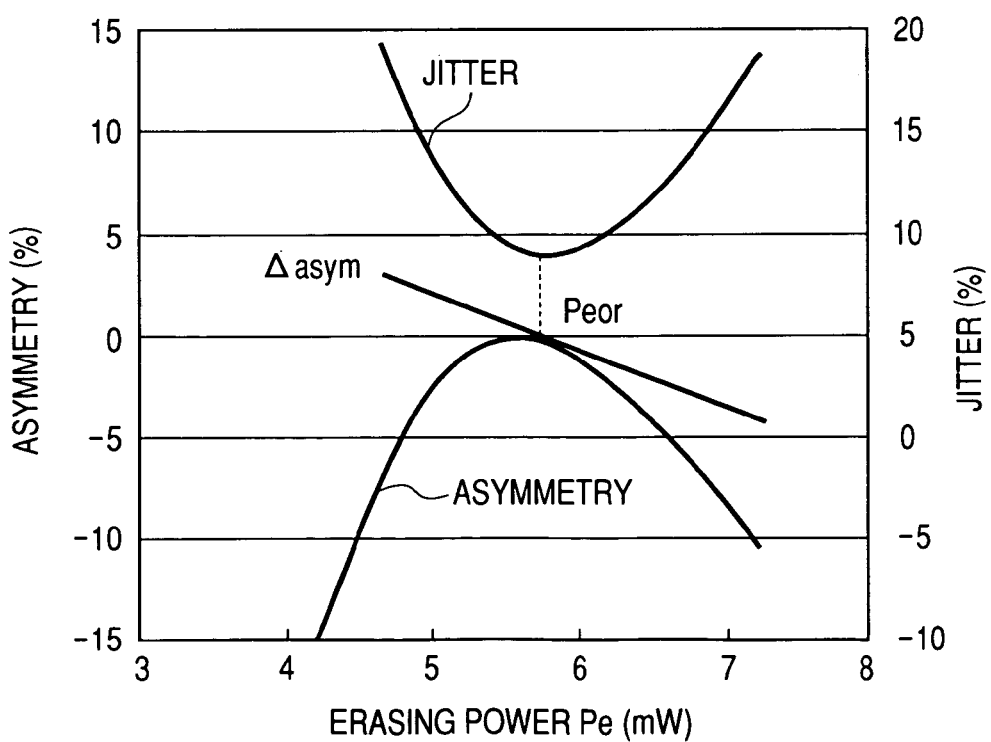
FIG. 37 is a diagram showing an example of a relation among a reproduced-signal asymmetry, a reproduced-signal jitter, and an erasing power Pe of a laser beam.

FIG. 37 shows an example of the relation among the reproduced-signal asymmetry, the reproduced-signal jitter, and the erasing power Pe of the laser beam. In FIG. 37, the line Δasym is an approximation to a variation in the slope of the curve of the asymmetry-related "β" value with respect to the erasing power Pe of the laser beam. The value of the erasing power Pe which corresponds to a slope of 0 is used as a reference value Peor. The optimum value of the recording power Pw of the laser beam may be calculated from the reference value Peor.

Test signals were sequentially recorded on the first recording layer of an optical disc (a DVD-RW) while the recording power Pw of the laser beam was changed among different values, and the recorded signals were reproduced therefrom to generate reproduced signals. The ratio "ε" between the recording power Pw of the laser beam and the erasing power thereof was held constant. The asymmetry values "av" of the reproduced signals were measured. The sequence of the above steps was reiterated.

Figure 38:
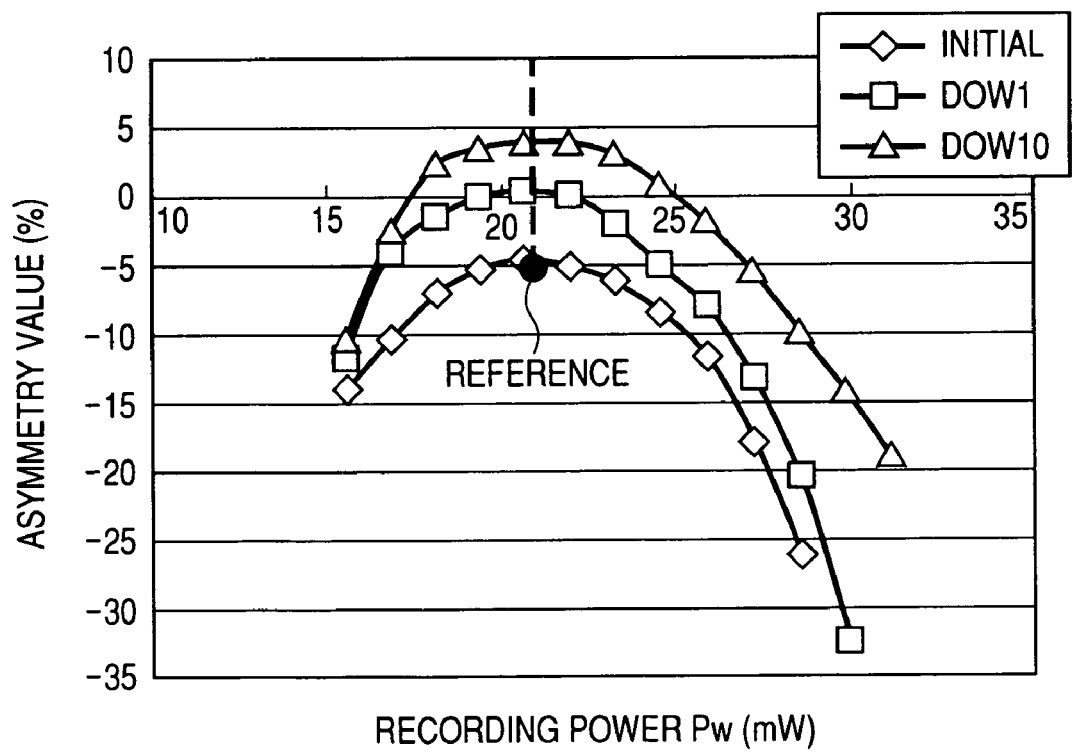
FIG. 38 is a diagram showing a relation among a measured asymmetry value "av", the number of times of signal recording on an optical disc, and a recording power Pw of a laser beam.

FIG. 38 shows the obtained relation among the measured asymmetry value "av", the number of times of signal recording (signal rewriting) on the optical disc, and the recording power Pw of the laser beam. In FIG. 38, the marks INITIAL denote the relation between the measured asymmetry value "av" and the recording power Pw of the laser beam used to record the test signals corresponding to the first reproduced signals. The marks DOW1 denote the relation between the measured asymmetry value "av" and the recording power Pw of the laser beam used to record the test signals corresponding to the second reproduced signals. The marks DOW10 denote the relation between the measured asymmetry value "av" and the recording power Pw of the laser beam used to record the test signals corresponding to the eleventh reproduced signals. When there is a certain variation in an initial power ratio "ε", a secured margin is similar to that obtained by the method using the measured "γ" values.

The signal processing circuit 3 and the control circuit 11A may include a computer having a combination of an input/output port, a CPU, a ROM, and a RAM. In this case, the signal processing circuit 3 and the control circuit 11A operate in accordance with a control program (a computer program) stored in the ROM, the RAM, or the apparatus memory 14.

Figure 39:
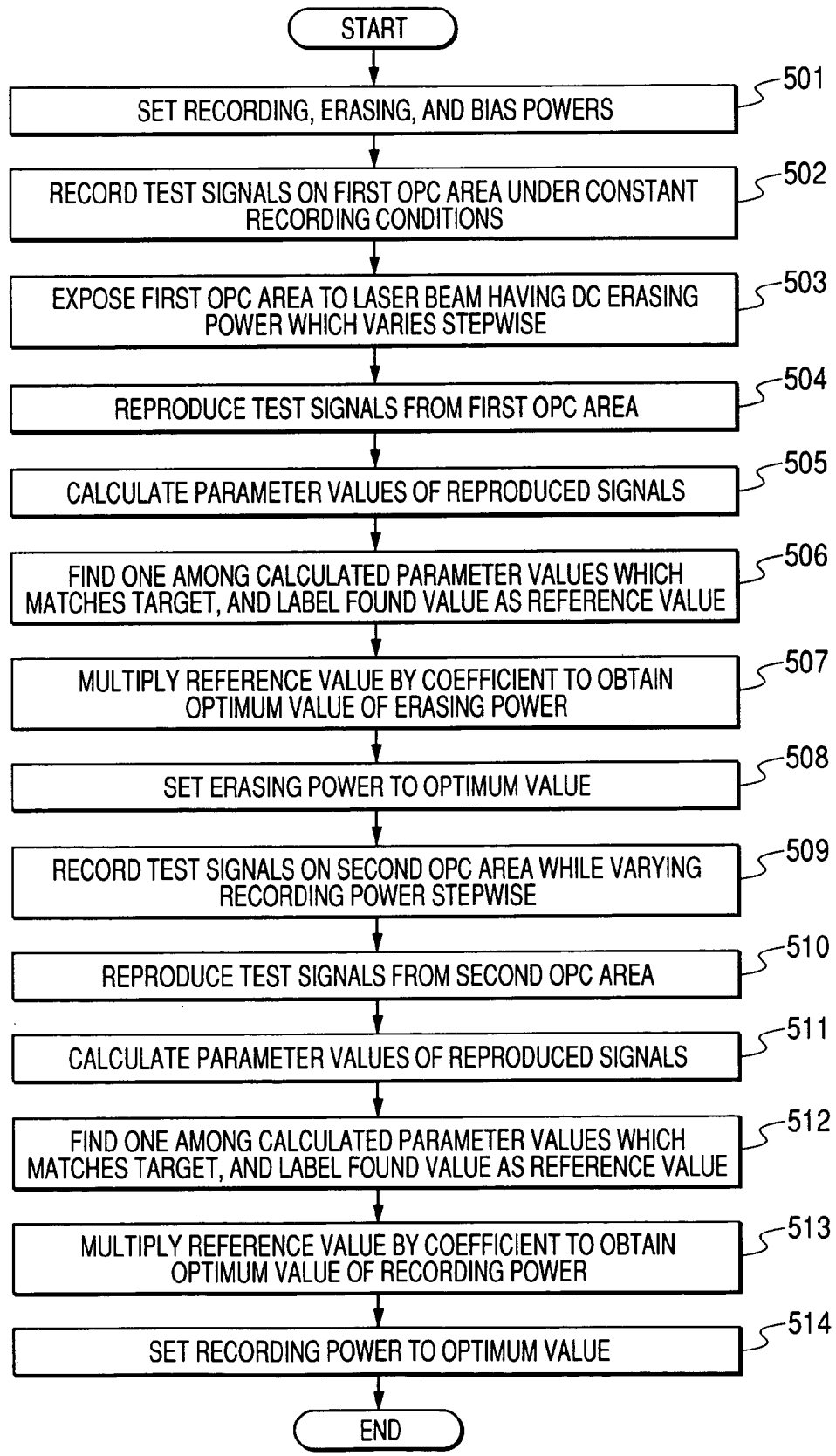
FIG. 39 is a flowchart of a segment of a control program for a signal processing circuit and a control circuit in FIG. 35 which relates to a 2-step OPC procedure in the fifth embodiment of this invention.

FIG. 39 is a flowchart of a segment of the control program for the signal processing circuit 3 and the control circuit 11A which relates to the 2-step OPC procedure. The program segment in FIG. 39 is started when the optical-disc drive apparatus 15A is requested to perform the 2-step OPC procedure. Before the start of the program segment in FIG. 39, a subroutine of the control program may be executed to initialize the PCA in the optical disc 1 with a high laser power.

With reference to FIG. 39, a first step 501 of the program segment reads out, from the apparatus memory 14, reference information about a recommended recording power Pind, a recommended recording strategy, a ratio "ε" between the recommended recording power Pind and a recommended erasing power, and a recommended bias power. Alternatively, the step 501 may control the optical pickup 2 to read out the reference information from the optical disc 1. The step 501 labels the recommended recording power as a setting recording power. The step 501 computes a recommended erasing power from the recommended recording power and the ratio "ε". The step 501 labels the computed erasing power as a setting erasing power. The step 501 labels the recommended bias power as a setting bias power.

A step 502 following the step 501 sets the waveform pattern of a test signal to that of a random pattern signal. The step 502 controls the optical pickup 2 to sequentially record test signals on a first designated block in the PCA (the OPC area) of the first recording layer of the optical disc 1 while fixing write-purpose powers (recording, erasing, and bias powers) of the laser beam and a recording strategy in constant recording conditions. The fixed write-purpose powers are equal to the setting recording, erasing, and bias powers obtained by the step 501.

A step 503 subsequent to the step 502 controls the optical pickup 2 to expose the first designated block (the test-signal recorded block) in the PCA of the optical disc 1 to the forward laser beam having a DC erasing power which changes among different values in an OPC range on a stepwise basis as shown in FIG. 8. The different values of the DC erasing power are assigned to the recorded test signals, respectively. The step 503 loads the apparatus memory 14 with signals representing the different values of the DC erasing power.

A step 504 following the step 503 controls the optical pickup 2 to reproduce the recorded test signals from the first designated block in the PCA of the optical disc 1. The step 504 receives the reproduced test signals as reproduced RF signals. The reproduced RF signals correspond to the different values of the DC erasing power of the laser beam, respectively.

A step 505 subsequent to the step 504 measures the signal-quality-indicating parameter values of the respective reproduced RF signals. Specifically, the step 505 measures the modulation factors "m", the "γ" values, the asymmetry-related "β" values, or the asymmetry values "av" of the respective reproduced RF signals. The measurement results (the measured values, that is, the measured modulation factors "m", the measured "γ" values, the measured asymmetry-related "β" values, or the measured asymmetry values "av") correspond to the different values of the DC erasing power of the laser beam, respectively. The step 505 loads the apparatus memory 14 with signals representing the measurement results.

A step 506 following the step 505 reads out the signal of the target value (the target modulation factor "m", the target "γ" value, the target asymmetry-related "β" value, or the target asymmetry value "av") from the apparatus memory 14. The step 506 compares the measured values with the target value to find one among the measured values which is equal or closest to the target value. In the case of the measured "γ" values, the step 506 may compare the measured values with each other to find the smallest one or the valley-corresponding one thereamong.

A step 507 subsequent to the step 506 finds one among the different values of the DC erasing power of the laser beam which corresponds to the measured value equal or closest to the target value, or which corresponds to the smallest measured value or the valley-corresponding measured value. The step 507 labels the found DC erasing power value as a reference erasing power value. The step 507 reads out the reference information of the prescribed coefficient S (the prescribed coefficient Sb, Smod, Sg, or Sa) from the apparatus memory 14. The step 507 multiplies the reference erasing power value by the prescribed coefficient S to obtain the optimum value of the erasing power Pe of the laser beam.

A step 508 following the step 507 updates the setting erasing power into agreement with the optimum erasing power obtained by the step 507.

A step 509 subsequent to the step 508 controls the optical pickup 2 to sequentially record test signals of a random waveform pattern on a second designated block in the PCA (the OPC area) of the first recording layer of the optical disc 1 while fixing the erasing power Pe of the laser beam to the setting value and changing the recording power Pw thereof among different values on a stepwise basis. The test signals are assigned to the different recording power values, respectively. The second designated block in the PCA is separate from the first designated block therein.

A step 510 following the step 509 controls the optical pickup 2 to reproduce the recorded test signals from the second designated block in the PCA of the optical disc 1. The step 510 receives the reproduced test signals as reproduced RF signals. The reproduced RF signals correspond to the different values of the recording power of the laser beam, respectively.

A step 511 subsequent to the step 510 measures the signal-quality-indicating parameter values of the respective reproduced RF signals. Specifically, the step 511 measures the modulation factors "m", the "γ" values, the asymmetry-related "β" values, or the asymmetry values "av" of the respective reproduced RF signals. The measurement results (the measured values, that is, the measured modulation factors "m", the measured "γ" values, the measured asymmetry-related "β" values, or the measured asymmetry values "av") correspond to the different values of the recording power of the laser beam, respectively. The step 511 loads the apparatus memory 14 with signals representing the measurement results.

A step 512 following the step 511 reads out the signal of the target value (the target modulation factor "m", the target "γ" value, the target asymmetry-related "β" value, or the target asymmetry value "av") from the apparatus memory 14. The target value may be replaced by the target condition. The step 512 compares the measured values with the target value or the target condition to find one among the measured values which is equal or closest to the target value, that is, which matches the target value or the target condition.

A step 513 subsequent to the step 512 finds one among the different values of the recording power of the laser beam which corresponds to the measured value matching the target value or the target condition. The step 513 labels the found recording power value as a reference recording power value. The step 513 reads out the signal of the prescribed coefficient K (the prescribed coefficient Kb, Kmod, Kg, or Ka) from the apparatus memory 14. The step 513 multiplies the reference recording power value by the prescribed coefficient K to obtain the optimum value of the recording power Pw of the laser beam.

A step 514 following the step 513 updates the setting recording power into agreement with the optimum recording power obtained by the step 513. The step 514 labels the recommended bias power as the optimum value of the bias power Pb of the laser beam. As a result, the optimum write-purpose powers (the optimum recording, erasing, and bias powers) of the laser beam are decided. The optimum recording, erasing, and bias powers are used as the setting recording, erasing, and bias powers, respectively. After the step 514, the current execution cycle of the program segment ends.

An allowable range of the recording power Pw of the laser beam is relatively wide as shown in FIG. 4. On the other hand, an allowable range of the erasing power Pe of the laser beam is relatively narrow as shown in FIG. 5. The optimum value of the erasing power Pe is decided by the first stage of the 2-step OPC procedure. Thereafter, the optimum value of the recording power Pw is decided by the second stage of the 2-step OPC procedure. Alternatively, the optimum value of the recording power Pw may be calculated from the decided optimum erasing power value. In this case, the number of times of the recording of test signals can be reduced, and the starting time of the optical-disc drive apparatus 15A can be short.

The test signal may be formed by only the longest mark signal (the 14T signal in the case of an 8/16-modulation-result signal) as in the second embodiment of this invention. In this case, the obtained optimum value of the erasing power Pe has an error of 2% or less with respect to an experimentally detected optimum value. Alternatively, the test signal may be formed by long mark signals including the longest mark signal. The long mark signals are selected from an 8T signal to a 14T signal in the case of an 8/16-modulation system. The test signal may be formed by a long mark signal selected from an 8T signal to a 14T signal in the case of an 8/16-modulation system.

As understood from the previous description, the optimum values of the recording and erasing powers Pw and Pe are decided by the different OPC stages respectively. A certain variation in the ratio "ε" between the recording and erasing powers can be compensated for, and reliable data recording on the optical disc 1 can be performed. Preferably, the calculating section 12A computes the ratio between the decided optimum recording and erasing power values, and labels the computed ratio as a corrected power ratio "ε". The calculating section 12A stores a signal representative of the corrected power ratio "ε" into the apparatus memory 14. The optical pickup 2 may be controlled to record the signal representative of the corrected power ratio "ε" on, for example, the RMA in the optical disc 1.

At the start of the next recording mode of operation of the optical-disc drive apparatus 15A, the signal representative of the corrected power ratio "ε" is read out from the apparatus memory 14 and the 2-step OPC procedure is performed in response to the corrected power ratio "ε". In this case, the time taken by the 2-step OPC procedure can be shortened, and the optimum values of the recording and erasing powers Pw and Pe can be accurately decided by the 2-step OPC procedure.

Preferably, the signal representative of the corrected power ratio "ε" and the information about the type of the optical disc 1 are registered in the apparatus memory 14 while they are related to each other. When being loaded with a new optical disc 1, the optical-disc drive apparatus 15A decides whether or not the type of the new optical disc 1 agrees with a registered type. In the case where the type of the new optical disc 1 agrees with a registered type, the signal representative of the corrected power ratio "ε" related to the registered type is read out from the apparatus memory 14. Then, the optical-disc drive apparatus 15A performs the 2-step OPC procedure in response to the corrected power ratio "ε" while omitting the steps 509-513 (see FIG. 39).

Preferably, the optical-disc drive apparatus 15A has a learning function which updates the original or corrected power ratio "ε" represented by the signal in the apparatus memory 14 when an inserted optical disc 1 is of a new production lot or a new type.

It should be noted that a portion of the first designated block in the PCA of the optical disc 1 may be used as the second designated block therein.

Sixth Embodiment

A sixth embodiment of this invention is similar to the fifth embodiment thereof except for design changes mentioned hereafter. The sixth embodiment of this invention performs a 2-step OPC procedure which decides an optimum value of the recording power Pw of a forward laser beam first, and an optimum value of the erasing power Pe thereof second.

Figure 40:
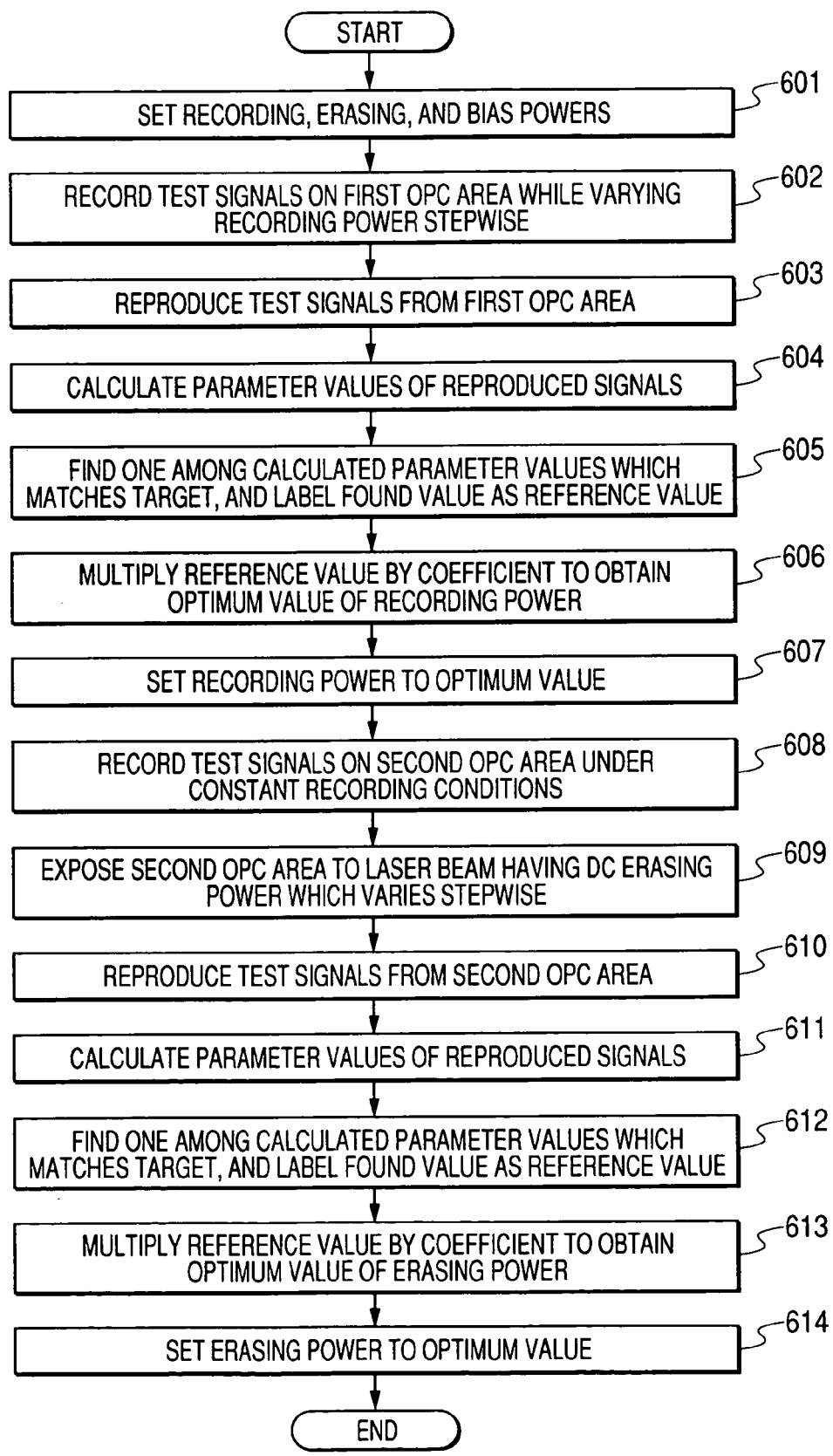
FIG. 40 is a flowchart of a segment of a control program for the signal processing circuit and the control circuit in FIG. 35 which relates to a 2-step OPC procedure in a sixth embodiment of this invention.

FIG. 40 is a flowchart of a segment of a control program for the signal processing circuit 3 and the control circuit 11A which relates to the 2-step OPC procedure. The program segment in FIG. 40 is started when the optical-disc drive apparatus 15A is requested to perform the 2-step OPC procedure. Before the start of the program segment in FIG. 40, a subroutine of the control program may be executed to initialize the PCA in the first recording layer of the optical disc 1 with a high laser power.

With reference to FIG. 40, a first step 601 of the program segment reads out, from the apparatus memory 14, reference information about a recommended recording power Pind, a recommended recording strategy, a ratio "ε" between the recommended recording power Pind and a recommended erasing power, and a recommended bias power. Alternatively, the step 601 may control the optical pickup 2 to read out the reference information from an optical disc 1. The step 601 computes a recommended erasing power from the recommended recording power and the ratio "ε". The step 601 labels the computed erasing power as a central erasing power. The step 601 labels the recommended bias power as a setting bias power.

A step 602 following the step 601 sets the waveform pattern of a test signal to that of a random pattern signal. The step 602 controls the optical pickup 2 to sequentially record test signals on a first designated block in the PCA (the OPC area) of the first recording layer of the optical disc 1 while fixing the bias power Pb of the laser beam to the setting value and changing the recording power Pw thereof among different values on a stepwise basis. The test signals are assigned to the different recording power values, respectively. The erasing power Pe of the laser beam is fixed to the central erasing power. Alternatively, the erasing power Pe may be changed in accordance with the change of the recording power Pw in such a manner as to hold the ratio therebetween equal to the value "ε".

Between the steps 601 and 602, a subroutine of the control program may be executed to initialize the PCA in the first recording layer of the optical disc 1 with a high laser power.

A step 603 subsequent to the step 602 controls the optical pickup 2 to reproduce the recorded test signals from the first designated block in the PCA of the optical disc 1. The step 603 receives the reproduced test signals as reproduced RF signals. The reproduced RF signals correspond to the different values of the recording power of the laser beam, respectively.

A step 604 following the step 603 measures the signal-quality-indicating parameter values of the respective reproduced RF signals. Specifically, the step 604 measures the modulation factors "m", the "γ" values, the asymmetry-related "β" values, or the asymmetry values "av" of the respective reproduced RF signals. The measurement results (the measured values, that is, the measured modulation factors "m", the measured "γ" values, the measured asymmetry-related "β" values, or the measured asymmetry values "av") correspond to the different values of the recording power of the laser beam, respectively. The step 604 loads the apparatus memory 14 with signals representing the measurement results.

A step 605 subsequent to the step 604 reads out the signal of the target value (the target modulation factor "m", the target "γ" value, the target asymmetry-related "β" value, or the target asymmetry value "av") from the apparatus memory 14. The target value may be replaced by the target condition. The step 605 compares the measured values with the target value or the target condition to find one among the measured values which is equal or closest to the target value, that is, which matches the target value or the target condition.

A step 606 following the step 605 finds one among the different values of the recording power of the laser beam which corresponds to the measured value matching the target value or the target condition. The step 606 labels the found recording power value as a reference recording power value. The step 606 reads out the reference information of the prescribed coefficient K (the prescribed coefficient Kb, Kmod, Kg, or Ka) from the apparatus memory 14. The step 606 multiplies the reference recording power value by the prescribed coefficient K to obtain the optimum value of the recording power Pw of the laser beam.

A step 607 subsequent to the step S606 labels the optimum recording power value obtained by the step 606 as a setting recording power value. The step 607 labels the recommended erasing power as a setting erasing power.

A step 608 following the step 607 controls the optical pickup 2 to sequentially record test signals of a random waveform pattern on a second designated block in the PCA (the OPC area) of the first recording layer of the optical disc 1 while fixing write-purpose powers (recording, erasing, and bias powers) of the laser beam and a recording strategy in constant recording conditions. The write-purpose powers are equal to the setting recording, erasing, and bias powers. The second designated block in the PCA is separate from the first designated block therein.

A step 609 subsequent to the step 608 controls the optical pickup 2 to expose the second designated block (the test-signal recorded block) in the PCA of the optical disc 1 to the forward laser beam having a DC erasing power which changes among different values in an OPC range on a stepwise basis as shown in FIG. 8. The different values of the DC erasing power are assigned to the recorded test signals, respectively. The step 609 loads the apparatus memory 14 with signals representing the different values of the DC erasing power.

A step 610 following the step 609 controls the optical pickup 2 to reproduce the recorded test signals from the second designated block in the PCA of the optical disc 1. The step 610 receives the reproduced test signals as reproduced RF signals. The reproduced RF signals correspond to the different values of the DC erasing power of the laser beam, respectively.

A step 611 subsequent to the step 610 measures the signal-quality-indicating parameter values of the respective reproduced RF signals. Specifically, the step 611 measures the modulation factors "m", the "$\gamma$" values, the asymmetry-related "$\beta$" values, or the asymmetry values "av" of the respective reproduced RF signals. The measurement results (the measured values, that is, the measured modulation factors "m", the measured "$\gamma$" values, the measured asymmetry-related "$\beta$" values, or the measured asymmetry values "av") correspond to the different values of the DC erasing power of the laser beam, respectively. The step 611 loads the apparatus memory 14 with signals representing the measurement results.

A step 612 following the step 611 reads out the signal of the target value (the target modulation factor "m", the target "$\gamma$" value, the target asymmetry-related "$\beta$" value, or the target asymmetry value "av") from the apparatus memory 14. The step 612 compares the measured values with the target value to find one among the measured values which is equal or closest to the target value, that is, which matches the target value. In the case of the measured "$\gamma$" values, the step 612 may compare the measured values with each other to find the smallest one or the valley-corresponding one thereamong. In this case, the step 612 finds one among the measured values which matches the target condition.

A step 613 subsequent to the step 612 finds one among the different values of the DC erasing power of the laser beam which corresponds to the measured value matching the target value or the target condition. The step 613 labels the found DC erasing power value as a reference erasing power value. The step 613 reads out the reference information of the prescribed coefficient S (the prescribed coefficient Sb, Smod, Sg, or Sa) from the apparatus memory 14. The step 613 multiplies the reference erasing power value by the prescribed coefficient S to obtain the optimum value of the erasing power Pe of the laser beam.

A step 614 following the step 613 updates the setting erasing power into agreement with the optimum erasing power obtained by the step 613. The step 614 labels the recommended bias power as the optimum value of the bias power Pb of the laser beam. As a result, the optimum write-purpose powers (the optimum recording, erasing, and bias powers) of the laser beam are decided. The optimum recording, erasing, and bias powers are used as the setting recording, erasing, and bias powers, respectively. After the step 614, the current execution cycle of the program segment ends.

The 2-step OPC procedure uses, for example, the measured "$\gamma$" values depending on the ratio between the recording power and the erasing power of the laser beam. Therefore, the 2-step OPC procedure can absorb a variation in the power ratio and accurately decide the optimum values of the recording and erasing powers of the laser beam. As a result of the 2-step OPC procedure, a reproduced RF signal is improved in asymmetry.

The 2-step OPC procedure may be modified to take steps as follows. The optical pickup 2 is controlled to sequentially record 26 frame-based test signals on the first sector in a designated ECC block in the PCA (the OPC area) of the first recording layer of the optical disc 1 while fixing the bias power Pb of the laser beam to the setting value and setting the recording power Pw thereof to first one of different values. The optical pickup 2 is controlled to reiterate the above test-signal recording while the scanned sector is repetitively changed from one to next and the value of the recording power Pw is changed from one to next. Consequently, the optical pickup 2 carries out the recording of the 26 frame-based test signals on each of the sixteen sectors in the designated ECC block in the PCA. The sixteen sectors correspond to the different recording power values, respectively. The groups each having the 26 frame-based test signals are assigned to the different recording power values, respectively.

The optical pickup 2 is controlled to reproduce the frame-based test signals from the designated ECC block in the PCA of the optical disc 1. The optimum value of the recording power Pw of the laser beam is decided on the basis of the reproduced frame-based test signals in a way similar to the previously-mentioned one. A sector corresponding to the recording power value equal to the decided optimum value is selected from the sixteen sectors in the designated ECC block. The selected sector stores the 26 frame-based test signals which have been recorded through the use of the laser beam having the recording power equal to the decided optimum value.

The optical pickup 2 is controlled to expose the selected sector in the designated ECC block in the PCA of the optical disc 1 to the forward laser beam having a DC erasing power which changes among different values in an OPC range on a stepwise basis. The different values of the DC erasing power are assigned to the 26 recorded frame-based test signals in the selected sector, respectively. Thereafter, the optical pickup 2 is controlled to reproduce the 26 recorded frame-based test signals from the selected sector in the designated ECC block in the PCA of the optical disc 1. The 26 reproduced frame-based test signals correspond to the different values of the DC erasing power of the laser beam, respectively. The optimum value of the easing power Pe of the laser beam is decided on the basis of the 26 reproduced frame-based test signals in a way similar to the previously mentioned one.

The modified 2-step OPC procedure dispenses with the recording of test signals exclusively for deciding the optimum value of the erasing power Pe of the laser beam. Therefore, the modified 2-step OPC procedure spends a shorter time. In the modified 2-step OPC procedure, a portion of the first designated block in the PCA of the optical disc 1 is used as the second designated block therein.

As understood from the previous description, the optimum values of the recording and erasing powers Pw and Pe are decided by the different OPC stages respectively. A certain variation in the ratio "ε" between the recording and erasing powers can be compensated for, and reliable data recording on the optical disc 1 can be performed. Preferably, the calculating section 12A computes the ratio between the decided optimum recording and erasing power values, and labels the computed ratio as a corrected power ratio "ε". The calculating section 12A stores a signal representative of the corrected power ratio "ε" into the apparatus memory 14. The optical pickup 2 may be controlled to record the signal representative of the corrected power ratio "ε" on, for example, the RMA in the optical disc 1.

At the start of the next recording mode of operation of the optical-disc drive apparatus 15A, the signal representative of the corrected power ratio "ε" is read out from the apparatus memory 14 and the 2-step OPC procedure is performed in response to the corrected power ratio "ε". In this case, the time taken by the 2-step OPC procedure can be shortened, and the optimum values of the recording and erasing powers Pw and Pe can be accurately decided by the 2-step OPC procedure.

Preferably, the signal representative of the corrected power ratio "ε" and the information about the type of the optical disc 1 are registered in the apparatus memory 14 while they are related to each other. When being loaded with a new optical disc 1, the optical-disc drive apparatus 15A decides whether or not the type of the new optical disc 1 agrees with a registered type. In the case where the type of the new optical disc 1 agrees with a registered type, the signal representative of the corrected power ratio "ε" related to the registered type is read out from the apparatus memory 14. Then, the optical-disc drive apparatus 15A performs the 2-step OPC procedure in response to the corrected power ratio "ε" while omitting the steps 608-613 (see FIG. 40).

Preferably, the optical-disc drive apparatus 15A has a learning function which updates the original or corrected power ratio "ε" represented by the signal in the apparatus memory 14 when an inserted optical disc 1 is of a new production lot or a new type.

Seventh Embodiment

A seventh embodiment of this invention is similar to the fifth or sixth embodiment thereof except for design changes mentioned hereafter.

According to a seventh embodiment of this invention, reference information or signals representing prescribed coefficients Sb, Smod, Sg, Sa, Kb, Kmod, Kg, and Ka are recorded on an optical disc 1 in advance as a portion of land pre-pit (LPP) information or track groove information.

Specifically, during the manufacture of the optical disc 1, coded signals representing the prescribed coefficients Sb, Smod, Sg, Sa, Kb, Kmod, Kg, and Ka are recorded in an inerasable fashion on land pre-pits in a prescribed address or a prescribed-address portion of a control data zone in the optical disc 1. The land pre-pits storing the coded signals are located in a PCA, an RMA, or another area of the optical disc 1.

There is a table indicating the assignment of code words to different values of a coefficient S (Sb, Smod, Sg, or Sa). The table is shown in FIG. 25. The table in FIG. 25 is utilized as in the third embodiment of this invention. There is a table indicating on-disc addresses in which the coded signals representing the prescribed coefficients Sb, Smod, Sg, and Sa are recorded. The table is shown in FIG. 26. The table in FIG. 26 is utilized as in the third embodiment of this invention.

Figures 41, 42, 43:
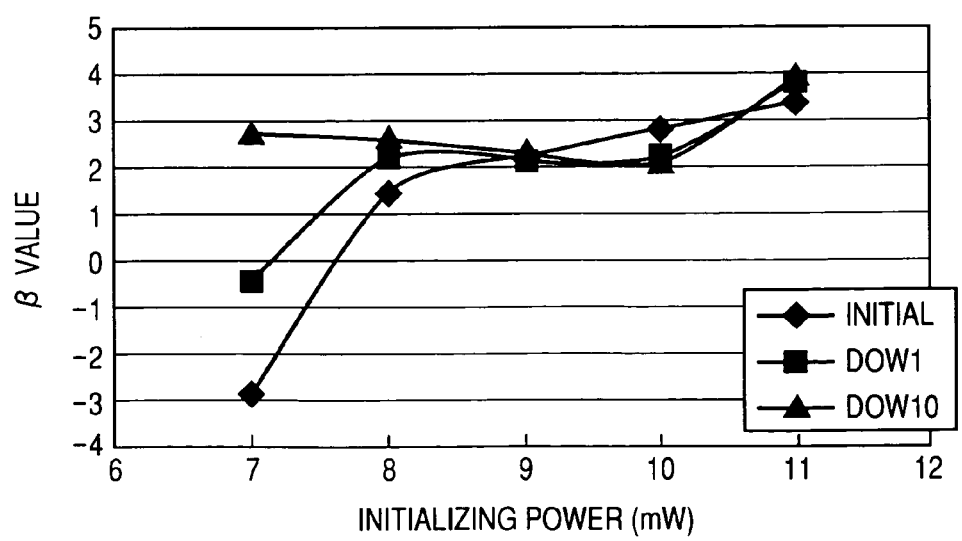
FIG. 41 is a diagram showing a table indicating the assignment of code words to different values of a coefficient K (Kb, Kmod, Kg, or Ka).
FIG. 42 is a diagram showing a table indicating on-disc addresses in which coded signals representing prescribed coefficients Kb, Kmod, Kg, and Ka are recorded.
FIG. 43 is a diagram showing a relation among a measured asymmetry-related "β" value, the number of times of signal recording on an optical disc, and an initializing power of a laser beam.

FIG. 41 shows a table indicating the assignment of code words to different values of a coefficient K (Kb, Kmod, Kg, or Ka). Preferably, data representing the table in FIG. 41 is stored in the apparatus memory 14 as a part of the control program. A coded signal is read out from an optical disc 1. A code word is derived from the read-out coded signal. The table in FIG. 41 is searched for a value of the coefficient K to which the derived code word is assigned. In this way, the value of the coefficient K is decided or recovered.

FIG. 42 shows a table indicating on-disc addresses in which the coded signals representing the prescribed coefficients Kb, Kmod, Kg, and Ka are recorded. In FIG. 42, an address byte position M on an optical disc 1 stores the coded signal representing the prescribed coefficient Kmod, and an address byte position M+1 stores the coded signal representing the prescribed coefficient Kb. Furthermore, an address byte position M+2 stores the coded signal representing the prescribed coefficient Kg, and an address byte position M+3 stores the coded signal representing the prescribed coefficient Ka. For example, a code word "03h" stored in the address byte position M indicates that the prescribed coefficient Kmod is equal to 1.15 (see FIG. 41).

As previously mentioned, signals representing prescribed coefficients Sb, Smod, Sg, Sa, Kb, Kmod, Kg, and Ka are recorded on an optical disc 1 in advance. Therefore, the 2-step OPC procedure can be completed by referring to only information and signals read out from the optical disc 1. Accordingly, even in the case where the optical disc 1 is of a new type, the optimum write-purpose powers of the laser beam can be decided through the 2-step OPC procedure.

Eighth Embodiment

An eighth embodiment of this invention is similar to the fifth or sixth embodiment thereof except for design changes mentioned hereafter.

The eighth embodiment of this invention initializes the PCA in the first recording layer of an optical disc 1 with a high laser power before or when performing the 2-step OPC procedure. The initialization is implemented by controlling the optical pickup 2 to illuminate the PCA with a forward laser beam having a prescribed DC erasing power. As a result of the initialization, the modulation factors "m", the asymmetry-related "β" values, the "γ" values, and the asymmetry values "av" of reproduced RF signals can be more accurately detected.

The PCA in the first recording layer of an optical disc (a DVD-RW) was initialized by the exposure to a forward laser beam having a DC erasing power (an initializing power). Test signals were sequentially recorded on the PCA in the optical disc while the recording power Pw and the erasing power Pe of the laser beam were fixed to 22 mW and 5 mW respectively. Then, the recorded signals were reproduced from the PCA to generate reproduced signals. The asymmetry-related "β" values of the reproduced signals were measured. The recording and reproduction of the test signals, and the measurement of the asymmetry-related "β" values were repeated eleven times. The sequence of the above steps was reiterated while the initializing power of the laser beam was changed among different values.

FIG. 43 shows the obtained relation among the measured asymmetry-related "β" value, the number of times of signal recording (signal rewriting) on the optical disc, and the initializing power of the laser beam. In FIG. 43, the marks INITIAL denote the relation between the initializing power of the laser beam and the measured asymmetry-related "β" value regarding the first reproduced signals. The marks DOW1 denote the relation between the initializing power of the laser beam and the measured asymmetry-related "β" value regarding the second reproduced signals. The marks DOW10 denote the relation between the initializing power of the laser beam and the measured asymmetry-related "β" value regarding the eleventh reproduced signals. As shown in FIG. 43, in the case where the initializing power of the laser beam was equal to or higher than 8 mW, the relation between the measured asymmetry-related "β" value and the initializing power was substantially independent of the number of times of signal recording on the optical disc. Preferably, the initializing power of the laser beam is appreciably higher than the optimum erasing power Pe thereof which is equal to about 5 mW. Accordingly, a preferable range of the initializing power extends between about 8.5 mW and about 11 mW. Desirably, the initializing power of the laser beam is equal to the optimum erasing power Pe multiplied by a value of 1.5 to 2.5.

The PCA in the first recording layer of an optical disc (a DVD-RW) was not subjected to pre-initialization, and then test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The asymmetry values "av" of the reproduced signals were measured. The sequence of the above steps was reiterated.

Figure 44:
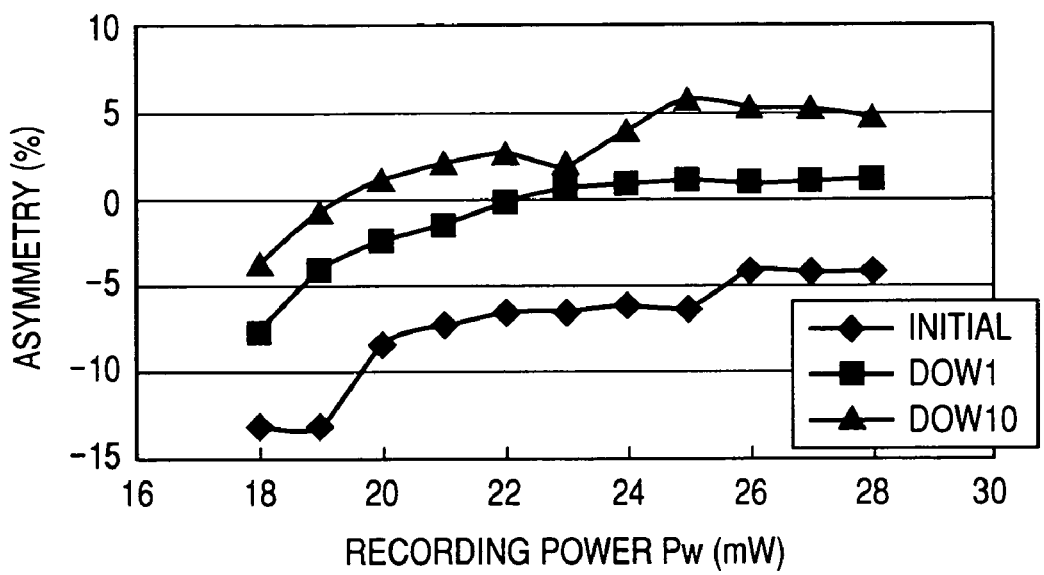
FIG. 44 is a diagram showing a relation among a measured asymmetry value "av", the number of times of signal recording on an optical disc, and a recording power Pw of a laser beam in the absence of initialization with a high laser power.

FIG. 44 shows the obtained relation among the measured asymmetry value "av", the number of times of signal recording (signal rewriting) on the optical disc, and the recording power Pw of the laser beam. In FIG. 44, the marks INITIAL denote the relation between the measured asymmetry value "av" and the recording power Pw of the laser beam used to record the test signals corresponding to the first reproduced signals. The marks DOW1 denote the relation between the measured asymmetry value "av" and the recording power Pw of the laser beam used to record the test signals corresponding to the second reproduced signals. The marks DOW10 denote the relation between the measured asymmetry value "av" and the recording power Pw of the laser beam used to record the test signals corresponding to the eleventh reproduced signals. As shown in FIG. 44, the relation between the measured asymmetry value "av" and the recording power Pw of the laser beam greatly depended on the number of times of signal recording on the optical disc.

The PCA in the first recording layer of an optical disc (a DVD-RW) was initialized by applying thereto a forward laser beam having a high power, 10 mW, equal to about twice an optimum erasing power. Then, test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The asymmetry values "av" of the reproduced signals were measured. The sequence of the above steps except the initialization of the PCA was reiterated. Between the recording of the test signals and the next recording of the test signals, the forward laser beam having a normal erasing power was applied to the PCA to implement DC erasure.

Figure 45:
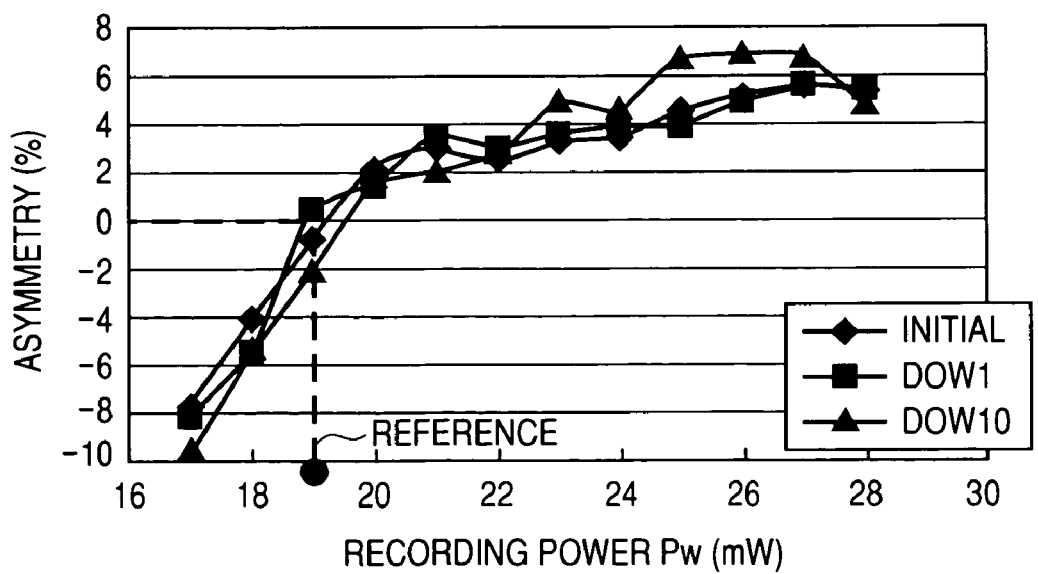
FIG. 45 is a diagram showing a relation among a measured asymmetry value "av", the number of times of signal recording on an optical disc, and a recording power Pw of a laser beam in the presence of initialization with a high laser power.

FIG. 45 shows the obtained relation among the measured asymmetry value "av", the number of times of signal recording (signal rewriting) on the optical disc, and the recording power Pw of the laser beam. In FIG. 45, the marks INITIAL denote the relation between the measured asymmetry value "av" and the recording power Pw of the laser beam used to record the test signals corresponding to the first reproduced signals. The marks DOW1 denote the relation between the measured asymmetry value "av" and the recording power Pw of the laser beam used to record the test signals corresponding to the second reproduced signals. The marks DOW10 denote the relation between the measured asymmetry value "av" and the recording power Pw of the laser beam used to record the test signals corresponding to the eleventh reproduced signals. As shown in FIG. 45, in the case where the initialization of the PCA with a high laser power was carried out, the relation between the measured asymmetry value "av" and the recording power Pw of the laser beam hardly depended on the number of times of signal recording on the optical disc. Accordingly, in the presence of the initialization of the PCA with a high laser power, an optimum recording power of the laser beam can be reliably decided on the basis of the measured asymmetry value "av". When a target asymmetry value "av" is equal to 0, a reference recording power corresponds to an asymmetry value "av" of 0. The reference recording power is multiplied by the prescribed coefficient Sa to obtain the optimum recording power.

The PCA in the first recording layer of an optical disc (a DVD-RW) was not subjected to pre-initialization, and then test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The asymmetry-related "β" values of the reproduced signals were measured. The sequence of the above steps was reiterated.

Figure 46:
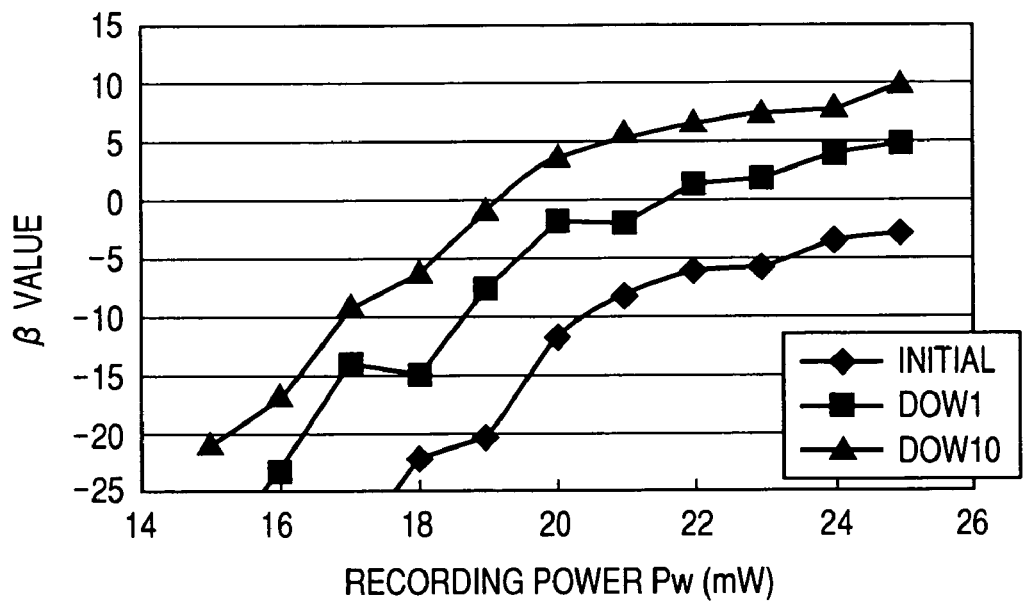
FIG. 46 is a diagram showing a relation among a measured asymmetry-related "β" value, the number of times of signal recording on an optical disc, and a recording power Pw of a laser beam in the absence of initialization with a high laser power.

FIG. 46 shows the obtained relation among the measured asymmetry-related "β" value, the number of times of signal recording (signal rewriting) on the optical disc, and the recording power Pw of the laser beam. In FIG. 46, the marks INITIAL denote the relation between the measured asymmetry-related "β" value and the recording power Pw of the laser beam used to record the test signals corresponding to the first reproduced signals. The marks DOW1 denote the relation between the measured asymmetry-related "β" value and the recording power Pw of the laser beam used to record the test signals corresponding to the second reproduced signals. The marks DOW10 denote the relation between the measured asymmetry-related "β" value and the recording power Pw of the laser beam used to record the test signals corresponding to the eleventh reproduced signals. As shown in FIG. 46, the relation between the measured asymmetry-related "β" value and the recording power Pw of the laser beam greatly depended on the number of times of signal recording on the optical disc.

The PCA in the first recording layer of an optical disc (a DVD-RW) was initialized by applying thereto a forward laser beam having a high power, 10 mW, equal to about twice an optimum erasing power. Then, test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The asymmetry-related "β" values of the reproduced signals were measured. The sequence of the above steps except the initialization of the PCA was reiterated. Between the recording of the test signals and the next recording of the test signals, the forward laser beam having a normal erasing power was applied to the PCA to implement DC erasure.

Figure 47:
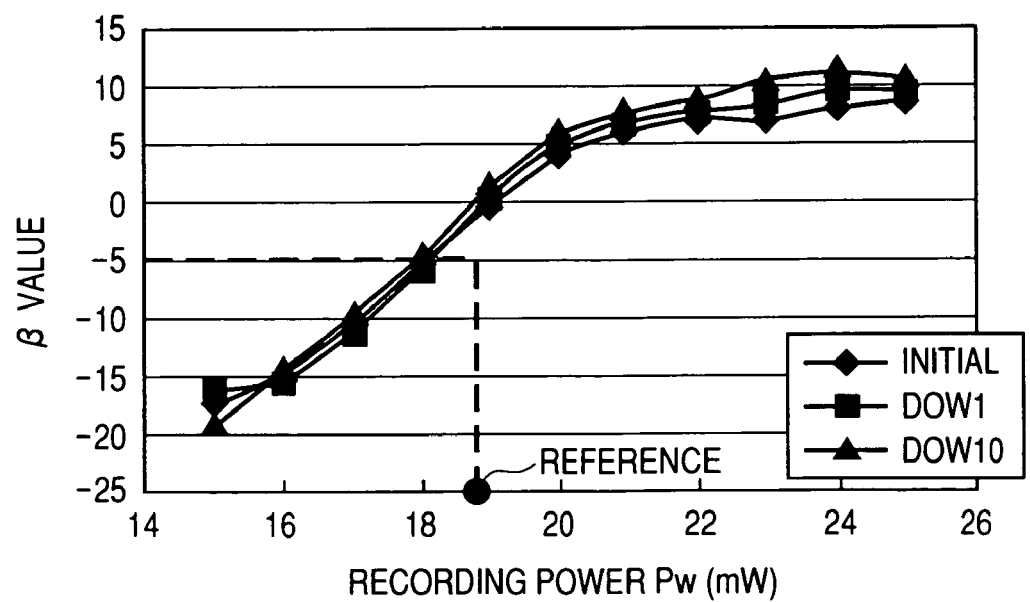
FIG. 47 is a diagram showing a relation among a measured asymmetry-related "β" value, the number of times of signal recording on an optical disc, and a recording power Pw of a laser beam in the presence of initialization with a high laser power.

FIG. 47 shows the obtained relation among the measured asymmetry-related "β" value, the number of times of signal recording (signal rewriting) on the optical disc, and the recording power Pw of the laser beam. In FIG. 47, the marks INITIAL denote the relation between the measured asymmetry-related "β" value and the recording power Pw of the laser beam used to record the test signals corresponding to the first reproduced signals. The marks DOW1 denote the relation between the measured asymmetry-related "β" value and the recording power Pw of the laser beam used to record the test signals corresponding to the second reproduced signals. The marks DOW10 denote the relation between the measured asymmetry-related "β" value and the recording power Pw of the laser beam used to record the test signals corresponding to the eleventh reproduced signals. As shown in FIG. 47, in the case where the initialization of the PCA with a high laser power was carried out, the relation between the measured asymmetry-related "β" value and the recording power Pw of the laser beam was substantially independent of the number of times of signal recording on the optical disc. Accordingly, in the presence of the initialization of the PCA with a high laser power, an optimum recording power of the laser beam can be reliably decided on the basis of the measured asymmetry-related "β" value. When a target asymmetry-related "β" value is equal to 0, a reference recording power corresponds to an asymmetry-related "β" value of 0. The reference recording power is multiplied by the prescribed coefficient Sb to obtain the optimum recording power.

The PCA in the first recording layer of an optical disc (a DVD-RW) was not subjected to pre-initialization, and then test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The modulation factors "m" of the reproduced signals were measured. The sequence of the above steps was reiterated.

Figure 48:
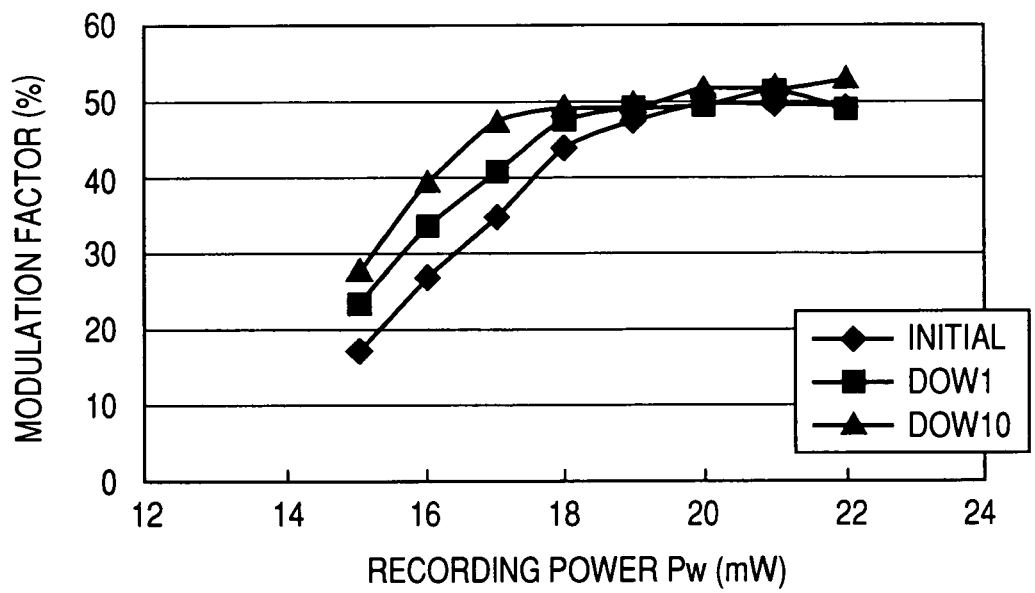
FIG. 48 is a diagram showing a relation among a measured modulation factor "m", the number of times of signal recording on an optical disc, and a recording power Pw of a laser beam in the absence of initialization with a high laser power.

FIG. 48 shows the obtained relation among the measured modulation factor "m", the number of times of signal recording (signal rewriting) on the optical disc, and the recording power Pw of the laser beam. In FIG. 48, the marks INITIAL denote the relation between the measured modulation factor "m" and the recording power Pw of the laser beam used to record the test signals corresponding to the first reproduced signals. The marks DOW1 denote the relation between the measured modulation factor "m" and the recording power Pw of the laser beam used to record the test signals corresponding to the second reproduced signals. The marks DOW10 denote the relation between the measured modulation factor "m" and the recording power Pw of the laser beam used to record the test signals corresponding to the eleventh reproduced signals. As shown in FIG. 48, the relation between the measured modulation factor "m" and the recording power Pw of the laser beam greatly depended on the number of times of signal recording on the optical disc.

The PCA in the first recording layer of an optical disc (a DVD-RW) was initialized by applying thereto a forward laser beam having a high power, 10 mW, equal to about twice an optimum erasing power. Then, test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The modulation factors "m" of the reproduced signals were measured. The sequence of the above steps except the initialization of the PCA was reiterated. Between the recording of the test signals and the next recording of the test signals, the forward laser beam having a normal erasing power was applied to the PCA to implement DC erasure.

Figure 49:
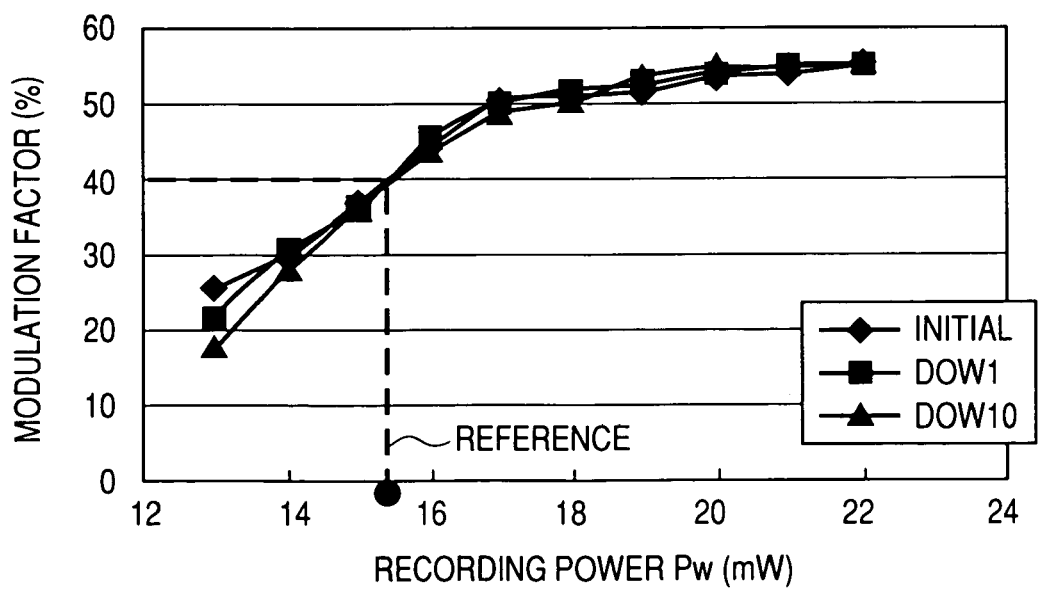
FIG. 49 is a diagram showing a relation among a measured modulation factor "m", the number of times of signal recording on an optical disc, and a recording power Pw of a laser beam in the presence of initialization with a high laser power.

FIG. 49 shows the obtained relation among the measured modulation factor "m", the number of times of signal recording (signal rewriting) on the optical disc, and the recording power Pw of the laser beam. In FIG. 49, the marks INITIAL denote the relation between the measured modulation factor "m" and the recording power Pw of the laser beam used to record the test signals corresponding to the first reproduced signals. The marks DOW1 denote the relation between the measured modulation factor "m" and the recording power Pw of the laser beam used to record the test signals corresponding to the second reproduced signals. The marks DOW10 denote the relation between the measured modulation factor "m" and the recording power Pw of the laser beam used to record the test signals corresponding to the eleventh reproduced signals. As shown in FIG. 49, in the case where the initialization of the PCA with a high laser power was carried out, the relation between the measured modulation factor "m" and the recording power Pw of the laser beam was substantially independent of the number of times of signal recording on the optical disc. Accordingly, in the presence of the initialization of the PCA with a high laser power, an optimum recording power of the laser beam can be reliably decided on the basis of the measured modulation factor "m". When a target modulation factor "m" is equal to 40%, a reference recording power corresponds to a modulation factor "m" of 40%. The reference recording power is multiplied by the prescribed coefficient Smod to obtain the optimum recording power.

The PCA in the first recording layer of an optical disc (a DVD-RW) was not subjected to pre-initialization, and then test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The "γ" values of the reproduced signals were measured through the use of the equation (9). The sequence of the above steps was reiterated.

Figure 50:
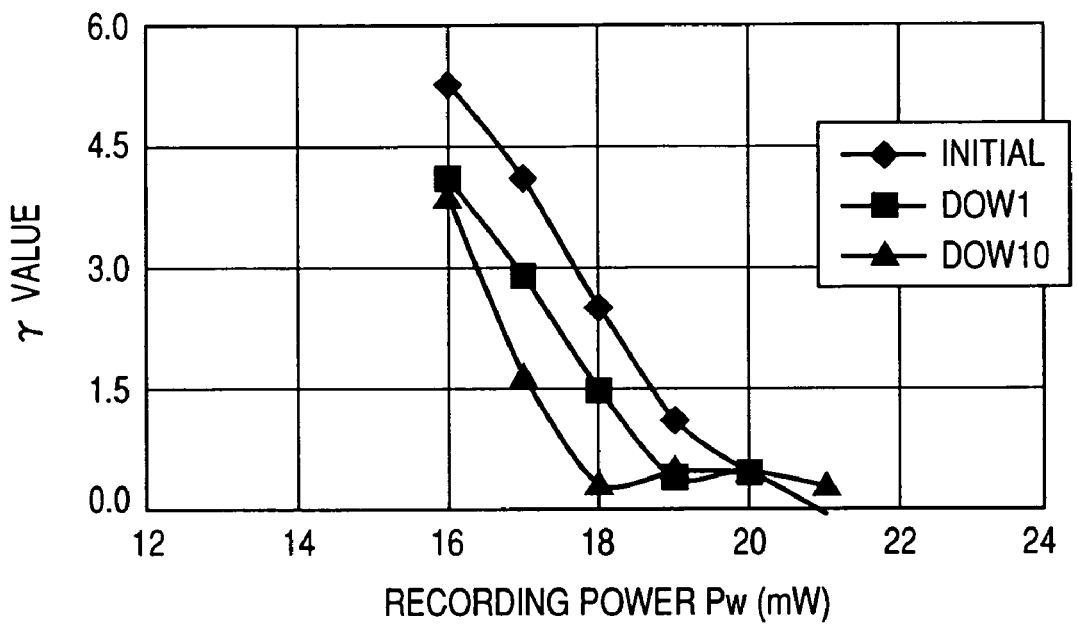
FIG. 50 is a diagram showing a relation among a measured "γ" value, the number of times of signal recording on an optical disc, and a recording power Pw of a laser beam in the absence of initialization with a high laser power.

FIG. 50 shows the obtained relation among the measured "γ" value, the number of times of signal recording (signal rewriting) on the optical disc, and the recording power Pw of the laser beam. In FIG. 50, the marks INITIAL denote the relation between the measured "γ" value and the recording power Pw of the laser beam used to record the test signals corresponding to the first reproduced signals. The marks DOW1 denote the relation between the measured "γ" value and the recording power Pw of the laser beam used to record the test signals corresponding to the second reproduced signals. The marks DOW10 denote the relation between the measured "γ" value and the recording power Pw of the laser beam used to record the test signals corresponding to the eleventh reproduced signals. As shown in FIG. 50, the relation between the measured "γ" value and the recording power Pw of the laser beam greatly depended on the number of times of signal recording on the optical disc.

The PCA in the first recording layer of an optical disc (a DVD-RW) was initialized by applying thereto a forward laser beam having a high power, 10 mW, equal to about twice an optimum erasing power. Then, test signals were sequentially recorded on the PCA while the recording power Pw of the laser beam was changed among different values and the erasing power Pe thereof was fixed to 5 mW. The different values of the recording power Pw were assigned to the recorded test signals, respectively. The recorded signals were reproduced from the optical disc to generate reproduced signals. The "γ" values of the reproduced signals were measured. The sequence of the above steps except the initialization of the PCA was reiterated. Between the recording of the test signals and the next recording of the test signals, the forward laser beam having a normal erasing power was applied to the PCA to implement DC erasure.

Figure 51:
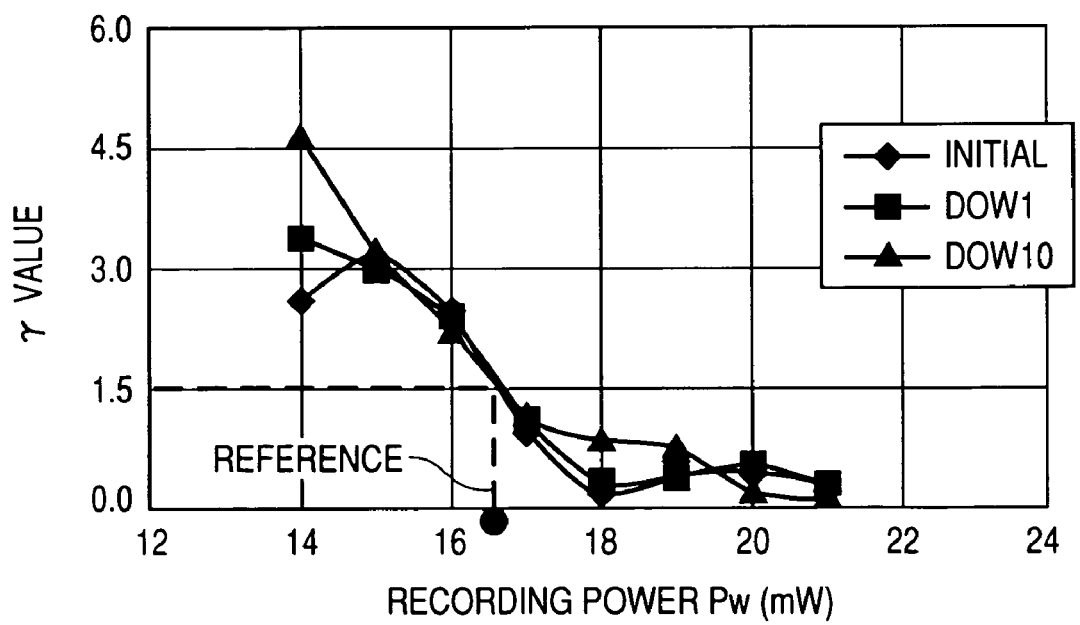
FIG. 51 is a diagram showing a relation among a measured "γ" value, the number of times of signal recording on an optical disc, and a recording power Pw of a laser beam in the presence of initialization with a high laser power.

FIG. 51 shows the obtained relation among the measured "γ" value, the number of times of signal recording (signal rewriting) on the optical disc, and the recording power Pw of the laser beam. In FIG. 51, the marks INITIAL denote the relation between the measured "γ" value and the recording power Pw of the laser beam used to record the test signals corresponding to the first reproduced signals. The marks DOW1 denote the relation between the measured "γ" value and the recording power Pw of the laser beam used to record the test signals corresponding to the second reproduced signals. The marks DOW10 denote the relation between the measured "γ" value and the recording power Pw of the laser beam used to record the test signals corresponding to the eleventh reproduced signals. As shown in FIG. 51, in the case where the initialization of the PCA with a high laser power was carried out, the relation between the measured "γ" value and the recording power Pw of the laser beam was substantially independent of the number of times of signal recording on the optical disc. Accordingly, in the presence of the initialization of the PCA with a high laser power, an optimum recording power of the laser beam can be reliably decided on the basis of the measured "γ" value. When a target "γ" value is equal to 1.5%, a reference recording power corresponds to a "γ" value of 1.5%. The reference recording power is multiplied by the prescribed coefficient Sg to obtain the optimum recording power.

It is understood from FIGS. 43-50 that the initialization of the PCA in an optical disc with a high laser power enables the relation between the measured parameter (the measured asymmetry value "av", the measured asymmetry-related "β" value, the measured modulation factor "m", or the measured "γ" value) to be substantially independent of the number of times of signal recording on the optical disc. Accordingly, the initialization of the PCA enhances the reliability and accuracy of the decided optimum write-purpose powers of the laser beam. Regarding the characteristics shown in FIGS. 43, 45, 47, 49, and 51, the initialization of the PCAs in the optical discs with a high laser power was carried out at a laser-beam-related scanning speed equal to twice a normal speed.

The control program for the signal processing circuit 3 and the control circuit 11A includes a subroutine (a segment) for initializing the PCA in the first recording layer of an optical disc 1 with a high laser power. This program segment is similar to that in FIG. 34. Preferably, the program segment is placed immediately before the step 501 in FIG. 39 or the step 601 in FIG. 40, or between the steps 601 and 602 in FIG. 40.

Ninth Embodiment

A ninth embodiment of this invention is similar to the first to eighth embodiments thereof except that the optical disc 1 includes a laminate of three or more recording layers.

Tenth Embodiment

A tenth embodiment of this invention is similar to the first to ninth embodiments thereof except for design changes described hereafter.

According to the tenth embodiment of this invention, the control program for the signal processing circuit 3 and the control circuit 11 or 11A is initially stored in a recording medium. The recording medium is connected with the optical-disc drive apparatus 15 or 15A and is driven therein so that the control program is loaded from the recording medium into the apparatus memory 14 or the RAM.

Alternatively, the control program may be downloaded to the apparatus memory 14 or the RAM via a transmission line or a communication line.

What is claimed is:

1. An apparatus for recording and reproducing a signal on and from a rewritable optical disc by applying a laser beam to the optical disc, the optical disc having a plurality of recording layers including a selected recording layer, the apparatus comprising:

first means for recording test signals on a prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer;

second means for, after the first means records the test signals on the prescribed area in the selected recording layer, exposing the prescribed area in the selected recording layer to the laser beam and scanning the prescribed area in the selected recording layer by the laser beam while maintaining the power of the laser beam at a DC erasing power and changing the DC erasing power among different values, wherein the different values of the DC erasing power are assigned to the recorded test signals respectively;

third means for reproducing the recorded test signals from the prescribed area in the selected recording layer to obtain reproduced signals after the second means implements said exposing and scanning;

fourth means for detecting parameter values of the respective reproduced signals obtained by the third means, the parameter values being at least ones of (1) modulation factors, (2) modulation-factor-slope "γ" values, (3) asymmetry-related "β" values, and (4) asymmetry values, wherein the detected parameter values of the reproduced signals correspond to the different values of the DC erasing power respectively;

fifth means for deciding, among the parameter values detected by the fourth means, a detected parameter value matching one of (1) a target value and (2) a target condition;

sixth means for selecting, from the different values of the DC erasing power, one corresponding to the parameter value decided by the fifth means;

seventh means for multiplying a prescribed coefficient and the DC erasing power value selected by the sixth means to calculate an optimum level of the erasing power of the laser beam.

2. An apparatus as recited in claim 1, wherein each of the test signals comprises one of (1) a first signal of a recording waveform pattern including a combination of a short mark and a long mark and (2) a second signal of a recording waveform pattern with different mark lengths arranged at random.

3. An apparatus as recited in claim 1, wherein each of the test signals comprises one of (1) a first signal including a longest mark signal, (2) a second signal having long mark signals including a longest mark signal, and (3) a third signal consisting of a long mark signal.

4. An apparatus as recited in claim 1, wherein the fourth means comprises means for detecting the modulation-factor-slope "γ" values of the respective reproduced signals, and the fifth means comprises means for deciding, among the modulation-factor-slope "γ" values detected by the fourth means, a detected parameter value corresponding to a valley.

5. An apparatus as recited in claim 1, further comprising:
a memory storing a first signal representative of a recommended recording power, a second signal representative of a ratio between the recommended recording power and a recommended erasing power, and a third signal representative of a recommended bias power, wherein the first, second, and third signals are also stored in the optical disc;
means provided in the first means for reading out the first signal from the memory or the optical disc and using the recommended recording power represented by the read-out first signal as the setting recording power;
means provided in the first means for reading out the second signal from the memory or the optical disc, calculating the recommended erasing power from the recommended recording power and the ratio represented by the read-out second signal, and using the calculated recommended erasing power as the setting erasing power;
means provided in the first means for reading out the third signal from the memory or the optical disc and using the recommended bias power represented by the read-out third signal as the setting bias power.

6. An apparatus as recited in claim 1, further comprising:
eighth means for recording data on the optical disc while changing the power of the laser beam among the setting recording power, the setting erasing power, and the setting bias power;
a memory storing a first signal representative of a ratio between an optimum recording power and an optimum erasing power, and a second signal representative of a recommended bias power, wherein the first and second signals are also stored in the optical disc;
means provided in the eighth means for using the optimum erasing power level calculated by the seventh means as the setting erasing power;
means provided in the eighth means for reading out the first signal from the memory or the optical disc, calculating the optimum recording power from the optimum erasing power level calculated by the seventh means and the ratio represented by the read-out first signal, and using the calculated optimum recording power as the setting recording power; and means provided in the eighth means for reading out the second signal from the memory or the optical disc and using the recommended bias power represented by the read-out second signal as the setting bias power.

7. An apparatus as recited in claim 1, wherein the seventh means comprises means for reading out a signal representative of the prescribed coefficient from one of (1) a pre-pit area and (2) a track groove of the optical disc.

8. An apparatus as recited in claim 1, further comprising:
a memory storing a first signal representative of a recommended recording power, a second signal representative of a ratio between the recommended recording power and a recommended erasing power, and a third signal representative of the prescribed coefficient, wherein the first, second, and third signals are also stored in the optical disc;
eighth means for reading out the first, second, and third signals from the memory or the optical disc;
ninth means for calculating a reference power value from the recommended recording power represented by the read-out first signal, the ratio represented by the read-out second signal, and the prescribed coefficient represented by the read-out third signal; and
means provided in the second means for placing the different values of the DC erasing power around the reference power value calculated by the ninth means.

9. An apparatus as recited in claim 1, wherein the prescribed coefficient is equal to a value at which a jitter of a reproduced signal obtained from an area of the optical disc in which the test signals have been recorded twice is minimized.

10. An apparatus as recited in claim 1, wherein the reproduced signals obtained by the third means comprise RF signals respectively, and the fourth means comprises means for detecting peak voltages of each of the RF signals, means for detecting bottom voltages of each of the RF signals, means for averaging the detected peak voltages into a mean peak voltage of each of the RF signals, means for averaging the detected bottom voltages into a mean bottom voltage, and means for calculating each of the detected asymmetry-related "β" values from the mean peak voltage and the mean bottom voltage.

11. An apparatus as recited in claim 1, wherein the reproduced signals obtained by the third means comprise RF signals respectively, and the fourth means comprises means for detecting peak voltages of each of the RF signals, means for detecting bottom voltages of each of the RF signals, means for averaging the detected peak voltages into a mean peak voltage of each of the RF signals, means for averaging the detected bottom voltages into a mean bottom voltage, means for detecting peak amplitudes of each of the RF signals, means for averaging the detected peak amplitudes into a mean peak amplitude, and means for calculating each of the detected modulation factors from the mean peak voltage, the mean bottom voltage, and the mean peak amplitude.

12. An apparatus as recited in claim 1, wherein the reproduced signals obtained by the third means comprise RF signals respectively, and the fourth means comprises means for detecting peak voltages of each of the RF signals, means for detecting bottom voltages of each of the RF signals, means for averaging the detected peak voltages into a mean peak voltage of each of the RF signals, means for averaging the detected bottom voltages into a mean bottom voltage, means for detecting peak amplitudes of each of the RF signals, means for averaging the detected peak amplitudes into a mean peak amplitude, means for calculating each of the detected modulation factors from the mean peak voltage, the mean bottom voltage, and the mean peak amplitude, and means for calculating each of the modulation-factor-slope "γ" values from the calculated modulation factors.

13. An apparatus as recited in claim 1, wherein the reproduced signals obtained by the third means comprise RF signals respectively, and the fourth means comprises means for calculating the detected modulation-factor-slope "γ" values according to an equation as:

$$\gamma = (dm/dDe)/(m/De)$$

where "dm" denotes a difference in modulation factor between a current RF signal and a next RF signal, dDe denotes a difference between the DC erasing power value corresponding to the current RF signal and that corresponding to the next RF signal, "m" denotes a modulation factor of either the current RF signal or the next RF signal, and "De" denotes the DC erasing power value corresponding to either the current RF signal or the next RF signal.

14. An apparatus as recited in claim 1, further comprising eighth means for subjecting the optical disc to DC erasure through the use of the laser beam having a prescribed initializing power before the first means records the test signals.

15. An apparatus as recited in claim 14, wherein the prescribed initializing power is equal to one of (1) an optimum erasing power and (2) a recommended erasing power which is multiplied by a value of 1.5 to 2.5.

16. An apparatus as recited in claim 14, further comprising ninth means for writing a flag in a recording management area of the optical disc in cases where the eighth means has subjected the optical disc to the DC erasure.

17. An apparatus as recited in claim 1, wherein the selected recording layer is first one among the recording layers as viewed in a direction of travel of the laser beam.

18. A method of recording and reproducing a signal on and from a rewritable optical disc by applying a laser beam to the optical disc, the optical disc having a plurality of recording layers including a selected recording layer, the method comprising the steps of:

recording test signals on a prescribed area in the selected recording layer while changing a power of the laser beam among a setting recording power, a setting erasing power, and a setting bias power, the setting recording power changing the selected recording layer from a crystalline state to an amorphous state, the setting erasing power changing the selected recording layer from the amorphous state to the crystalline state, the setting bias power preventing unwanted diffusion of heat in the selected recording layer;

after the test signals are recorded on the prescribed area in the selected recording layer, exposing the prescribed area in the selected recording layer to the laser beam and scanning the prescribed area in the selected recording layer by the laser beam while maintaining the power of the laser beam at a DC erasing power and changing the DC erasing power among different values, wherein the different values of the DC erasing power are assigned to the recorded test signals respectively;

reproducing the recorded test signals from the prescribed area in the selected recording layer to obtain reproduced signals after the prescribed area in the selected recording layer is exposed to and scanned by the laser beam having the DC erasing power;

detecting parameter values of the respective reproduced signals, the parameter values being at least ones of (1) modulation factors, (2) modulation-factor-slope "γ" values, (3) asymmetry-related "β" values, and (4) asymmetry values, wherein the detected parameter values of the reproduced signals correspond to the different values of the DC erasing power respectively;

deciding, among the detected parameter values, a detected parameter value matching one of (1) a target value and (2) a target condition;

selecting, from the different values of the DC erasing power, one corresponding to the decided parameter value;

multiplying a prescribed coefficient and the selected DC erasing power value to calculate an optimum level of the erasing power of the laser beam.

\* \* \* \* \*